(12) United States Patent
Chandler et al.

(10) Patent No.: US 12,380,651 B2
(45) Date of Patent: Aug. 5, 2025

(54) STRUCTURE ANNOTATION

(71) Applicant: Five AI Limited, Bristol (GB)

(72) Inventors: Robert Chandler, Cambridge (GB);
Thomas Westmacott, Cambridge (GB)

(73) Assignee: Five AI Limited, Cambridge (GB)

( * ) Notice: Subject to any disclaimer, the term of this patent is extended or adjusted under 35 U.S.C. 154(b) by 248 days.

(21) Appl. No.: 17/627,417

(22) PCT Filed: Jul. 20, 2020

(86) PCT No.: PCT/EP2020/070446
§ 371 (c)(1),
(2) Date: Jan. 14, 2022

(87) PCT Pub. No.: WO2021/013793
PCT Pub. Date: Jan. 28, 2021

(65) Prior Publication Data
US 2022/0262100 A1    Aug. 18, 2022

(30) Foreign Application Priority Data

Jul. 19, 2019  (GB) ...................................... 1910382
Jul. 19, 2019  (GB) ...................................... 1910390
(Continued)

(51) Int. Cl.
*G06T 19/00*        (2011.01)
*G06N 3/08*         (2023.01)
(Continued)

(52) U.S. Cl.
CPC .............. *G06T 19/00* (2013.01); *G06N 3/08* (2013.01); *G06N 5/00* (2013.01); *G06T 1/60* (2013.01);
(Continued)

(58) Field of Classification Search
CPC ....... G06F 18/214; G06F 18/40; G06T 17/00; G06T 19/00; G06T 19/20; G06T 2200/24;
(Continued)

(56) References Cited

U.S. PATENT DOCUMENTS

2009/0179895 A1    7/2009  Zhu et al.
2014/0293016 A1   10/2014  Benhimane et al.
(Continued)

FOREIGN PATENT DOCUMENTS

CN         109859612 A      6/2019

OTHER PUBLICATIONS

Towards End-to-End Lane Detection: an Instance Segmentation Approach, Davy Neven, 2018 (Year: 2018).*
(Continued)

*Primary Examiner* — Ming Wu
(74) *Attorney, Agent, or Firm* — Andrew J. Tibbetts; Samuel S. Stone; Greenberg Traurig, LLP

(57) ABSTRACT

A computer-implemented method of creating one or more annotated perception inputs, the method comprising, in an annotation computer system: receiving a plurality of captured frames, each frame comprising a set of 3D structure points, in which at least a portion of a common structure component is captured; computing a reference position within at least one reference frame of the plurality of frames; generating a 3D model for the common structure component by selectively extracting 3D structure points of the at least one reference frame based on the reference position within that frame; determining an aligned model position for the 3D model within a target frame of the plurality of frames based on one or more manual alignment inputs received in respect of the target frame at a user interface whilst rendering the 3D model for manually aligning the 3D model with the common structure component in the target frame; and storing anno-
(Continued)

tation data of the aligned model position in computer storage, in association with at least one perception input of the target frame for annotating the common structure component therein.

21 Claims, 28 Drawing Sheets

(30) Foreign Application Priority Data

| | | |
|---|---|---|
| Jul. 19, 2019 | (GB) | 1910392 |
| Jul. 19, 2019 | (GB) | 1910395 |
| Apr. 1, 2020 | (GB) | 2004841 |
| Apr. 1, 2020 | (GB) | 2004842 |

(51) Int. Cl.

| | |
|---|---|
| *G06N 5/00* | (2023.01) |
| *G06T 1/60* | (2006.01) |
| *G06T 5/70* | (2024.01) |
| *G06T 7/10* | (2017.01) |
| *G06T 7/60* | (2017.01) |
| *G06T 7/70* | (2017.01) |
| *G06T 7/73* | (2017.01) |
| *G06T 15/00* | (2011.01) |
| *G06T 15/50* | (2011.01) |
| *G06T 17/00* | (2006.01) |
| *G06T 19/20* | (2011.01) |
| *G06V 10/774* | (2022.01) |
| *G06V 10/94* | (2022.01) |
| *G06V 20/56* | (2022.01) |
| *G06V 20/64* | (2022.01) |

(52) U.S. Cl.
CPC ............... *G06T 5/70* (2024.01); *G06T 7/10* (2017.01); *G06T 7/60* (2013.01); *G06T 7/70* (2017.01); *G06T 7/73* (2017.01); *G06T 15/005* (2013.01); *G06T 15/50* (2013.01); *G06T 17/00* (2013.01); *G06T 19/20* (2013.01); *G06V 10/774* (2022.01); *G06V 10/945* (2022.01); *G06V 20/56* (2022.01); *G06V 20/647* (2022.01); *G06T 2200/08* (2013.01); *G06T 2200/24* (2013.01); *G06T 2207/10016* (2013.01); *G06T 2207/10024* (2013.01); *G06T 2207/10028* (2013.01); *G06T 2207/20081* (2013.01); *G06T 2207/20092* (2013.01); *G06T 2207/30252* (2013.01); *G06T 2210/12* (2013.01); *G06T 2219/004* (2013.01); *G06T 2219/2004* (2013.01)

(58) Field of Classification Search
CPC . G06T 2207/10016; G06T 2207/20081; G06T 2210/12; G06T 2219/004; G06T 2219/2004; G06T 7/60; G06T 7/73; G06T 1/60; G06T 15/005; G06T 15/50; G06T 2200/08; G06T 2207/10024; G06T 2207/10028; G06T 2207/20092; G06T 2207/30252; G06T 5/002; G06T 7/10; G06T 7/70; G06N 3/08; G06N 5/00; G06V 10/774; G06V 10/945; G06V 20/56; G06V 20/647
See application file for complete search history.

(56) References Cited

U.S. PATENT DOCUMENTS

| | | | |
|---|---|---|---|
| 2016/0253675 A1* | 9/2016 | Remillet | G06T 7/579 705/44 |
| 2018/0053347 A1* | 2/2018 | Fathi | G06T 7/344 |
| 2022/0262100 A1* | 8/2022 | Chandler | G06V 10/774 |

OTHER PUBLICATIONS

U.S. Appl. No. 17/627,508, filed Jan. 14, 2022, Chandler et al.
U.S. Appl. No. 17/627,520, filed Jan. 14, 2022, Chandler et al.
U.S. Appl. No. 17/627,404, filed Jan. 14, 2022, Chandler et al.
PCT/EP2020/070442, Dec. 3, 2020, International Search Report and Written Opinion.
PCT/EP2020/070444, Dec. 3, 2020, International Search Report and Written Opinion.
PCT/EP2020/070445, Oct. 13, 2020, International Search Report and Written Opinion.
PCT/EP2020/070446, Oct. 13, 2020, International Search Report and Written Opinion.
International Search Report and Written Opinion for International Application No. PCT/EP2020/070442, mailed Dec. 3, 2020.
International Search Report and Written Opinion for International Application No. PCT/EP2020/070444, mailed Dec. 3, 2020.
International Search Report and Written Opinion for International Application No. PCT/EP2020/070445, mailed Oct. 13, 2020.
International Search Report and Written Opinion for International Application No. PCT/EP2020/070446, mailed Oct. 13, 2020.
Avetisyan et al., Scan2cad: Learning cad model alignment in rgb-d scans. Proceedings of the IEEE/CVF Conference on Computer Vision and Pattern Recognition 2019;2614-23.
Azam et al., Object modeling from 3d point cloud data for self-driving vehicles. 2018 IEEE Intelligent Vehicles Symposium (IV) Jun. 26, 2018;409-14.
Roberts et al., A Dataset for Lane Instance Segmentation in Urban Environments. arXiv preprint arXiv:1807.01347. Aug. 2, 2018. 17 pages.
Tylecek et al., Consistent semantic annotation of outdoor datasets via 2D/3D label transfer. Sensors. Jul. 2018;18(7):2249.
Wang et al., Latte: Accelerating LiDAR Point Cloud Annotation via Sensor Fusion, One-Click Annotation, and Tracking. arXiv preprint arXiv: 1904.09085. Apr. 19, 2019. 8 pages.
Xie et al., Semantic instance annotation of street scenes by 3d to 2d label transfer. Proceedings of the IEEE Conference on Computer Vision and Pattern Recognition 2016;3688-97.

* cited by examiner

Cost function penalizes unexpected changes in vehicle path

STRUCTURE ANNOTATION

RELATED APPLICATIONS

This Application is a national stage filing under 35 U.S.C. 371 of International Patent Application Serial No. PCT/EP2020/070446, filed Jul. 20, 2020, which claims priority to United Kingdom patent application number GB 2004842.7, filed Apr. 1, 2020, to United Kingdom patent application number GB 2004841.9, filed Apr. 1, 2020, to United Kingdom patent application number GB 1910382.9, filed Jul. 19, 2019, to United Kingdom patent application number GB 1910395.1, filed Jul. 19, 2019, to United Kingdom patent application number GB 1910390.2, filed Jul. 19, 2019, and to United Kingdom patent application number GB 1910392.8, filed Jul. 19, 2019. Each of the foregoing applications is incorporated by reference herein in its entirety.

TECHNICAL FIELD

This disclosure relates to the annotation of structure captured in images, point clouds, and other forms of perception inputs. Such annotation may be applied for the purpose of creating annotated perception inputs for use in training a machine learning (ML) perception component.

BACKGROUND

Structure perception refers to a class of data processing algorithms which can meaningfully interpret structure captured in perception inputs. Such processing may be applied across different forms of perception input. A perception input refers generally to any structure representation, i.e. any set of data in which structure is captured. Structure perception can be applied in both two-dimensional (2D) and three-dimensional (3D) space. The results of applying a structure perception algorithm to a given structure input are encoded as a structure perception output.

One form perception input is a two-dimensional (2D) image; that is, an image having only a colour component (one or more colour channels). The most basic form of structure perception is image classification, i.e. the simple classification of an image as a whole in relation to a set of image classes. More complex forms of structure perception applied in 2D space include 2D object detection and/or localization (e.g. orientation, pose and/or distance estimation in 2D space), 2D instance segmentation etc. Other forms of perception input include three-dimensional (3D) images, i.e. images having at least a depth component (depth channel); 3D point clouds, e.g. as captured using RADAR or LIDAR or derived from a 3D image; voxel or mesh-based representations of structure, or any other form of 3D structure representation. Examples of perception algorithms which may be applied in 3D space include 3D object detection and/or localization (e.g. distance, orientation or pose estimation in 3D space) etc. A single perception input may also be formed of multiple images. For example, stereo depth information may be captured in a stereo pair of 2D images, and that image pair may be used as a basis for 3D perception. 3D structure perception may also be applied to a single 2D image, an example being monocular depth extraction, which extracts depth information from a single 2D image (noting that a 2D image, without any depth channel, may nonetheless capture a degree of depth information in its one or more color channels). Such forms of structure perception are examples of different "perception modalities" as that term is used herein. Structure perception applied to 2D or 3D images may be referred to as "computer vision".

Object detection refers to the detection of any number of objects captured in a perception input and typically involves characterizing each such object as an instance of an object class. Such object detection may involve, or be performed in conjunction with, one or more forms of position estimation, such as 2D or 3D bounding box detection (a form of object localization, where the aim is to define an area or volume in 2D or 3D space which bounds the object), distance estimation, pose estimation etc.

In a machine learning (ML) context, a structure perception component may comprise one or more trained perception models. For example, machine vision processing is frequently implemented using convolutional neural networks (CNNs). Such networks require large numbers of training images which been annotated with information that the neural network is required to learn (a form of supervised learning). At training time, the network is presented with thousands, or preferably hundreds of thousands, of such annotated images and learns for itself how features captured in the images themselves relate to annotations associated therewith. Each image is annotated in the sense of being associated with annotation data. The image serves as a perception input, and the associated annotation data provides a "ground truth" for the image. CNNs and other forms of perception model can be architected to receive and process other forms of perception inputs, such as point clouds, voxel tensors etc., and to perceive structure in both 2D and 3D space. In the context of training generally, a perception input may be referred to as a "training example" or "training input". By contrast, training examples captured for processing by a trained perception component at runtime may be referred to as "runtime inputs". Annotation data associated with a training input provides a ground truth for that training input in that the annotation data encodes an intended perception output for that training input. In a supervised training process, parameters of a perception component are tuned systematically to minimize, to a defined extent, an overall measure of difference between the perception outputs generated by the perception component when applied to the training examples in a training set (the "actual" perception outputs) and the corresponding ground truths provided by the associated annotation data (the intended perception outputs). In this manner, the perception input "learns" from the training examples, and moreover is able to "generalize" that learning, in the sense of being able, one trained, to provide meaningful perception outputs for perception inputs it has not encountered during training.

Such perception components are a cornerstone of many established and emerging technologies. For example, in the field of robotics, mobile robotic systems that can autonomously plan their paths in complex environments are becoming increasingly prevalent. An example of such a rapidly emerging technology is autonomous vehicles (AVs) that can navigate by themselves on urban roads. Such vehicles must not only perform complex manoeuvres among people and other vehicles, but they must often do so while guaranteeing stringent constraints on the probability of adverse events occurring, such as collision with these other agents in the environments. In order for an AV to plan safely, it is crucial that it is able to observe its environment accurately and reliably. This includes the need for accurate and reliable detection of real-world structure in the vicinity of the vehicle. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on perception inputs from the sensor system. A fully-autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Hence, in the field of autonomous driving and robotics more generally, one or more perception components may be required for interpreting perception inputs, i.e. which can determine information about real-world structure captured in a given a perception input.

Increasingly, a complex robotic system, such as an AV, may be required to implement multiple perception modalities and thus accurately interpret multiple forms of perception input. For example, an AV may be equipped with one or more stereo optical sensor (camera) pairs, from which associated depth maps are extracted. In that case, a data processing system of the AV may be configured to apply one or more forms of 2D structure perception to the images themselves—e.g. 2D bounding box detection and/or other forms of 2D localization, instance segmentation etc. —plus one or more forms of 3D structure perception to data of the associated depth maps—such as 3D bounding box detection and/or other forms of 3D localization. Such depth maps could also come from LiDAR, RADAR etc, or be derived by merging multiple sensor modalities.

In order to train a perception component for a desired perception modality, the perception component is architected so that it can receive a desired form of perception input and provide and a desired form of perception output in response. Further, in order to train a suitably-architected perception component based on supervised learning, annotations need to be provided which accord to the desired perception modality. For example, to train a 2D bounding box detector, 2D bounding box annotations are required; likewise, to train a segmentation component perform image segmentation (pixel-wise classification of individual mage pixels), the annotations need to encode suitable segmentation masks from which the model can learn; a 3D bounding box detector needs to be able to receive 3D structure data, together with annotated 3D bounding boxes etc.

SUMMARY

Conventionally, annotated training examples have been created by human annotators manually annotating the training examples. Even in the case of 2D images, this can take tens of minutes per image. Hence, creating hundreds of thousands of training images requires very significant time and manual effort, which in turn makes it a costly exercise. In practice, it imposes a limit on the number of training images that can realistically be provided, which in turn can be detrimental to the performance of a perception component trained on the limited number of images. Manual 3D annotations are significantly more burdensome and time consuming. Moreover, the problem is only exacerbated when there is a need to accommodate multiple perception modalities, as in that event multiple forms of annotation data (e.g. two or more of 2D bounding boxes, segmentation masks, 3D bounding boxes etc.) may be required in respect of one or more forms of training inputs (e.g. one or more of 2D images, 3D images, point clouds etc.).

The present disclosure pertains generally to a form of annotation tool having annotation functions which facilitate fast and efficient annotation of perception inputs. Such annotation tools may be used to create annotated perception inputs for use in training a perception component. The term annotation tool refers generally to a computer system programmed or otherwise configured to implement those annotation functions or to a set of one or more computer programs for programming a programmable computer system to carry out those functions.

One aspect of the present invention provides a computer-implemented method of creating one or more annotated perception inputs, the method comprising, in an annotation computer system: receiving a plurality of captured frames, each frame comprising a set of 3D structure points, in which at least a portion of a common structure component is captured; computing a reference position within at least one reference frame of the plurality of frames; generating a 3D model for the common structure component by selectively extracting 3D structure points of the at least one reference frame based on the reference position within that frame; determining an aligned model position for the 3D model within a target frame of the plurality of frames based on one or more manual alignment inputs received in respect of the target frame at a user interface whilst rendering the 3D model for manually aligning the 3D model with the common structure component in the target frame; and storing annotation data of the aligned model position in computer storage, in association with at least one perception input of the target frame for annotating the common structure component therein.

This allows the annotation data to be created for the perception input of the target frame more quickly and more accurately compared with placing a 3D bounding box or other 3D bounding object around the common structure component in the target frame. This is because it is much easier for a human annotator to see when the 3D model of the common structure component—as generated from the reference frame(s)—is properly aligned with the common structure component as captured in the target frame. The method exploits the fact that a position (location and/or orientation) of the common structure component in the reference frame(s) can be used to generate a 3D model of the common structure component from the reference frame(s), which in turn can be aligned with the common structure component in the target frame to determine the position of the common structure component in the target frame.

The method uses "self-contained" modelling, whereby the 3D model is generated using 3D structure points from one or more of the frames themselves. Hence the method is flexible enough to be applied to any form of structure component which is captured in multiple 3D frames.

In embodiments, the method may be applied in an iterative manner, to build up an increasingly high-quality 3D model as frames are annotated, whilst at the same time generating useful annotation data for the frames. For example, an annotator may initially create the 3D model by positioning a 3D bounding box in a single initial reference frame, or the 3D bounding box may be placed automatically (see below). In this example, the "reference position" is the position of the 3D bounding box within that frame. As well as providing annotation data for that frame, a subset of the 3D structure points of that frame can, in turn, be extracted from within the volume of the 3D bounding box and used to generate an initial 3D model. That 3D model can, in turn, be "propagated" into the next frame to be annotated (the target frame), manually or semi-automatically aligned with the common structure component in the target frame—quickly and accurately—which, in turn, provides a position for the 3D bounding box within the target frame as the aligned model position (i.e. the position of the 3D bounding box in the target frame is the position of the 3D model in the target frame at which that model is aligned with the common structure component). From here, the method may proceed in an iterative fashion: the 3D bounding box position within the target frame provides useful annotation data for the target frame; moreover, a subset of the 3D structure points of the target frame (which is now considered a second reference frame) may be extracted from within the volume of the 3D bounding box, and aggregated with those of the initial reference frame to provide a more-complete 3D model, which in turn can be propagated into the next frame to be annotated (the new target frame) for manual or semi-automatic alignment, and so on.

The annotation data may be 2D or 3D annotation data, or a combination of both.

The 3D annotation data may comprise position data of the aligned model position, which acts to define a position of a 3D bounding object (e.g. 3D bounding box), in 3D space, with respect to the perception input of the target frame. 2D annotation data may, for example, be created based on a computed projection of the 3D model into an image plane of the target frame; or a computed protection of a new 3D model where the new 3D model is generated using 3D structure points selectively extracted from the target frame based on the aligned model position (e.g. an aggregate 3D model, generated by aggregating the selectively-extracted points of the target and reference frames).

The 2D annotation data may comprise a 2D bounding box (or other 2D bounding object) for the structure component, which is fitted to the computed projection in the image plane of the 3D model. Advantageously, fitting the 2D bounding box to the projection of the 3D model itself can provide a tight 2D bounding box, i.e. which is tightly aligned with an outer boundary of the structure component as it appears in the image plane. An alternative approach would be to determine a 3D bounding box (or other 3D bounding object) for the common structure component in 3D space and project the 3D bounding object into the image plane; however, in most practical contexts, this would not be able to provide a tight 2D bounding box in the image plane: even if the 3D bounding object is tightly fitted in 3D space, there is no guarantee that the boundary of the projected 3D bounding box will align with the outer boundary of the structure component itself as it appears in the image plane.

Further or alternatively, the 2D annotation data may comprise a segmentation mask for the structure component. By projecting the 3D model itself into the image plane, a segmentation mask may be provided which labels (annotates) pixels of the image plane within the outer boundary of the model projection as belonging to the structure component, and pixels outside of the outer boundary as not belonging to the structure component. Note that a degree of processing may be applied to the computed projection in order to provide a useful segmentation mask. For example, areas of the projection may be "smoothed" or "filled in" to reduce artefacts caused by noise, sparsity etc. in the underlying frame from which the 3D model is generated. In that case, the outer boundary of the computed projection refers to the outer boundary after such processing has been applied.

The 3D model may comprise the selectively-extracted structure points themselves and/or a 3D mesh model or other 3D surface model fitted to the selectively-extracted points. When a 3D surface model is used to create a segmentation mask, it is the outer boundary of the projected 3D surface model that defines the segmentation mask (subject to any post-processing of the computed projection). A 3D surface model is one means of providing a higher quality segmentation mask.

In general, denoising and/or refinement may be applied to one or both of the 3D model (before it is projected) and the computed projection. This may involve one or more of noise filtering (to filter out noise points/pixels, e.g. having an insufficient number of neighbouring points/pixels within a defined threshold distance), predictive modelling etc. For predictive modelling, a predictive model is applied to existing points (resp. pixels) of the 3D model (resp. projection), on the assumption that 3D model (rep. projection) is incomplete or otherwise incorrect. The existing points (resp. pixels) serve as a "prior" from which a correct 3D model (resp. projection) is inferred. This may have the effect of adding additional points/pixels or removing points/pixels determined to be incorrect (hence predictive modelling can be used both to predict missing points/pixels and/or as a means of noise filtering).

In some embodiments, the 3D model is an aggregate model derived from multiple frames. For each of the multiple frames, a reference position is computed for that frame, and used to selectively-extract 3D structure points from that frame. The 3D structure points extracted from the multiple frames are aggregated to generate an aggregate 3D model. Aggregate 3D models have various benefits. For example, such models can account for occlusion or other forms of partial data capture, and also data sparsity and noise. Regarding the latter, aggregating over multiple frames means that noise artefacts can be more easily identified and corrected (e.g. stray noise points will on average be materially sparser than points which actually belong to the structure component in question, and can thus be filtered out more reliably; the increased density of the points which do belong to the structure component in question will also provide a stronger prior for predictive modelling etc.). Hence, there are particular benefits of aggregate 3D models applied in conjunction with noise reduction.

In preferred embodiments, the annotation tool provides annotation data for multiple perception modalities (e.g. both 2D and 3D annotation) and/or for multiple frames based on a set of common annotation operations (which may be manual, automatic or semi-automatic). That is, the same operations are leveraged to provide annotation data for multiple perception modalities and/or for multiple frames. There are various ways in which the present annotation functions may be leveraged in this manner, including but not limited to the following examples.

For the sake of illustration only, an example annotation workflow is provided. The following example considers two frames for the sake of simplicity. It will of course be appreciated that an aggregate model may be generated across a greater number of frames. Indeed, by aggregating across many frames, a high-quality aggregate model (dense and low-noise) may be obtained, which in turn may be used to efficiently generate high-quality annotation data for those frames (and/or other frames in which the common structure component is captured).

Example 1—context: A 3D bounding box (or other bounding object) is accurately positioned within a first frame to bound a particular structure component. Assuming the 3D bounding object is positioned (e.g. located and oriented) using one or more forms of "external" input, i.e. that would not be available to a perception component at runtime, then it provides useful ground truth for the purposes of supervised training. In the simplest case, the 3D bounding object could be positioned manually (i.e. the external input is provided by a human input); however, it may also be positioned automatically, by exploiting contextual information such as a measured or assumed path of the structure component (in that case, the external input comes from the known or assumed path). The position and (where applicable) dimensions of the 3D bounding box within the first frame can, in turn, be stored as 3D annotation data for a first perception input of the first frame (i.e. a perception input which comprises is derived from, or otherwise corresponds to at least part of that frame).

Example 1-3D to 2D; same frame: Moreover, now that the 3D bounding box has been accurately positioned, it can be used as a basis for generating a 3D model of the desired structure component. For a tightly fitted and accurately placed 3D bounding object, the intersection of the first frame with the volume of the 3D bounding box may be used as a basis for the model (i.e. the 3D structure points within the volume of the 3D bounding box may be extracted to generate the 3D model). In this case, the "reference position" referred to above is computed as the position of the 3D bounding box within the first frame. (Note, as explained below, it is not in fact necessary for the bounding box to be tightly fitted initially—a "coarse" bounding box can also be used at least initially). 2D annotation data may now be generated immediately for the first frame: an aligned position for the 3D model within the first frame (i.e. a position such that the 3D model is aligned with the structure component in that frame) is already known to be the position of the 3D bounding box. Hence, the 3D model can be projected into a desired image plane based on that position, and the resulting projection used as a basis for one or more forms of 2D annotation data. Such 2D annotation data may be stored in association with the above first perception input of the first frame, or another perception input of the first frame. For example, the 3D annotation data may be stored in association with a point cloud of the first frame, and the 2D annotation data may be stored in association with a 2D image of the first frame (e.g. a colour component associated with a depth component, where the first frame comprises or is derived from at least the depth component).

Example 1—model propagation: What is more, that same 3D model can now be propagated into a second frame in which the same structure component is at least partially captured. By aligning the 3D model with the common structure component in the second frame (manually or semi-automatically)—i.e. positioning and/or reorienting the 3D model so that its structural elements and/or visible features etc. are aligned with corresponding structural elements, features etc. of the common structure component in the second frame—an aligned position for the 3D model within the second frame is determined.

Example 1—model propagation; 3D to 3D: The position of the 3D bounding box relative to the 3D model is inherently known as a consequence of deriving the 3D model based on the position of the 3D bounding box in the first frame. For example, the 3D structure points of the 3D model may be defined in a frame of reference of the 3D bounding box—see below. Hence, by accurately positioning the 3D model within the second frame (to align it with the common structure component), an accurate position for the 3D bounding box in the second is now known as the aligned model position in the second frame. For a rigid object, the same bounding box dimensions can be applied in the first and second frame. In other words, the bounding box positioned within the first frame is propagated into and correctly positioned in the second frame, by propagating the 3D model into the second frame and aligning it with the common structure component. Now that the position of the bounding box has been accurately determined within the second frame, that position can stored (together with the bounding box dimensions as applicable) as 3D annotation data for a second perception input of the second frame (i.e. a perception input which comprises is derived from, or otherwise corresponds to at least part of the second frame). As noted, the alignment can be manual, automatic or semi-automatic. In the case of manual alignment, it is significantly easier to accurately align a 3D model with the corresponding structure component by eye (based on characteristic structural elements, features etc.) than it is to position a second bound box in the second frame "from scratch". Moreover, in the case of a rigid object, the same bounding box dimensions can be applied across all frames, so these do not need to be defined separately for every frame in that event.

Example 1—model propagation; 3D to 2D: Finally, now that the aligned model position (or, equivalently in this context, the 3D bounding box position) is known within the second frame, 2D annotation data may be create for the second frame by projection in analogous manner. This can be based on (i) a projection of the propagated model into a desired image plane, (ii) a projection of a second 3D model which is determined in the same way but by selectively extracting 3D structure points of the second frame from within the volume of the bounding box in the second frame (which has been correctly positioned using the 3D model derived from the first frame), or (iii) an aggregate model as generated by aggregating such selectively extracted points of the second frame with those of the first frame (and possibly many other frames to build a dense aggregate model). Such 2D annotation data may be stored in association with the above second perception input of the second frame or another perception input of the second frame.

In Example 1, it can be seen that, in respect of the first frame, the operations of positioning of the 3D bounding object within the first frame are leveraged to generate both 2D and 3D annotation data for the first frame. Moreover, those same operations are leveraged, in conjunction with the operations of aligning the 3D model in the second frame, to additionally provide 3D and 2D annotation data for the second frame. Two frames are described by way of example, but it will be appreciated that the principles can be applied to a greater number of frames, thus providing even more significant performance benefits in terms of annotation time and efficiency.

As will be appreciated, Example 1 above is one of many efficient annotation workflows facilitated by certain embodiments the present annotation tool. That example serves only to illustrate certain features of the annotation tool and not to define or limit the scope of the present invention. Further examples are described hereinbelow for the same purpose.

The present annotation tool is particularly suitable for annotating time-sequenced frames, i.e. one or more time sequences of frames captured over a time interval, typically at regular and relatively short intervals. Such a time sequence of frames may be referred to herein as a "3D video sequence", noting that each frame comprises 3D structure points, i.e. points which capture structure in 3D space. An example application is the annotation of 3D video sequences captured by a travelling vehicle or other mobile object, in order to provide annotated perception inputs that are highly suited to training one or more perception components for use in an autonomous vehicle or other mobile robot. For example, such frames may capture urban or non-urban road scenes, which in turn may be annotated to mark road structure, other vehicles, pedestrians, cyclists and any other form of structure component that an autonomous vehicle needs to be capable of perceiving and responding to.

A "frame" in the present context refers to any captured 3D structure representation, i.e. comprising captured points which define structure in 3D space (3D structure points), and which provide a static "snapshot" of 3D structure captured in that frame (i.e. a static 3D scene). The frame may be said to correspond to a single time instant, but does not necessarily imply that the frame or the underlying sensor data from which it is derived need to have been captured instantaneously—for example, LiDAR measurements may be captured by a mobile object over a short interval (e.g. around 100 ms), in a LiDAR sweep, and "untwisted", to account for any motion of the mobile object, to form a single point cloud. In that event, the single point cloud may still be said to correspond to a single time instant, in the sense of providing a meaningful static snapshot, as a consequence of that untwisting, notwithstanding the manner in which the underlying sensor data was captured. In the context of a time sequence of frames, the time instant to which each frame corresponds is a time index (timestamp) of that frame within the time sequence (and each frame in the time sequence corresponds to a different time instant).

The terms "object" and "structure component" are used synonymously in the context of an annotation tool refers to an identifiable piece of structure within the static 3D scene of a 3D frame which is modelled as an object. Note that under this definition, an object in the context of the annotation tool may in fact correspond to only part of a real-world object, or to multiple real-world objects etc. That is, the term object applies broadly to any identifiable piece of structure captured in a 3D scene.

Regarding further terminology adopted herein, the terms "orientation" and "angular position" are used synonymously and refer to an object's rotational configuration in 2D or 3D space (as applicable), unless otherwise indicated. As will be apparent from the preceding description, the term "position" is used in a broad sense to cover location and/or orientation. Hence a position that is determined, computed, assumed etc. in respect of an object may have only a location component (one or more location coordinates), only an orientation component (one or more orientation coordinates) or both a location component and an orientation component. Thus, in general, a position may comprise at least one of: a location coordinate, and an orientation coordinate. Unless otherwise indicated, the term "pose" refers to the combination of an object's location and orientation, an example being a full six-dimensional (6D) pose vector fully defining an object's location and orientation in 3D space (the term 6D pose may also be used as shorthand to mean the full pose in 3D space).

The terms "2D perception" and "3D perception" may be used as shorthand to refer to structure perception applied in 2D and 3D space respectively. For the avoidance of doubt, that terminology does not necessarily imply anything about the dimensionality of the resulting structure perception output—e.g. the output of a full 3D bounding box detection algorithm may be in the form of one or more nine-dimensional vectors, each defining a 3D bounding box (cuboid) as a 3D location, 3D orientation and size (height, width, length—the bounding box dimensions); as another example, the depth of an object may be estimated in 3D space, but in that case a single-dimensional output may be sufficient to capture the estimated depth (as a single depth dimension). Moreover, 3D perception may also be applied to a 2D image, for example in monocular depth perception.

In embodiments, the annotation data of the aligned model position may comprise position data of the aligned model position for annotating a position of the common structure component in the at least one perception input of the target frame.

The position data may be 3D position data for annotating the position of the common structure component in 3D space.

The annotation data of the aligned model position may comprise annotation data derived from the 3D model using the aligned model position.

The derived annotation data may be 2D annotation data derived by projecting the 3D model into an image plane based on the aligned model position. Alternatively, the 2D annotation data may be derived by projecting, into the image plane, a single-frame or aggregate 3D model generated by selectively extracting 3D structure points from the target frame based on the aligned model position.

The 2D annotation data may comprise at least one of: a 2D bounding object fitted to a projection of the 3D model, or of the singe-frame or aggregate 3D model, in the image plane, and a segmentation mask for the common structure component.

The reference position may be computed for the reference frame based on one or more positioning inputs received in respect of the reference frame at the user interface whilst rendering a visual indication of the reference position within the reference frame for manually adjusting the reference position within the reference frame.

The reference position may be computed for the reference frame automatically or semi-automatically.

The reference position may be computed automatically or semi-automatically by applying a perception component to the reference frame.

The frames may be time sequenced, and the reference position may be computed automatically or semi-automatically based on a common structure component path within a time interval of the time-sequenced frames.

One or more bounding object dimensions may be determined for the common structure component, wherein the one or more bounding object dimensions may be one of: (i) manually-determined based on one or more sizing inputs received at the user interface in respect of the reference frame, (ii) automatically-determined by applying a perception component to the reference frame, (iii) semi-automatically-determined by applying the perception component to the reference frame and further based on the one or more sizing inputs received in respect of the reference frame, and (iv) assumed.

The selectively-extracted 3D structure points of the reference frame may be selectively extracted therefrom for generating the 3D model based on the reference position computed within the reference frame and the one or more bounding object dimensions.

The selectively-extracted 3D structure points may be a subset of points within a 3D volume defined by the reference position and the one or more bounding object dimensions.

The annotation data for the at least one perception input of the target frame may further comprise: the one or more bounding object dimensions for annotating a rigid common structure component, or a transformation of the one or more bounding object dimensions for annotating a non-rigid common structure component.

The one or more bounding objects dimensions may be determined manually or semi-automatically based on the one or more sizing inputs received in respect of the reference frame, wherein the visual indication of the reference position may be in the form of a 3D bounding object rendered at the reference position within the reference frame and having said one or more bounding object dimensions for manually adjusting those one or more bounding object dimensions.

The one or more bounding object dimensions may be computed based additionally on one or more adjustment inputs received at the user interface in respect of the target frame whilst rendering the 3D bounding object at the aligned model position within the target frame; wherein the 3D bounding object may be simultaneously or subsequently rendered at the reference position within the reference frame with the one or more bounding object dimensions adjusted according to the one or more adjustment inputs received in respect of the target frame.

The annotation data may comprise both 2D annotation data of the aligned model position and 3D annotation data of the aligned model position stored in association with one or more perception inputs of the target frame, whereby the aligned model position is used for both 2D and 3D annotation.

Further annotation data of the reference position may be stored for annotating the common structure component in at least one perception input of the reference frame, whereby the reference position computed within the reference frame may be used for annotating perception inputs of both the target and reference frames.

The further annotation data may comprise the same one or more bounding object dimensions for annotating a rigid common structure component, or a transformation thereof for annotating a non-rigid common structure component.

The 3D model may be an aggregate 3D model determined by aggregating the selectively extracted data points of the reference frame with data points extracted from at least one of: the target frame, and third of the frames other than the target and reference frames.

The above perception component may be a trained perception component, which is re-trained using the at least one perception input of the target frame and the annotation data.

The method may comprise the step of using the or each perception input in a training process to train at least one perception component, wherein the annotation data for that perception input provides a ground truth for that perception input in the training process.

The set of 3D structure points for each frame may be in the form of a point cloud.

The set of 3D structure points of the reference frame may be transformed into a frame of reference of the reference position in order to selectively-extract the 3D structure points for the 3D model.

The 3D volume defined by the reference position and the one or more bounding object dimensions may be a cuboid aligned with coordinate axes of the frame of reference.

The aligned model position may be determined semi-automatically by initially estimating the model position automatically, and then aligning the estimated model position according to the one or more manual alignment inputs.

The model position may be initially estimated by applying a structure perception component to the target frame.

The frames may be time sequenced, and the model position may be initially estimated based on a common structure component path within a time interval of the time-sequenced frames.

The model position may be initially estimated based on an automatic alignment of the 3D model with the common structure component in the target frame.

Further aspects of the present disclosure provide a computer system comprising one or more computers programmed or otherwise configured to carry out any of the steps disclosed herein, and one or more computer programs embodied on transitory or non-transitory media for programming a computer system to carry out such steps.

The computer system may be embodied in a robotic system (e.g. an autonomous vehicle or other mobile robot), or as a simulator.

BRIEF DESCRIPTION OF FIGURES

For a better understanding of the present invention, and to show how embodiments of the same may be carried into effect, reference is made by way of example only to the following Figures in which:

FIGS. 7A-8E shows various examples of a graphical user interface (GUI) rendered by an annotation computer system when annotating a time sequence of 3D road scenes;

FIGS. 10A to 12C shows further examples of the annotation system GUI, and in particular show how a generated object model may be applied to create annotations in a time sequence of 3D road scenes;

DETAILED DESCRIPTION

Embodiments of the present invention are described in detail below. First, some useful to the described embodiments is provided.

Figure 1:
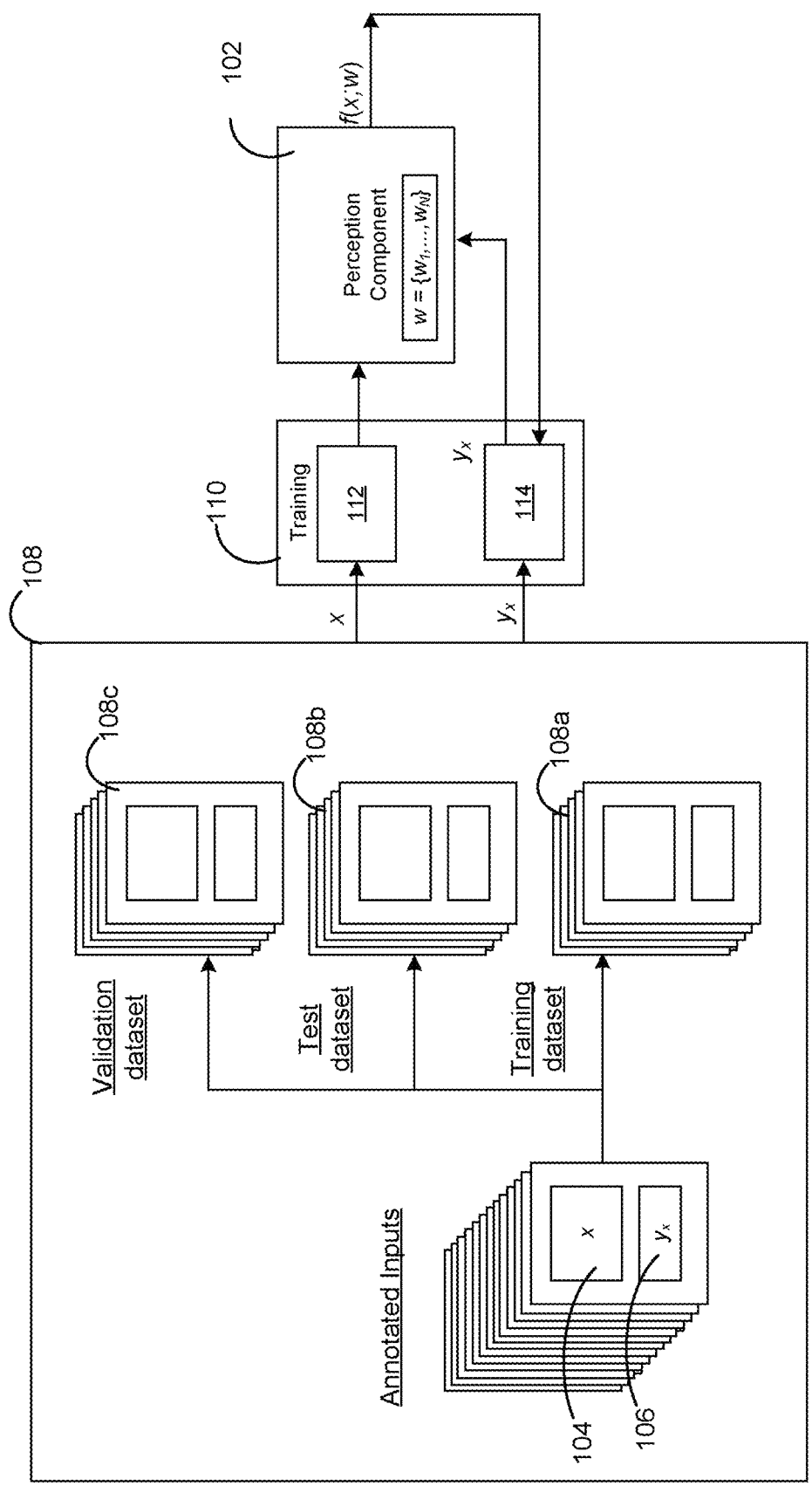
FIG. 1 shows a highly schematic function block diagram of a training system for training a perception component.

FIG. 1 shows a highly schematic function block diagram of a supervised training system for training a perception component 102 based on a set of annotated perception inputs 108 (that is, perception inputs together with associated annotation data). The perception component 102 may be referred to synonymously as a structure detector, structure detection component or simply a structure detector in the following description. As noted, perception inputs used for the purpose of training may be referred to herein as training examples or training inputs.

In FIG. 1, a training example is denoted by reference numeral 104 and a set of annotation data associated therewith is denoted by reference numeral 106. The annotation data 106 provides a ground truth for the training example 104 with which it is associated. For example, for a training example in the form of an image, the annotation data 106 may mark the location(s) of certain structure component within the image 104, such as roads, lanes, junctions, non-drivable areas etc. and/or objects within the images, such as other vehicles, pedestrians, street signage or other infrastructure etc.

The annotated perception inputs 108 may be divided into training, test and validation sets, labelled 108a, 108b and 108c respectively. An annotated training example may thus be used for training the perception component 102 without forming part of the training set 108a because it is used for testing or validation instead.

The perception component 102 receives a perception input, denoted x, from one of the training, test and validation sets 108a, 108b, 108c, and processes the perception input x in order to provide a corresponding perception output denoted by $y=f(x;w)$.

In the above, w denotes a set of model parameters (weights) of the perception component 102, and f denotes a function defined by the weights w and the architecture of the perception component 102. For example, in the case of 2D or 3D bounding box detection, the perception output y may comprise one or more detected 2D or 3D bounding boxes derived from the perception input x; in the case of instance segmentation, y may comprise one or more segmentation maps derived from the perception inputs. In general, the format and content of the perception output y depends on the choice of perception component 102 and its chosen architecture, and those choices are, in turn, made in accordance with the desired perception modality or modalities for which it is to be trained.

The detection component 102 is trained based on the perception inputs of the training set 108a so as to match its output $y=f(x)$ to the ground truth provided by the associated annotation data. The ground truth provided for perception input x is denoted $y_x$ herein. So, for the training example 104, the ground truth is proved by the associated annotation data 106.

This is a recursive process, in which an input component 112 of a training system 110 systematically provides perception inputs of the training set 108b to the perception component 102, and a training component 114 of the training system 110 adapts the model parameters w in an attempt to optimize an error (cost) function that penalizes deviation of each perception output $y=f(x; w)$ from the corresponding ground truth $y_x$. That deviation is characterized by a defined metric (such as mean square error, cross-entropy loss etc.). Hence, by optimizing the cost function to a defined extent, an overall error across the training set 108a as measured with respect to the ground truths can be reduced to an acceptable level. The perception component 102 can for example be a convolutional neural network, where the model parameters w are weightings between neurons, but the present disclosure is not limited in this respect. As will be appreciated, there are numerous forms of perception model which may be usefully trained on suitably annotated perception inputs.

The test data 108b is used to minimize over-fitting, which refers to the fact that, beyond a certain point, increasing the accuracy of the detection component 102 on the training dataset 108a is detrimental to its ability to generalize to perception inputs it has not encountered during training. Overfitting can be identified as the point at which increasing the accuracy of the perception component 102 on the training data 108 reduces (or does not increase) its accuracy on the test data, with accuracy being measured in terms of the error function. The aim of training is to minimize the overall error for the training set 108a to the extent it can be minimized without overfitting.

The validation dataset 108c can be used to provide a final assessment of the detection component's performance, if desired.

Training is not the only application of the present annotation techniques. For example, another useful application is scenario extraction, where annotation is applied to 3D data in order to extract a scenario that can be run in a simulator. For example, the present annotation techniques may be used to extract traces for annotated objects (path and motion data) that allows their behaviour to be replayed in a simulator.

Figure 2:
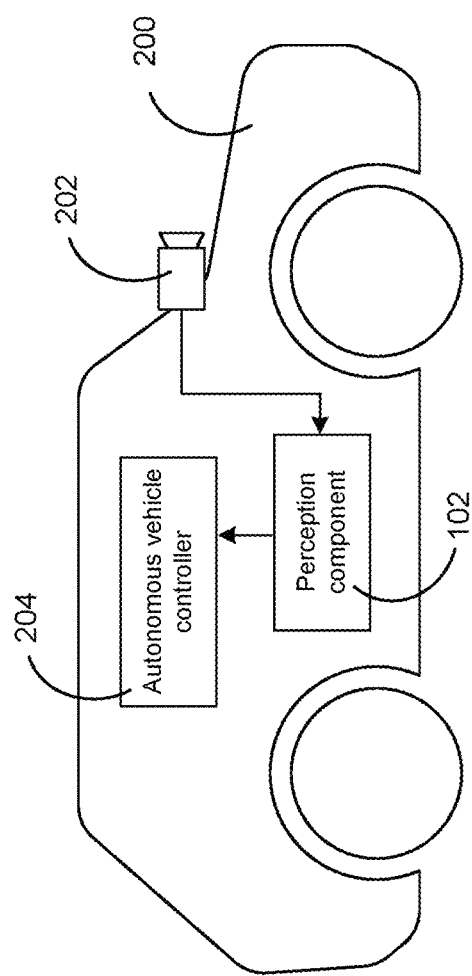
FIG. 2 shows a highly schematic block diagram of an autonomous vehicle.

FIG. 2 shows a highly-schematic block diagram of an autonomous vehicle 200, which is shown to comprise an instance of the trained perception component 102, having an input connected to at least one sensor 202 of the vehicle 200 and an output connected to an autonomous vehicle controller 204.

In use, the (instance of the) trained perception component 102 of the autonomous vehicle 200 interprets structure within perception inputs captured by the at least one sensor 202, in real time, in accordance with its training, and the autonomous vehicle controller 204 controls the speed and direction of the vehicle based on the results, with no or limited input from any human driver.

Although only one sensor 202 is shown in FIG. 2, the autonomous vehicle 102 could be equipped with multiple sensors. For example, a pair of image capture devices (optical sensors) could be arranged to provide a stereoscopic view, and the road structure detection methods can be applied to the images captured from each of the image capture devices. Other sensor modalities such as LiDAR, RADAR etc. may alternatively or additionally be provided on the AV 102.

As will be appreciated, this is a highly simplified description of certain autonomous vehicle functions. The general principles of autonomous vehicles are known, therefore are not described in further detail.

In order to train the perception component 102 for use in the context of FIG. 2, training examples can be captured using the same vehicle or a similarly-equipped vehicle, so as to capture training examples which closely correspond to the form (or forms) of runtime input the trained perception component 102 will need to be able to interpret onboard the AV 200 at runtime. Such training examples may be captured using an autonomous or non-autonomous vehicle, having an identical or merely similar sensor arrangement. In the present context, in which 3D frames are used as a basis for creating annotated training examples, at least one 3D sensor modality is needed, but noting that said term applies broadly to any form of sensor data in which a useful amount of depth information is captured, including LiDAR, RADAR, stereo imaging, time-of-flight, or even monocular imaging (in which depth information is extracted from single images—in that case, a single optical sensor is sufficient for capturing the underlying sensor data of perception inputs to be annotated).

Moreover, the techniques described herein can be implemented off-board, that is in a computer system such as a simulator which is to execute path planning for modelling or experimental purposes. In that case, the sensory data may be taken from computer programs running as part of a simulation stack. In either context, the perception component 102 may operate on sensor data to identify objects. In a simulation context, a simulated agent may use the perception component 102 to navigate a simulated environment, and agent behavior may be logged and used e.g. to flag safety issues, or as a basis for redesigning or retraining component(s) which have been simulated.

Embodiments of the invention will now be described.

Figure 3:
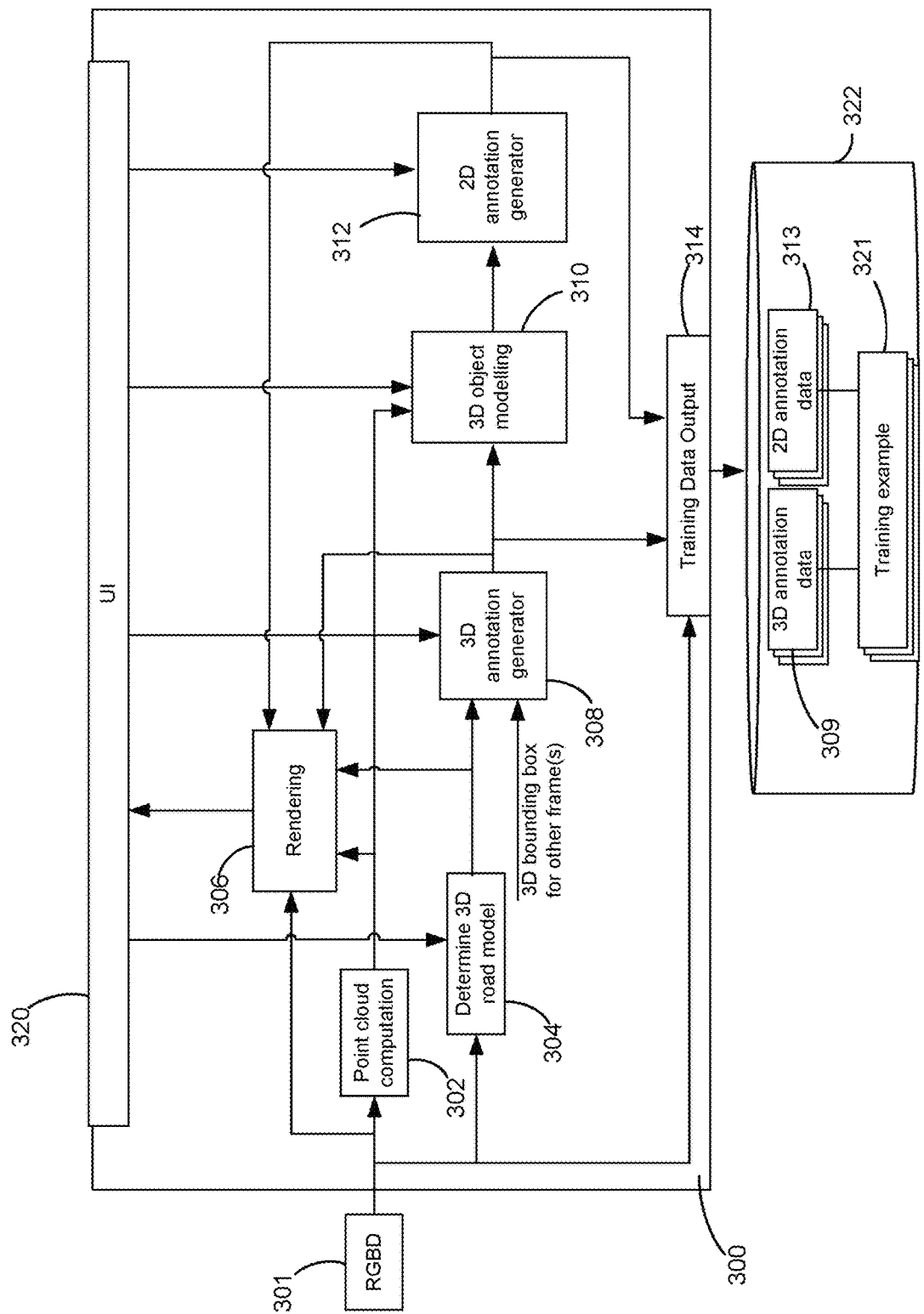
FIG. 3 shows a schematic functional block diagram of an annotation computer system.

FIG. 3 shows a functional block diagram of an annotation computer system 300 which may be referred to as the annotation system 300 for brevity. The purpose of the annotation system 300 is to create annotated (labelled) data of the kind that may be used to train a machine learning component, such as a 2D or 3D structure detector (e.g. a 2D segmentation component, a 2D bounding box detector or a 3D bounding box detector). Such data may be referred to as training data, and a training data output component 314 of the annotation system 300 provides annotated training data in the form of a set of training examples having annotation data associated therewith.

Each training example 321 is in the form of a structure representation (such as a 2D or 3D image, point cloud, or other set of sensor data in which structure is captured). Each training example 321 is associated with 2D annotation data 313 and/or 3D annotation data 309 created using the annotation system 300. 2D annotation data means annotation data defined in a 2D plane (or other 2D surface). For example, 2D annotation data may be defined in an image plane for annotating 2D structure within the image plane. 3D annotation data means annotation data defined in 3D space for annotating 3D structure captured in a depth map, point cloud or other 3D structure representation. Each training example 321 and the 2D/3D annotation data associated 313/309 therewith is stored in electronic storage 322 accessible to the annotation computer system 300. The electronic storage 322 is a form of computer memory, and each training example 321 and its associated annotation data is stored in a persistent region thereof, in which it persists thereafter and from which it may be exported or otherwise obtained for other purposes, such as training one or more perception components (e.g. in an external training system).

As described below, various annotation functions are provided which allow such annotation data to be generated automatically or semi-automatically, thereby increasing the speed at which such data can be created and reducing the amount of required human effort.

The annotation functions are generally represented in FIG. 3 by a point cloud computation component 302, a road modelling component 304, a rendering component 306, a 3D annotation generator 308, an object modelling component 310 and a 2D annotation data generator 312. The annotation system 300 is also shown to comprise a user interface (UI) 320 via which a user (human annotator) can interface with the annotation system 300. An annotation interface, also referred to as an annotation tool herein, is provided via the UI 320 for accessing the annotation functions.

The annotation system 300 is also shown having an input for receiving data to be annotated, which in the present example takes the form of a time series of frames 301.

In the following examples, each frame is in the form of an RGBD (Red Green Blue Depth) image captured at a particular time instant. An RGBD image has four channels, three of which (RGB) are colour channels (colour component) encoding a "regular" image, and the fourth of which is a depth channel (depth component) encoding depth values for at least some pixels of the image. RGB is referred to by way of example however the description applies more generally to any image having colour and depth components (or, indeed, to images having only depth components). In general, the colour component of an image can be encoded in any appropriate colour space using one or more colour channels (including grayscale/monochrome). The point cloud computation component 302 converts each frame to point cloud form to allow that frame to be annotated in 3D space. More generally, a frame corresponds to a particular time instant and may refer to any set of data in which a static "snapshot" structure, i.e. a static 3D scene, has been captured for that time instant (such as multiple RGBD images, one or more point clouds etc.). Hence, all description pertaining to RGBD images in the following applies equally to other forms of frame. Where the frames are received at the annotation system 300 in point cloud form, the point cloud conversion is unnecessary. Although the following examples are described with reference to point clouds derived from RGBD images, the annotation system can be applied to any modality of point cloud, such as monocular depth, stereo depth, LiDAR, radar etc. A point cloud can also be derived two or more such sense modalities and/or from multiple sensor components of the same or different modalities, by merging the outputs of different sensors. Hence, the term "point cloud of a frame" can refer to any form of point cloud corresponding to a particular time instant, including a frame received at the annotation computer system 300 in point cloud form, a point cloud derived from a frame (e.g. in the form of one or more RGBD images) by the point cloud computation component 302, or a merged point cloud.

As noted, although a frame corresponds to a particular time instant, the underlying data from which the fame is derived may be captured over a (typically short) time interval, and transformed as necessary to account for the passage of time. So the fact that a frame corresponds to a particular time instant (e.g. denoted by a timestamp) does not necessarily imply the underlying data has all been captured simultaneously. Hence, the term frame encompasses point clouds received at time stamps different to the frame e.g. a lidar sweep that is captured over 100 ms is 'untwisted' into a single point cloud for a particular time instant (such as the time that the image was captured). The time series of frames 301 may also be referred to as a video segment (noting that the frames of the video segment need not be images and may for example be point clouds).

Each training example 321 comprises data of at least one frame in the video segment 301. For example, each training example may comprise (a portion and/or component of) an RGBD image of at least one frame or data of the point cloud of at least one frame.

Figure 10:
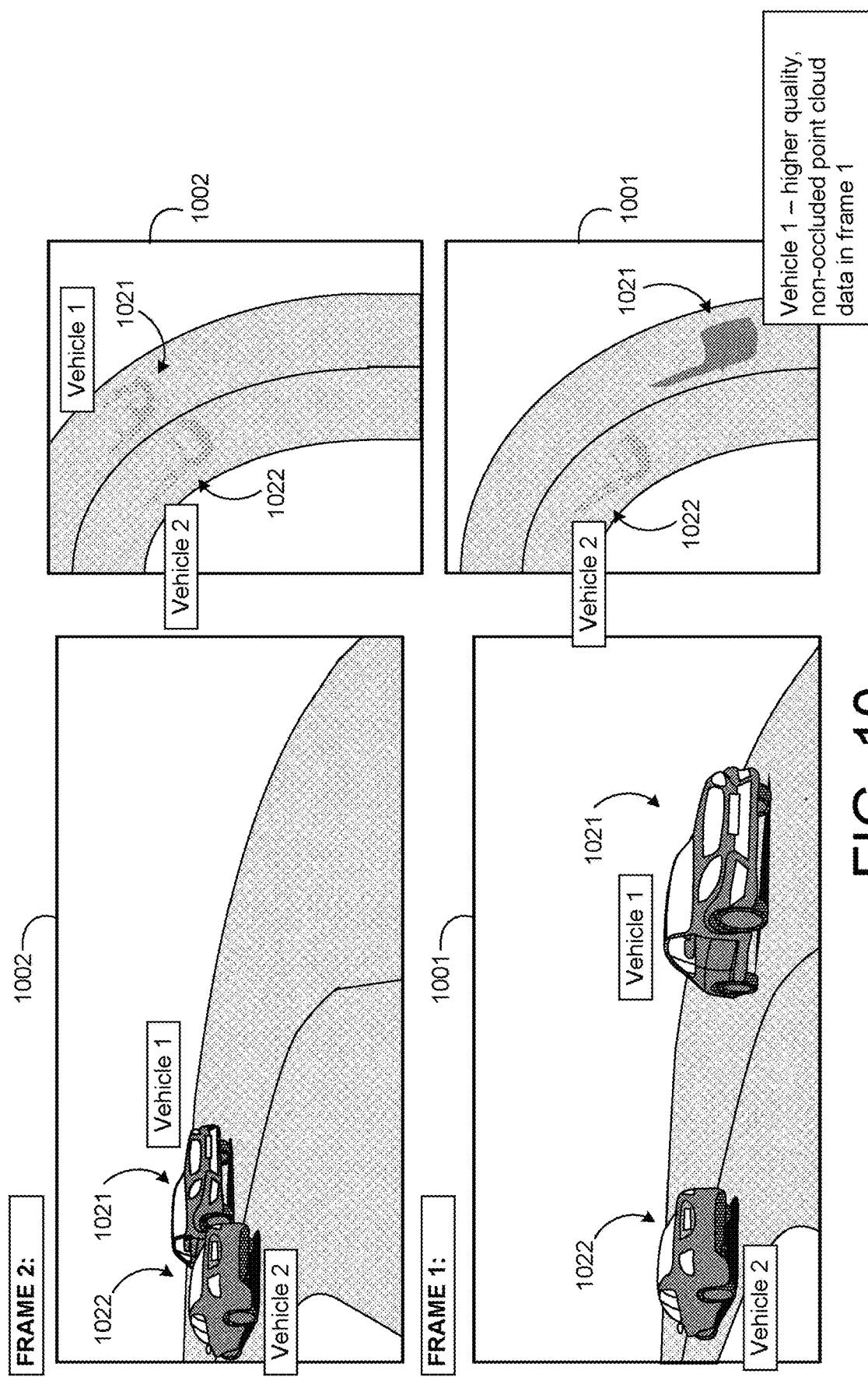

FIG. 10 shows two example frames in the video sequence 301 as described in further detail below. The depicted frames are road scenes as captured by a travelling vehicle. The annotation system 300 is particularly well suited to annotating road scenes, which in turn can be used to effectively train structure detection components for use in autonomous vehicles. However, many of the annotation functions can also be applied equally usefully in other contexts.

A number of annotation functions provided by the annotation system 300 are briefly summarized.

Certain annotation functions are based on "object models", which are 3D models of objects i.e. pieces of structure (structure components) to be annotated. As noted, in the context of the annotation tool, the term object applies generally to any form of identifiable structure modelled as an object within the annotation tool (such as part of a real-world object, multiple real-world objects etc.). The term object is thus used in the following description without prejudice to that broad meaning.

An object model is determined as the intersect of a 3D bounding box with the point cloud of a frame (or frames).

In other words, the 3D modelling component 310 derives an object model of an object to be annotated from one or more frames of the video sequence 301 itself: a 3D bounding box (or other 3D bounding object, such as a template) is placed around the points of the object in question in a particular frame and an object model is obtained by isolating the subset of points, within the point cloud of that frame, that lie within the volume of the 3D bounding box (or, equivalently, the intersection of the 3D bounding box and the point cloud). This inherently provides a location and orientation of the 3D bounding box relative to the 3D object model, which may be encoded as a reference point and orientation vector fixed in a frame of reference of the object model. This is described in further detail below with reference to FIGS. 9A and 9B.

This is achieved quickly by transforming all the points in the point cloud to align with the axis of the bounding box so a simple magnitude comparison can be used to determine if the point is enclosed. This can be implemented highly efficiently on a GPU (Graphics Processing Unit).

Once isolated as an object model in this manner, these points can be used, for example, to:
1. Generate a tight 2D bounding box for the object in question
2. Perform instance segmentation
3. Manually improve the pose of boxes in the distance Responsive noise filtering is achieved by sorting points by K neighbours in a fixed radius (using a 3D tree to first find the K neighbours).

The points may also be accumulated (or otherwise propagated) across frames in order to generate a more complete/dense object model. Improved noise filtering results can be attained with accumulated models, as it will be easier to separated isolated noise points form the points of the object itself as captured across multiple frames.

For example, a refined 3D annotation pose estimate can be obtained by fitting the model to the point cloud of other frame e.g. using an Iterative Closes Point (ICP) algorithm.

Model propagation can also provide improved instance segmentation for distant objects and possibly improved segmentations for nearby objects as well (e.g. in regions which lack depth data).

As well as generating annotations for training data, object models can also be used to augment training examples (i.e. a form of "synthetic" training data). For example, an object may be artificially introduced into a training example and annotated to provide an additional knowledge base from which a structure detection component can learn. This can be used, for example, to create more "challenging" training examples (on which existing models perform poorly) which in turn can provide improved performance for more challenging inputs at inference (i.e. when the model is operational).

Expanding on item 3 listed above, 3D annotation data can, in turn, be generated automatically for a second frame by fitting the 3D object model to the point cloud of the second frame (second point cloud). Since the location and orientation of the 3D bounding box relative to the 3D object model is known, the location and orientation of the 3D bounding box relative to the second point cloud (i.e. in the frame of reference of the second point cloud) can be determined automatically by fitting the 3D object model to the second point cloud. This is described in further detail below with reference to FIGS. 1A-D. This is one example of the way in which a 3D object model from one frame can be "propagated" into a second frame in order to generate annotation data automatically or semi-automatically for the second frame. An underlying assumption is that the object can be treated as a rigid body.

An object model can also be propagated from one frame into a second frame based on a 3D bounding box that has been manually placed or adjusted in the second frame. This provides a visual aid to assist the annotator in placing/adjusting the 3D bounding box in the second frame. In this case, a human annotator sets the location and/or orientation of the 3D bounding box in the second frame. This, in turn, is used to locate and/or orientate the 3D object model in the second frame, based on the fixed location and orientation of the object model relative to the 3D bounding box. As the annotator tweaks the pose (orientation and/or location) of the 3D bounding box in the second frame, the orientation/location of the 3D object model exhibits matching changes to maintain a fixed location and orientation relative to the 3D bounding box. This provides an intuitive way for the annotator to tweak the location/orientation of the 3D bounding box in the second frame in order to align the 3D object model with the actual object to the extent it is visible in the second frame: the annotator can see if the 3D model does not quite line up with the actual object in the second frame and tweak the 3D bounding box as necessary until it does. This may be significantly easier than trying to visually aligning the 3D bounding box directly with the object in question, particularly if the object is partially occluded. This is described in further detail later with reference to FIGS. 11E-G.

These two forms of object propagation are not mutually exclusive: initially, a 3D bounding box may be automatically located and oriented in the second frame by fitting the 3D object model to the point cloud of the second frame, and the annotator may then manually tweak the 3D bounding box to minimize any visible discrepancy between the 3D model and the actual object in the second frame (thereby fine-tuning the location/orientation of the 3D bounding box in the second frame).

The ability to generate and propagate models into different frames may be referred to herein as an "x-ray vision feature" (this name is derived from a specific use case in which a model from another frame(s) is used to "fill in" a partially occluded object region, although model propagation may be applied more generally as described herein).

Expanding on items 1 and 2 listed above, 2D annotation data for an RGBD image (or for e.g. the colour component of that image) is generated by projecting the 3D object model into the image plane of that image. In the simplest case, the subset of the point cloud within a given frame is isolated as above, and that subset of points is projected into the image plane and processed to generate 2D annotation data. The 2D annotation data can for example be in the form of a segmentation mask or 2D bounding box fitted to the projected points. There are also circumstances where it may be useful to generate 2D annotation data in this way but based on a projection of a 3D model propagated from another frame in the manner outlined above. The generation of 2D annotation data is described in further details below with reference to FIGS. 12A-C.

To further assist the annotator, a 3D road model provided by the road modelling component 304 may be used to guide the placement of 3D bounding boxes when annotating road scenes. This is described in detail with reference to FIGS. 8A-E.

First, some useful context to the described embodiments will be described.

Figure 4:
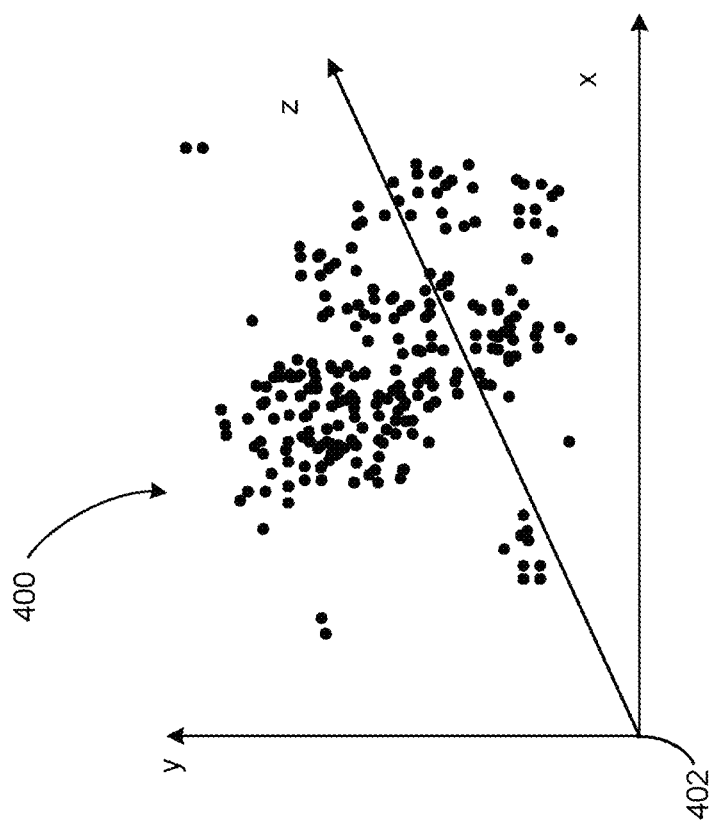
FIG. 4 shows a schematic perspective view of a frame in the form of a point cloud.

FIG. 4 shows a highly schematic perspective representation of a point cloud 400, which is a set of 3D spatial points in a defined frame of reference. The frame of reference is defined by a coordinate system and an origin 402 of the coordinate system within "3D annotation space". In the present example, the frame of reference has a rectangular (Cartesian) coordinate system such that each point of the point cloud is defined by a triplet of cartesian coordinates (x,y,z).

A number of examples are described herein with reference to a "stereo" point cloud, which is to say a point cloud derived from one or more stereo depth maps (although, as noted, the annotation system 300 is not limited in this respect and can be applied to any form of point cloud).

Figure 5:
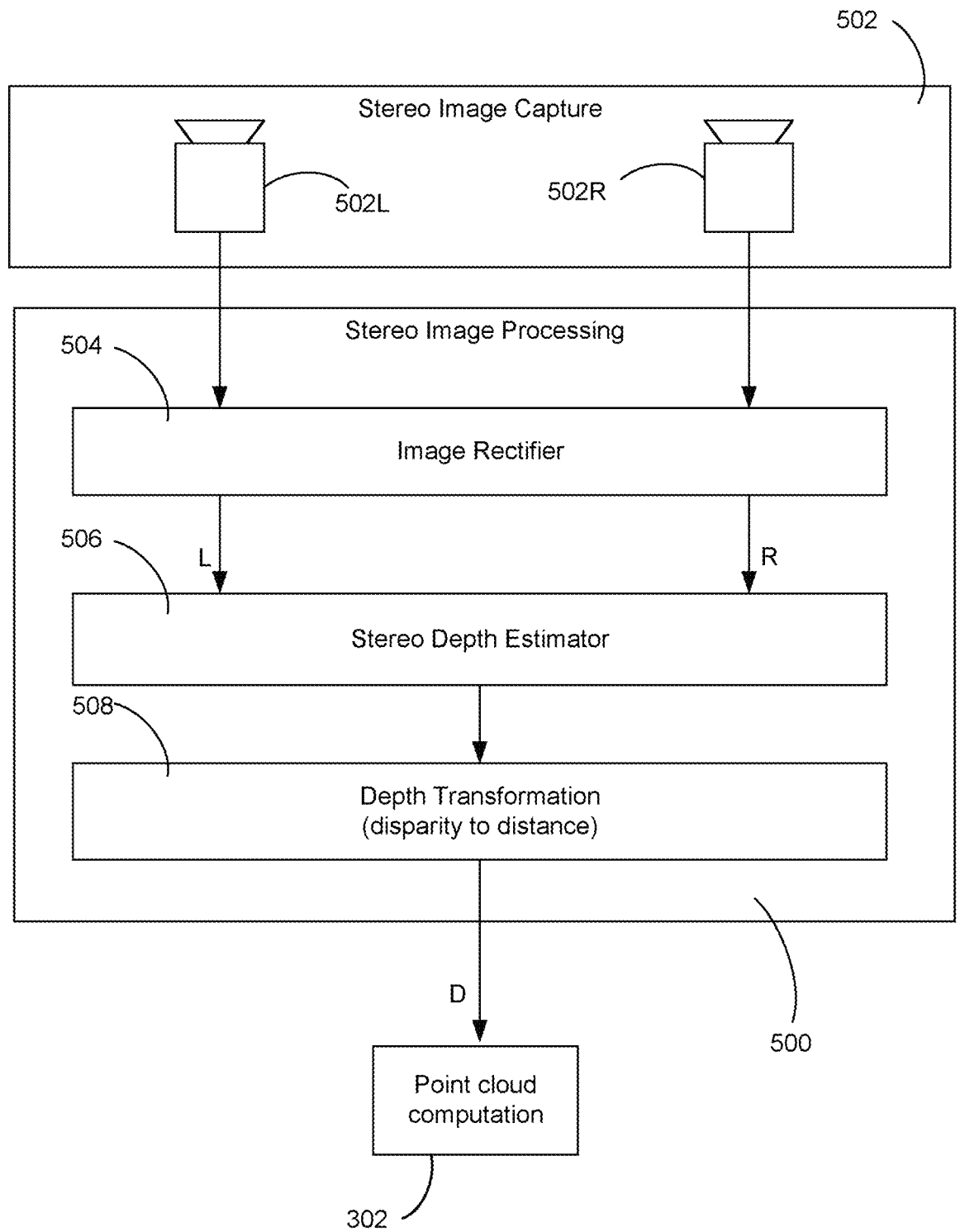
FIG. 5 shows a block diagram of a stereo image processing system.

FIG. 5 shows a highly schematic block diagram of a stereo image processing system 500. The stereo image processing system 500 is shown to comprise an image rectifier 504, a depth estimator 506 and a depth transformation component 508.

The stereo image processing system 500 is shown having inputs to receive left and right images L, R which together constitute a stereo image pair. A stereo image pair consists of left and right images captured simultaneously by left and right optical sensors (cameras) 502L, 502R of a stereo camera system 502. The cameras 502L, 502R have a stereoscopic arrangement, in which the cameras are offset from each other with overlapping fields of views. This mirrors the geometry of human eyes which allows humans to perceive structure in three-dimensions.

A depth map D, as extracted from the left-right image pair L,R, is shown to be provided as an output of the stereo image processing system 500. The depth map D assigns, to each pixel (i,j) of a "target" image of the stereo image pair, an estimated depth $d_{ij}$ In the present example, the target image is the right image R, hence each pixel of the right image R is assigned an estimated depth. The other image—in this case, the left image L—is used as a reference image. The stereo depth map D can for example be in the form of a depth image or image channel, in which the value of a particular pixel in the depth map is the depth assigned to the corresponding pixel of the target image R.

Figure 6:
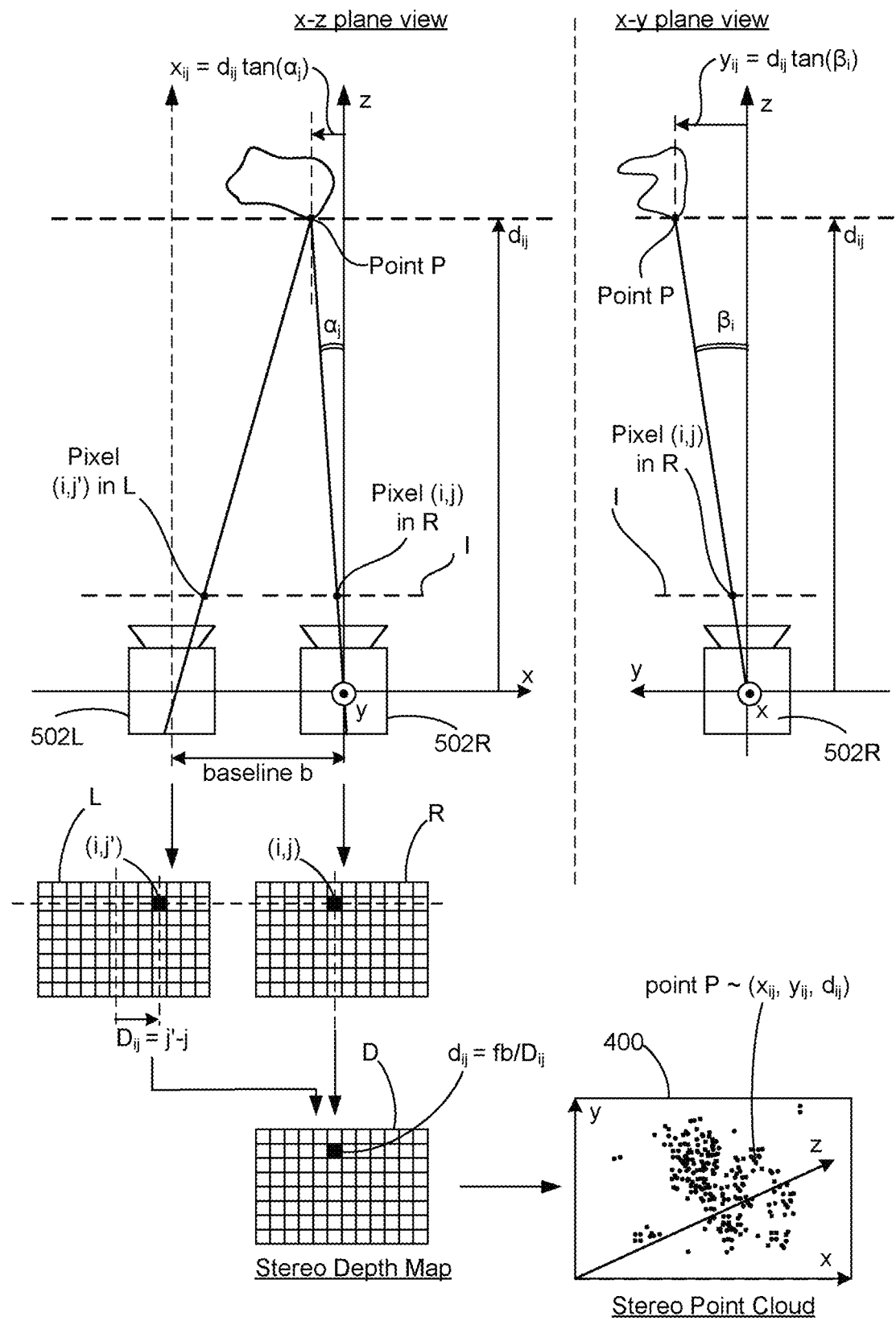
FIG. 6 schematically illustrates certain principles of stereo depth extraction.

With reference to FIG. 6, pixel depth is estimated by the depth estimator 506 applying the principles of stereo imaging.

The top part of FIG. 6 shows schematic views of the image capture system 502 to illustrate the basic principles of stereo imaging. The left-hand side shows a plan view (in the x-z plane) of the cameras 502L, 502R, which are shown to be horizontally separated (i.e., in the x direction) from each other by a distance b (the baseline). The right-hand side shows a side-on view (in the x-y plane) in which only the right camera 502R is visible due to the fact that the cameras 502L, 502R are substantially aligned in the vertical (y) direction. It is noted that, in the present context, the terms vertical and horizontal are defined in the frame of reference of the camera system 502, i.e. vertical means the direction along which the cameras 502L, 502R are aligned, irrespective of the direction of gravity.

By way of example, pixel (i,j) in the left image L and pixel (i,j') in the right image R are shown to correspond to each other in that they each correspond to substantially the same real-world scene point P. Reference sign I denotes the image plane of the captured images L, R in which the image pixels are considered to lie. Due to the horizontal offset between the cameras 502L, 502R, those pixels in the left and right images exhibit a relative "disparity", as illustrated in the lower part of FIG. 6. The lower part of FIG. 6 shows a schematic representation of rectified left and right images L, R as captured by the cameras 502L, 502R and the depth map D extracted from those images. The disparity associated with a given pixel (i,j) in the target image R means the offset between that pixel and the corresponding pixel (i,j') in the reference image L, which is caused by the separation of the cameras 502L, 502R and depends on the depth (distance from the camera 502R along the z axis) of the corresponding scene point P in the real-world.

Thus, depth can be estimated by searching for matching pixels between the left and right images L,R of a stereo image pair: for each pixel in the target image R, a search is performed for a matching pixel in the reference image L. The search for matching pixels can be simplified by an inherent geometric constraint, namely that, given a pixel in the target image, the corresponding pixel will be appear in the reference image on a known "epipolar line". For an ideal stereoscopic system with vertically-aligned image capture units, the epipolar lines are all horizontal such that, given any pixel (i,j) in the target image, the corresponding pixel (assuming it exists) will be vertically aligned i.e. located in the reference image L in the same pixel row (j) as the pixel (i,j) in the target image R. This may not be the case in practice because perfect alignment of the stereo cameras is unlikely. However, image rectification is applied to the images L,R, by the image rectifier 504, to account for any misalignment and thereby ensure that corresponding pixels are always vertically aligned in the images. Hence, in FIG. 5, the depth estimator 506 is shown to receive, from the image rectifier 504, rectified versions of the left and right images L,R from which the depth map may be extracted. Matching can be evaluated based on relative intensities, local features etc. A number of stereo depth extraction algorithms may be applied to estimate the pixel disparities, such as Global Matching, Semi-Global Matching and Local Matching algorithms. In a real-time context, Semi-Global Matching (SGM) generally provides an acceptable trade-off between accuracy and real-time performance.

In the present example, it is assumed that, in the pixel-matching search, pixel (i,j) in the target image R is correctly found to match pixel (i,j') in the reference image L. Hence, the disparity assigned to pixel (i,j) in the right image R is $D_{ij}=j'-j$.

In this manner, a disparity is assigned to each pixel of the target image for which a matching pixel can be found in the reference image (this will not necessarily be all of the pixels in the target image R: there will generally exist a region of pixels at one edge of the target image which are outside of the field of view of the other camera and thus have no corresponding pixels in the reference image; the search may also fail to find a match, or depth values may be pruned if they do not meet certain criteria).

The depth of each such target image pixel is computed initially in disparity space. Each disparity can, in turn, be converted into units of distance using knowledge of the camera intrinsics (focal length f and baseline b) as:

$$d_{ij} = \frac{bf}{D_{ij}}$$

where $d_{ij}$ is the estimated depth of pixel (i,j) in the target image R in units of distance, i.e. the distance between the camera 502R and the corresponding real-world point P along the optical axis of the stereo camera system 502 (z-axis), and $D_{ij}$ is the disparity assigned to pixel (i,j) of the target image R in the pixel-matching search. Hence, in FIG. 5, the depth transformation component 508 is shown to receive the output of the depth extraction component 506 in disparity space and transforms that output into distance space as above in order to provide the depth map D in units of distance. In the lower part of FIG. 6, pixel (i,j) of the depth map is shown to have a value $d_{ij}$, which is the estimated depth, in units of distance, assigned to pixel (i,j) of the target image R.

As noted, in the present example, the right image R is the target image and the left image L is used as the reference image. However, in general, either of the two images can be the target image, with the other used as the reference image. Which image is selected as the target image may be context dependent. For example, in an autonomous vehicle context, in which a stereo camera pair captures images of the road in front of the vehicle, images captured by the camera closest to the centre-line of the road may be used as target images (i.e. right images for left-hand drive vehicles, and left images for right-hand drive vehicles).

Returning briefly to FIG. 4, the origin of the coordinate system 402 corresponds to the location of the optical sensor 502R which captured the target image R at the time the target image R was captured (in this case, the right camera 502R). The z-axis lies parallel to the optical axis of the camera 502R and the x and y axis are aligned, respectively, with the pixel row and column directions of the target image R (i.e. pixel rows, denoted by index i, lie parallel to the x-axis and pixel columns, denoted by index j, lie parallel to the y-axis).

The point cloud 400 can be computed by the point-cloud computation component 302 from the stereo depth map D based on knowledge of the field of view of the camera 502R. As shown in the top-part of FIG. 6, pixels in column i of the target image R correspond to a set of angular directions within the camera's field of view defined by angle $\alpha_j$ in the x-z plane. Similarly, pixels in row j of the target image R correspond to a set of angular directions within the camera's field of view and defined by angle $\beta_j$ in the x-y plane. Hence, pixel (i,j) of the target image R corresponds to the angular direction defined by the angle pair $(\alpha_j, \beta_i)$. Once the depth of pixel (i,j) is known, the location of the corresponding real-world point in 3D space—denoted by 3D spatial point $(x_{ij}, y_{ij}, z_{ij})$—can thus be computed based on that depth $d_{ij}$ and the angular direction $(\alpha_j, \beta_i)$ to which that pixel corresponds. The angles $\alpha_j$ and $\beta_i$ are defined relative to the z-axis in the present example, hence:

$x_{ij} = d_{ij} \tan \alpha_j;$ $y_{ij} = d_{ij} \tan \beta_i;$ $z_{ij} = d_{ij}.$ More generally, the x and y components are determined as a function of the pixel depth and the angular direction to which that pixel corresponds.

As shown, the 3D spatial point $(x_{ij}, y_{ij}, z_{ij})$ is a point within the point cloud 400 which corresponds to pixel (i,j) in the target image R.

In addition, each point in the point cloud may be associated with colour information derived from the target image R itself. For example, for an RGB target image, each point in the point cloud may be associated with an RGB value based on the corresponding pixel of the target image R.

Returning to FIG. 3, the point cloud computation component 302 is shown having an input to receive the RGBD images 301 which it processes as described above in order to determine the corresponding 3D point cloud 400 depicted in FIG. 6. A point cloud can be determined from a single image or from multiple images which are merged in a common frame of reference.

The 3D annotation generator 308 allows the annotator to place (i.e. locate, orientate and size) a 3D bounding object in the frame of reference of the point cloud 400 to be annotated. The 3D bounding object takes the form of a 3D bounding box (cuboid) in the following examples, however the description applies equally to other forms of 3D bounding object such as 3D object templates etc. This can be a manual or semi-automatic process.

Alternatively, all of the steps performed by the annotator can alternatively be implemented automatically, as describe later The annotator places the 3D bounding box via the UI 320 of the annotation system 300. Hence, the 3D annotation generator 308 is shown having a first input coupled to the 320 of the annotation system 300 for receiving user inputs for that purpose. Via the UI 320, the annotator can manually place a 3D bounding box so as to bound a desired structural element (such as a vehicle, cyclist, pedestrian or other object) within the point cloud 400. This is a form of 3D annotation which can be used, for example, to train a 3D structure detection component in the manner outlined above, and which is provided for that purpose as part of the 3D annotation data 309.

The road modelling component 304 is also shown having an input for receiving at least the colour components of the RGBD images, which it processes in order to determine a 3D road model. It is assumed for this purpose that the series of images 301 has been captured by a vehicle equipped with stereo camera equipment (as in FIG. 2) when travelling along a road, such that a 3D model of the road along which the vehicle travelled can be reconstructed based on the series of captured images. To do so, the road modelling component 304 applies the methodology set out in International Patent Application No. No PCT/EP2019/056356, which is incorporated herein by reference in its entirety. This is based on "structure from motion" (SfM) processing which is applied to the series of images in order to reconstruct the 3D path of the vehicle which captured the images (ego path). This, in turn, is used as a basis for extrapolating the 3D surface of the road along which the vehicle travelled. This is based on 2D feature matching between the images of the video sequence 301.

The road model may also be determined in alternative ways e.g. point cloud fitting e.g. the ego path could be based on 3D structure matching applied to the depth maps or point clouds, and/or using high accuracy satellite positioning (e.g. GPS). Alternatively, an existing road model may be loaded and frames may be localized, as needed, inside the existing road model.

The aforementioned reference uses the 3D road model extrapolated from the vehicle's own path to efficiently generate 2D annotation data for annotating the structure of the road in the original images. In the present context, this is extended to allow a 3D bounding box to be placed efficiently around other objects on the road across multiple frames in the video segment 301, such as other vehicles, cyclists etc., by assuming that other road users generally follow the shape of the road over time.

Hence, the 3D annotation generator 308 is shown having a second input coupled to an output of the 3D road modelling component 304. The 3D annotation generator 308 uses the 3D road model as a reference to allow the annotator to "bind" a 3D bounding box to the 3D road model. That is, to move a 3D bounding box in a way that is controlled by the 3D road model, which is particularly useful for annotating other road users such as vehicles, cyclists etc. For example, the annotator may be provided with options to move a 3D bounding box along the road, with the 3D bounding box being automatically re-orientated to match the shape and slope of the road, or across the road perpendicular to its current direction. This is described in further detail below.

The 3D annotation data 309 is also shown to be provided back, as third input, to the 3D annotation component 309. This represents the fact that 3D annotation data defined with respect to one frame can be used to automatically generate 3D annotation data for another frame. This is described in further detail later.

The rendering component 306 is shown having inputs connected to the outputs of the point cloud computation component 302, the 3D road modelling component 304 and the 3D annotation generator 308, as well as an input for receiving the RGBD images. The rendering component 306 renders the 3D annotation data 309 in a way that can be meaningfully interpreted by the human annotator, within the annotation interface.

Figure 7:
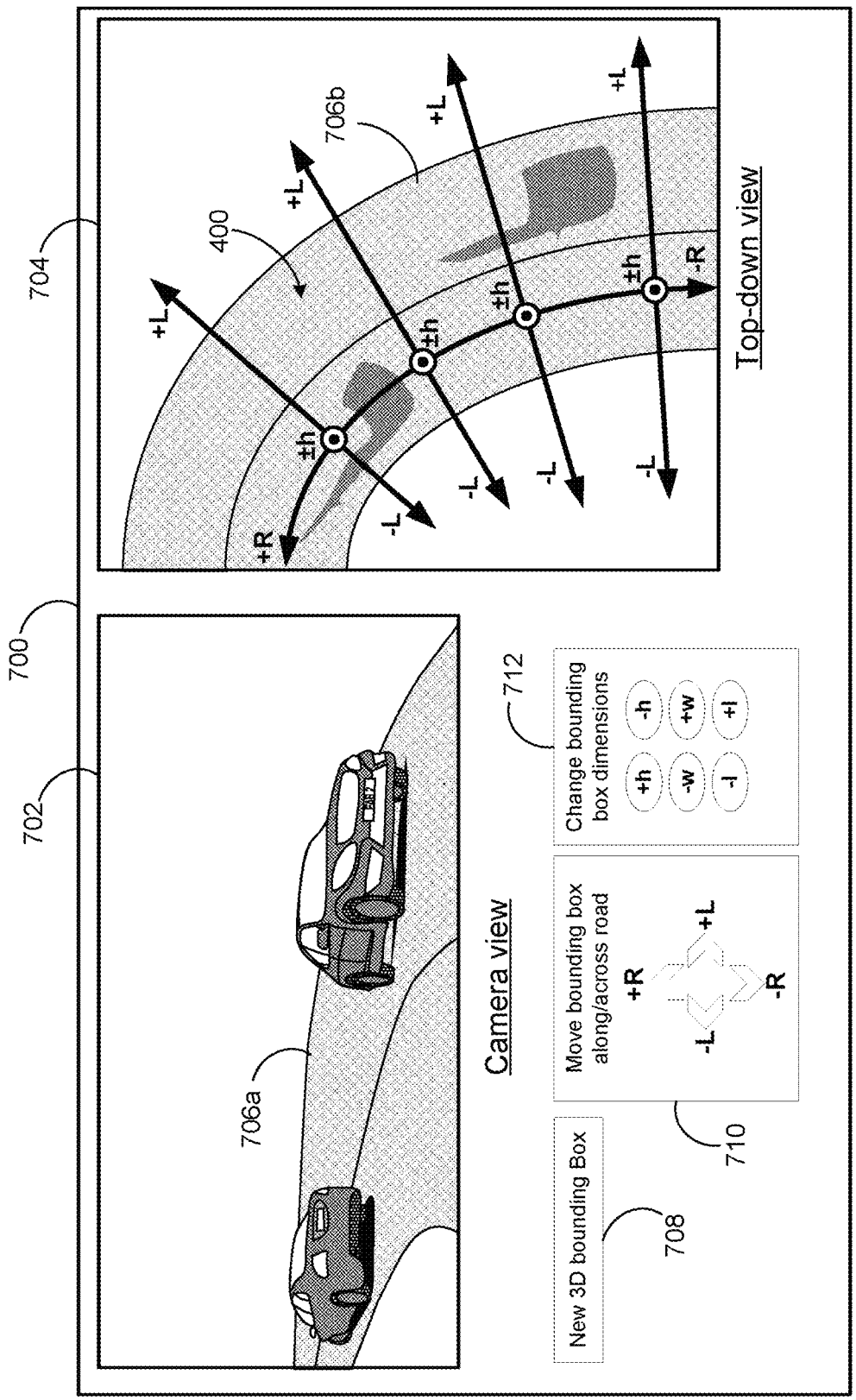

1. Annotation Interface:

FIG. 7 shows a schematic illustration of an example annotation interface 700 which may be rendered by the rendering component 306 via the UI 320.

Within the annotation interface 700, the colour component of an RGBD image 702 (current frame) is displayed on the left-hand side. On the right-hand side, a top-down view 704 of the point cloud 400 of that frame is displayed.

In addition, a projection 706a of the 3D road model into the image plane of the RGBD image is overlaid on the displayed image 702. Likewise, a projection 706b of the 3D road model into the top-down view is displayed overlaid on the top-down view of the point cloud 400.

A selectable option 708 is provided for creating a new 3D bounding box for the current frame. Once created, selectable options 710 and 712 are provided for moving and re-sizing the bounding box respectively.

The options 710 for moving the bounding box include options for moving the bounding box longitudinally along the road in either direction (±R, as shown in the top-down view on the right-hand side), and laterally across the road the road (±L).

The options 712 for re-sizing the bounding box include options for changing the width (w), height (h) and length (l) of the bounding box.

Although depicted as displayed UI elements, the associated inputs could alternatively be provided using keyboard shortcuts, gestures etc.

An example workflow for placing a 3D annotation object will now be described. As will be appreciated, this is just one example of the way in which the annotator can utilize the annotation functions of the annotation interface 700.

Figure 8A:
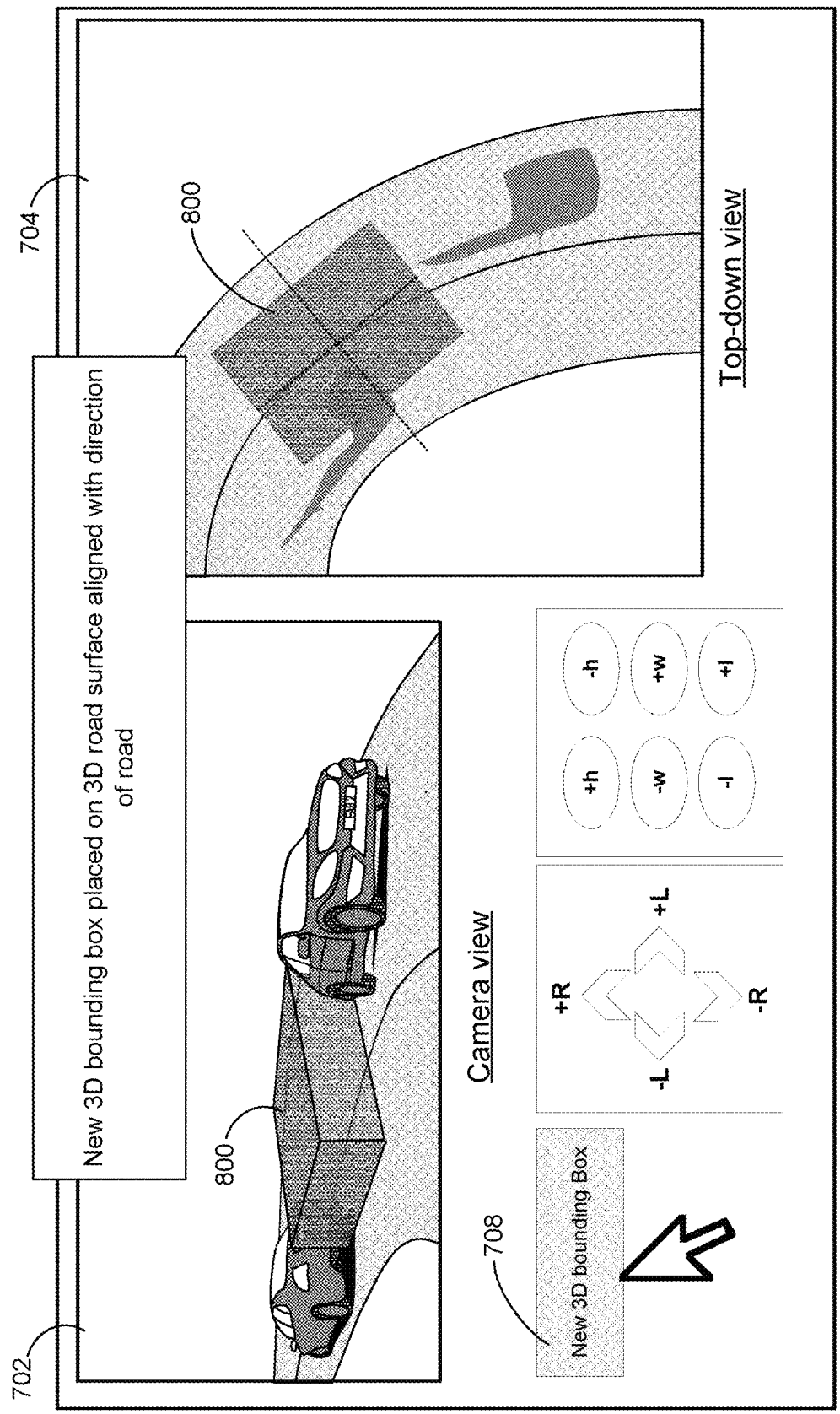

FIG. 8A shows the annotation interface once a new bounding box 800 has been created. The bounding box 800 is placed at an initial location in 3D annotation space at road height and oriented parallel to the direction of the road at that location (as captured in the 3D road model). To assist the annotator, the 3D bounding box 800 is projected into both the image plane of the displayed image 702 and the top-down view 704.

Figure 8B:
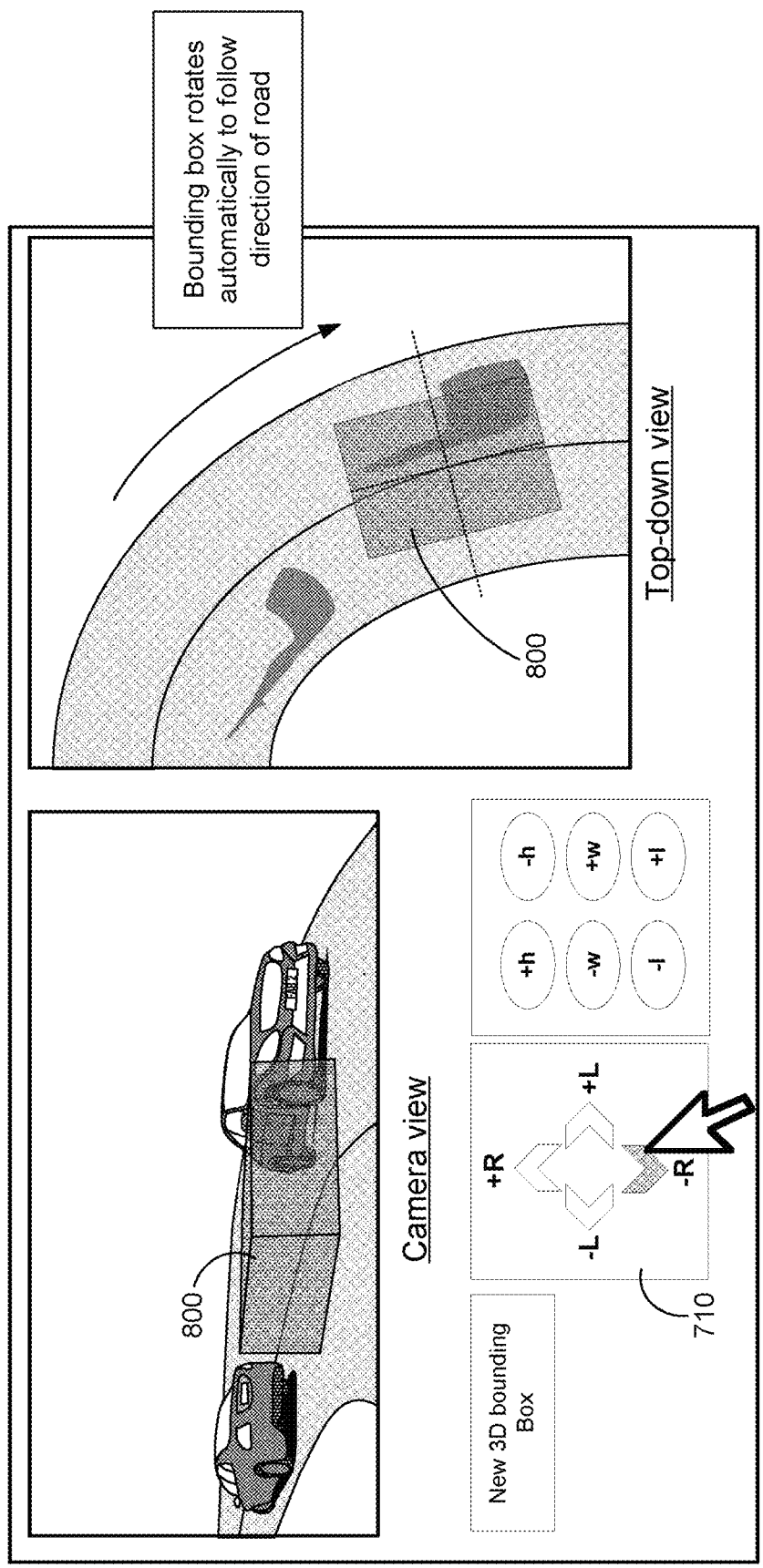

As illustrated in FIG. 8B, as the annotator moves the bounding box 800 along the road, in the +R direction, the bounding box 800 is automatically re-orientated so that it remains parallel with the direction of the road. In this example, the aim of the annotator is to manually fit the bounding box 800 to the vehicle that is visible in the right half of the image and faces into the image plane.

Figure 8C:
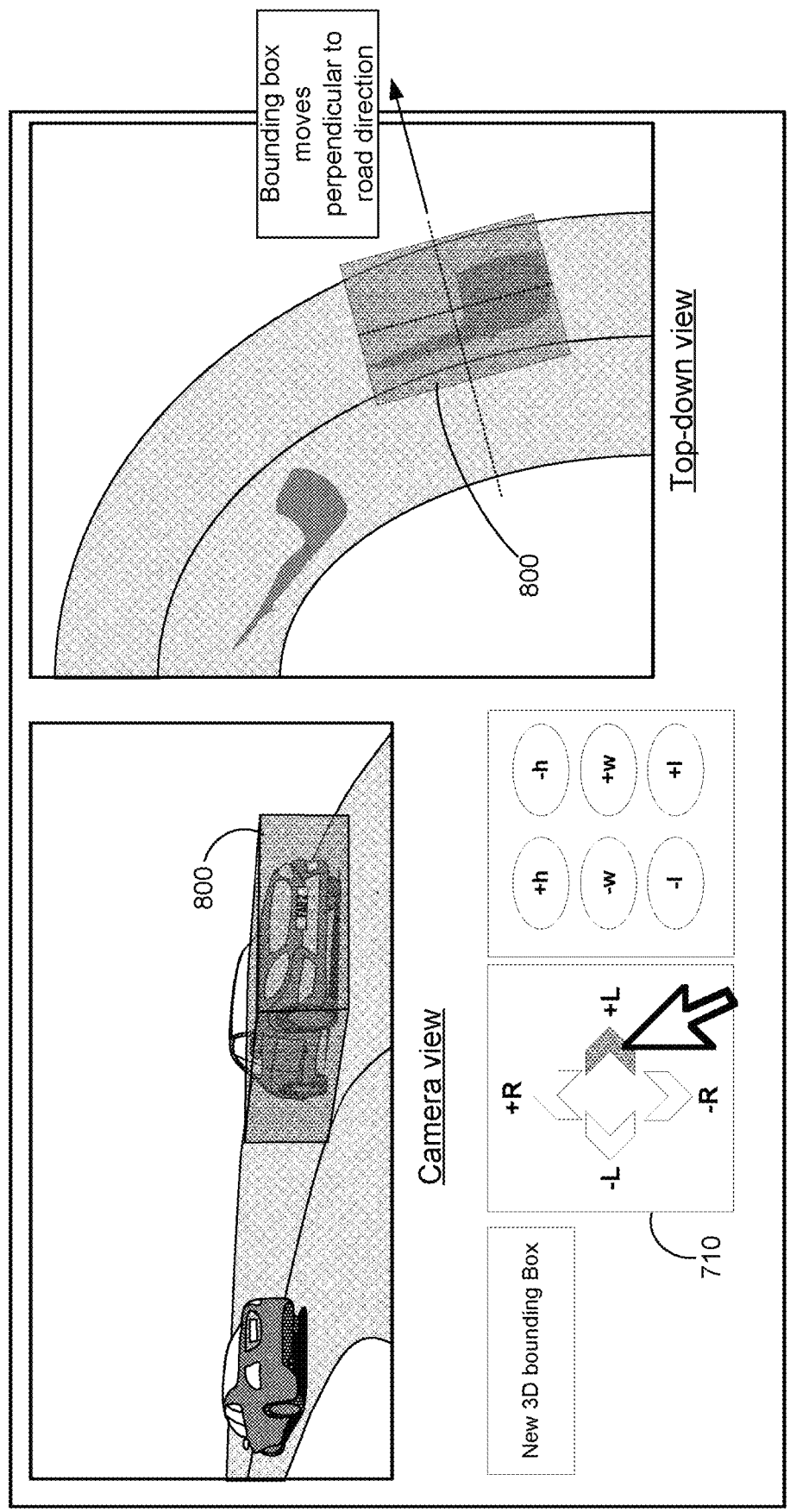

As illustrated in FIG. 8C, once the annotator has moved the bounding box 800 to the desired location along the road, he then moves it laterally, i.e. perpendicular to the direction of the road, to the desired lateral location—in the +L direction in this example.

Figure 8D:
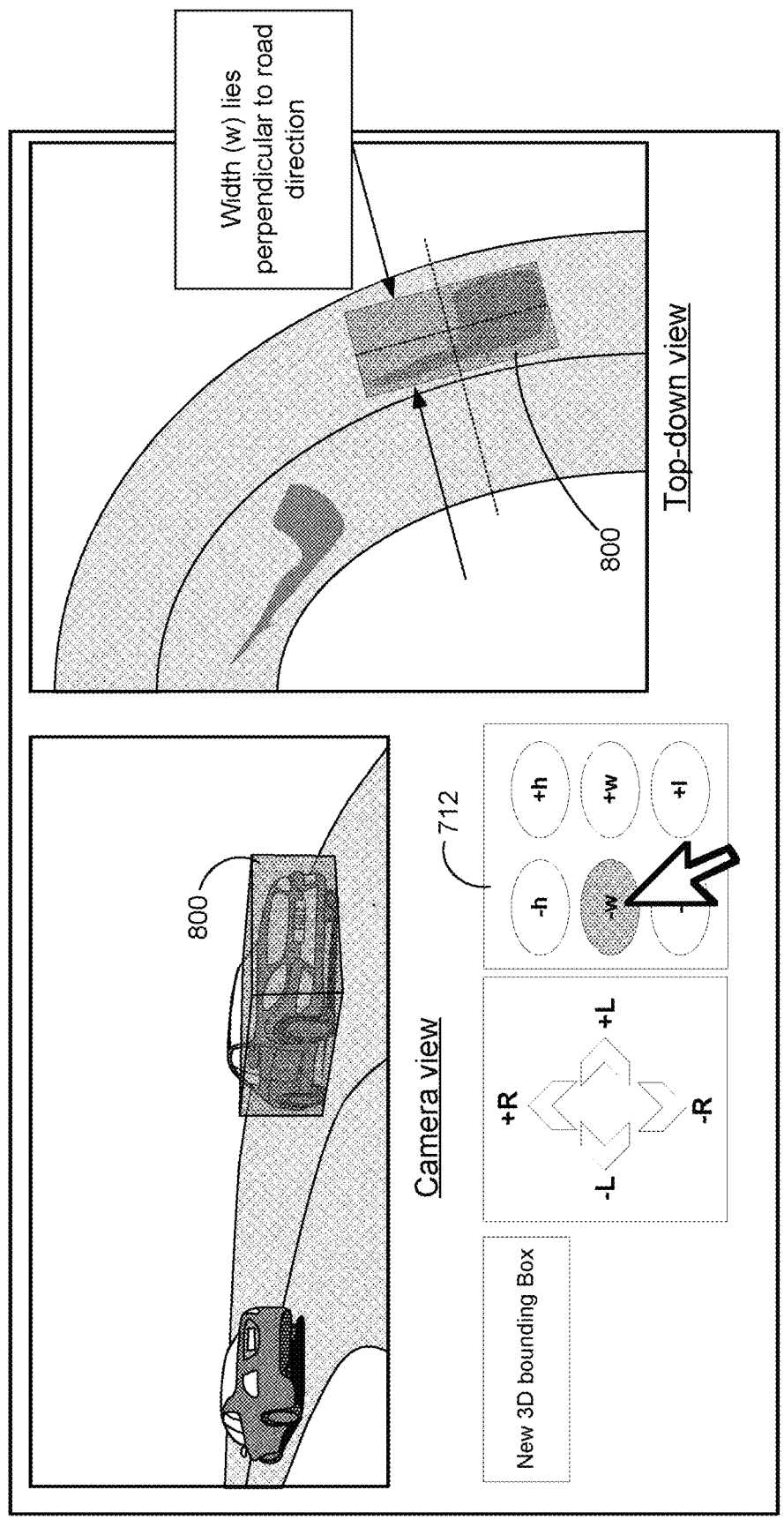
Figure 8E:
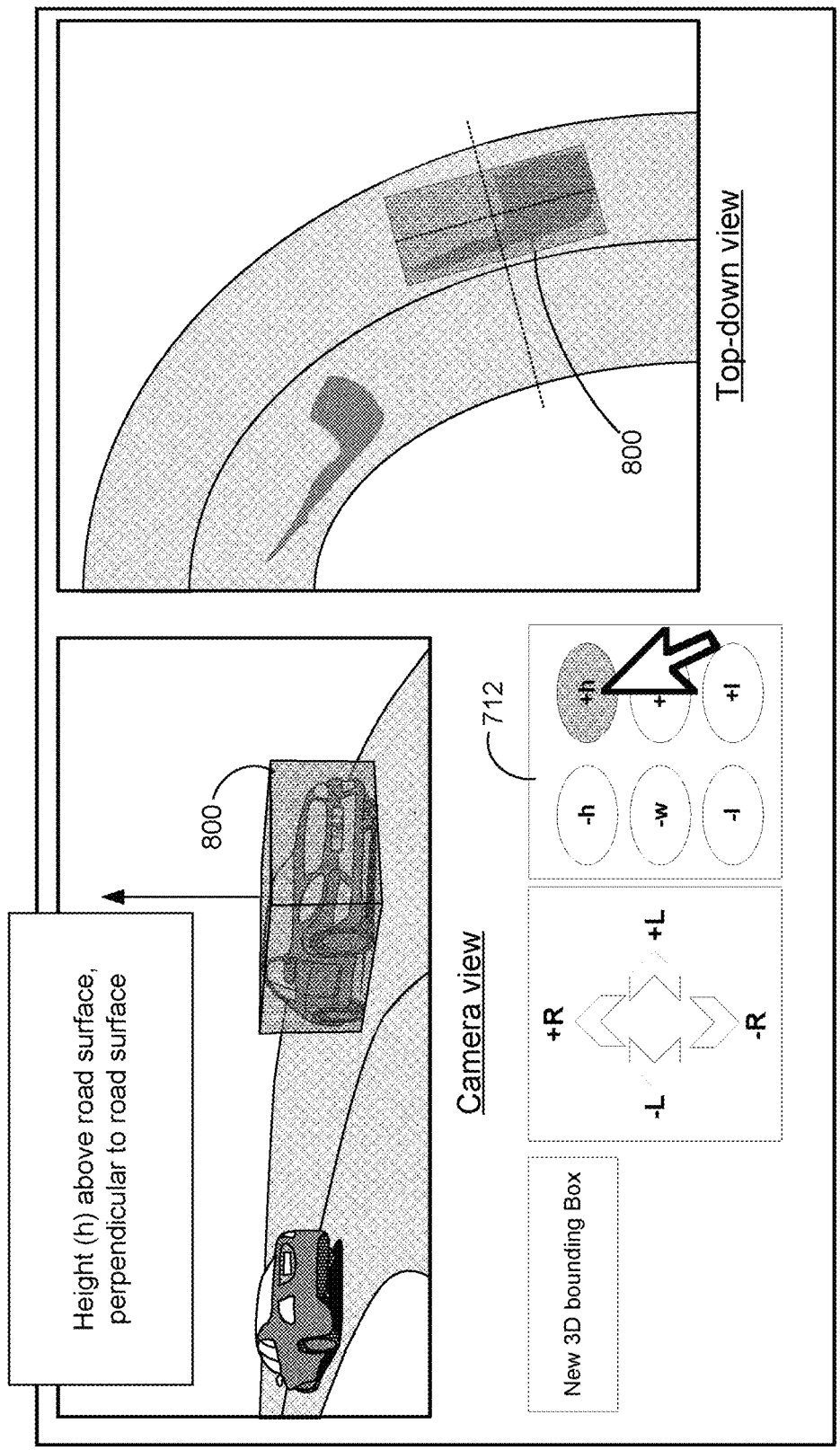

As illustrated in FIGS. 8D and 8E respectively, the annotator then adjusts the width (decreasing it in this case, denoted by "−w") and height (increasing it, denoted by "+h") of the bounding box 800 as appropriate. It happens that no length adjustments are required in this example, but the length of the bounding box could be adjusted as needed in the same way. The width dimension of the bounding box 800 remains parallel to the direction of the road at the location of the bounding box 800, and the height dimension remains perpendicular to the surface of the road at the location of the bounding box 800.

The above example assumes that the bounding box 800 remains bound to the 3D road model as it is adjusted. Although not depicted, the annotation interface may also allow "free" adjustments, which are not constrained by the 3D road model, i.e. the annotator may also be able to freely move or rotate the bounding box 800 as needed. This may be useful for example when annotating vehicles whose behaviour deviates at times from the assumed behaviour (e.g. during a turn or lane change).

2. 3D Object Modelling:

Returning to FIG. 3, the object modelling component 310 implements a form of object modelling based on the output of the 3D annotation generator 308. As indicated, an object model is a 3D model of a desired piece of 3D structure (modelled as an object) created by isolating a subset of a point cloud within a 3D bounding object defined in the frame of reference of the point cloud (or, equivalently, determined as the intersection of the bounding box with the point cloud). The modelled object may for example correspond to a single real-world object (such a vehicle, cyclist or pedestrian to be annotated for the purpose of training a structure detection component for use in an autonomous vehicle), a portion of a real-world object or a group of real-world objects.

Figure 9A:
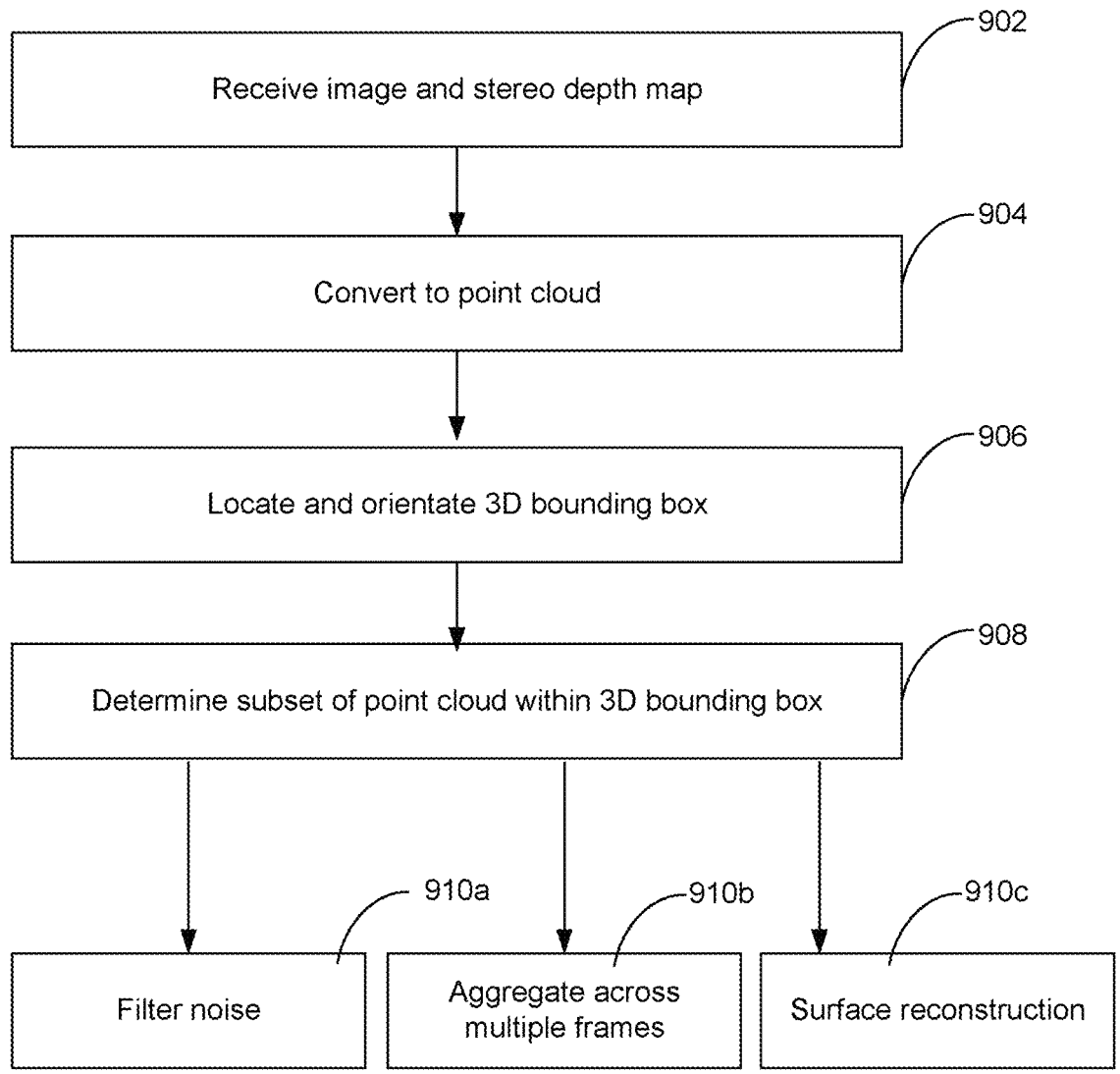
FIG. 9A shows a flow chart for a method of generating an object model and FIG. 9B shows a schematic illustration of the method applied to a point cloud.

FIG. 9A shows a flowchart for a method of creating an object model from a point cloud.

At step 902 a point cloud, which captures structure to be modelled, is received.

At step 904, a 3D bounding object, in the form of 3D bounding box (cuboid) is manually fitted to a piece of desired structure (object) captured in the 3D point cloud.

In the present example, the 3D bounding box is adapted manually to fit the structure based on user inputs provided at the user interface 320, e.g. in the manner described above with reference to FIGS. 8A-E. These inputs are provided by the human annotator whose aim is to achieve the tightest possible fit of the 3D bounding box to the desired piece of structure.

Alternatively, the bounding box can be placed automatically. For example, the bounding box may be placed automatically based on a bounding box defined for another frame in the manner described above.

As another example, the bounding box could be automatically generated by a 3D structure detection component, such as a trained neural network.

Once the 3D bounding box has been placed, at step 906, a subset of the 3D point cloud in the 3D bounding box is determined. The 3D bounding box is defined in the frame of reference of the point cloud and it is therefore possible to meaningfully determine which points of the 3D point cloud lie inside of the internal volume of the 3D bounding box. For the most part, such points will correspond to the desired piece of structure. As indicated above, this can be computed efficiently on a GPU by transforming the points into a coordinate system having axes which lie perpendicular to the faces of the bounding box.

Figure 9B:
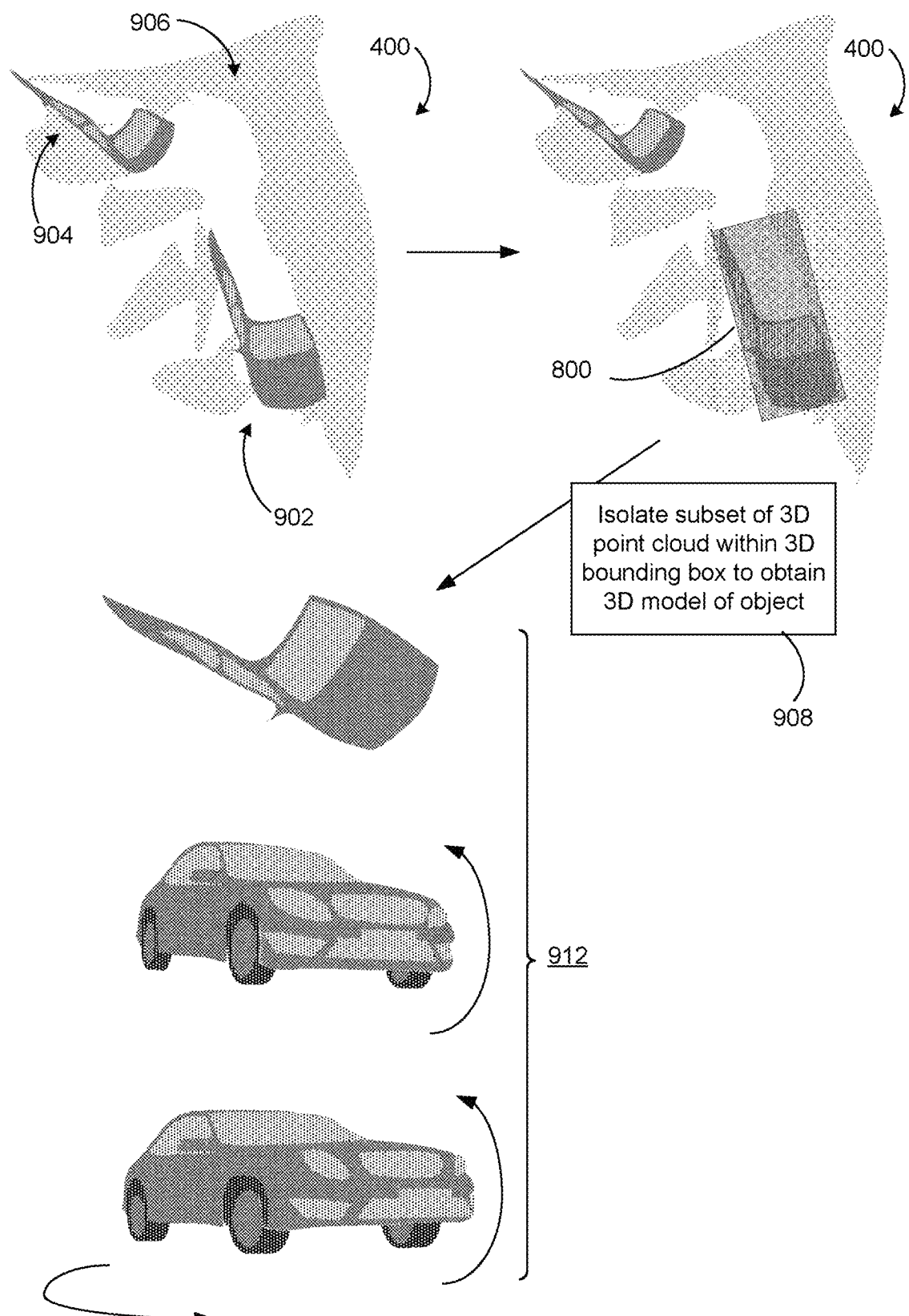

FIG. 9B shows a schematic illustration of step 908 of the method. In this example, a point cloud 400 has captured respective spatial points from first and second vehicles, denoted by reference numerals 902 and 904 respectively. In addition, points 906 of the surrounding road structure have also been captured. By placing a tightly-fitted 3D bounding box 800 around the second vehicle, to the extent it is visible within the point cloud 800, the subset of points within the 3D bounding box 800 may be isolated to provide a 3D model 912 of the second vehicle 902. It is generally significant easier for an annotator to define a 3D bounding box around the desired structural element (second vehicle in this case) than it is to individually select the subset of points belonging to that structural element.

Returning to FIG. 9A, additional processing may be applied to the object model in order to refine and improve it.

For example, noise filtering may be applied (shown at step 910a) to the determined subset of points. The purpose of the noise filtering is to filter out "noise points", i.e. points which are unlikely to actually correspond to the desired piece of structure. Such points can, for example, arise due to noise in the underlying sensor measurements from which the 3D point cloud is derived. The filtering can for example be K nearest neighbour (K-NN) filtering, to remove points that are neighboured by an insufficient number of other points (e.g. a point may be removed if the number of points within a defined radius of that point is below a threshold). The filtering is applied according to the filtering criteria which are manually adjustable via the user interface 412 (for example, the radius and/or threshold may be adjustable). More generally, one or more parameters (such as filtering parameters) of the modelling process may be manually configurable, which is represented in FIG. 3 by an input from the UI 320 to the object modelling component 310.

As another example, object models may be aggregated across multiple frames (shown at step 910b) in order to build an aggregate object model.

In this regard, it is noted that the object modelling component 310 is capable of building both "single-frame" and "aggregate" object models.

A single-frame object model means an object model derived from sensor data captured at a single time instant, i.e. from a single frame in the above sense. This would include an object model derived from a single point cloud, but also an object model derived from multiple point clouds captured simultaneously. For example, multiple RGBD images may be captured simultaneously by multiple pairs of stereo camera pairs, and merged to provide a single merged point cloud.

A multi-frame object model means an object model derived from sensor data captured at multiple time instants, for example from RGBD images captured at different time instants, and in each of which the object to be modelled is at least partially captured. An aggregate object model can be determined from two or more point clouds, corresponding to different time instants, by isolating a subset of each point cloud in the matter described above, and then aggregating the point cloud subsets in a common frame of reference. This can provide a denser object model and can also account for partial occlusion of the object to be modelled by effectively "filling in" a portion of the object that is occluded in one point cloud using points from another point cloud captured at a different time instant.

To generate 2D or 3D annotation data, an object model may be applied to the frame or frames from which it is derived, in order to facilitate the generation of annotation data for that or those frame(s).

However, the object modelling component 310 is also capable of propagating object models between frames. An object model that has been created using data from a point cloud of one frame is said to be propagated when it is applied to another frame (such that point cloud data is effectively propagated from one frame into another frame) in order to generate annotation data for that other frame. Both single-frame and aggregate object models may be propagated in this sense.

Object models may also be propagated for the purpose of generating augmented training examples, as set out above.

Reference numeral 910c in FIG. 9A denotes an optional surface reconstruction step, in which a surface mesh or other 3D surface model is fitted to the selectively points. Such a 3D surface model can be fitted to points selectively extracted from a single frame (single frame object model) or from multiple frames (aggregate object model). This effectively "smooths" the point cloud subset (single frame or aggregate) into a continuous surface in 3D space. Known surface fitting algorithms can be used for this purpose, which may for example be based on a signed distance function (SDF), so as to minimize a measure of distance between the extracted points and a reconstructed 3D surface. It will that be appreciated that, where this description refers to an object model. that object model may comprise a 3D surface model generated in this manner.

FIG. 10 depicts two example frames denoted by reference numerals 1001 (frame 1) and 1002 (frame 2) respectively. First and second objects, which are vehicles, are visible in both frames and are denoted by reference numerals 1021 (vehicle 1) and 1022 (vehicle 2) respectively. For each frame, both a camera view (in the image plane of the frame in question) and a top-down view (of the associated point cloud) are depicted, on the left and right hand sides respectively.

In frame 2, vehicle 1 is partially occluded by vehicle 2. In frame 1, which in this example has been captured at a later time instant, vehicle 1 is no longer occluded.

It can also be seen that, in frame 2, both vehicles are relatively distant. As a consequence, it is expected that the point cloud data captured for each vehicle in frame 2 (i.e. the number of points within the associated point cloud that correspond to the vehicles) will be relatively low, as depicted schematically in the top-down view for frame 2. The point cloud data for distant objects will also generally be noisier and of lower accuracy. A factor in this is that, due to the inverse relationship between disparity and distance, a given error in disparity space translates to a greater error in distance space for more distant points.

However, in frame 1, vehicle 1 has moved significantly closer to the camera. Hence, as depicted schematically in the top-down view for frame 1, the point cloud data for vehicle 1 in frame 1 is generally denser and of higher quality (lower error, less noise etc.). Moreover, it is also more complete (i.e. covers a greater portion of vehicle 1) as a consequence of vehicle 1 no longer being occluded.

3. Object Model Propagation:

Two examples of object model propagation—namely, automatic bounding box alignment (3.1) and manual bounding box alignment (3.2)—will now be described. These are described using the frames of FIG. 10 as a reference.

Figure 11A:
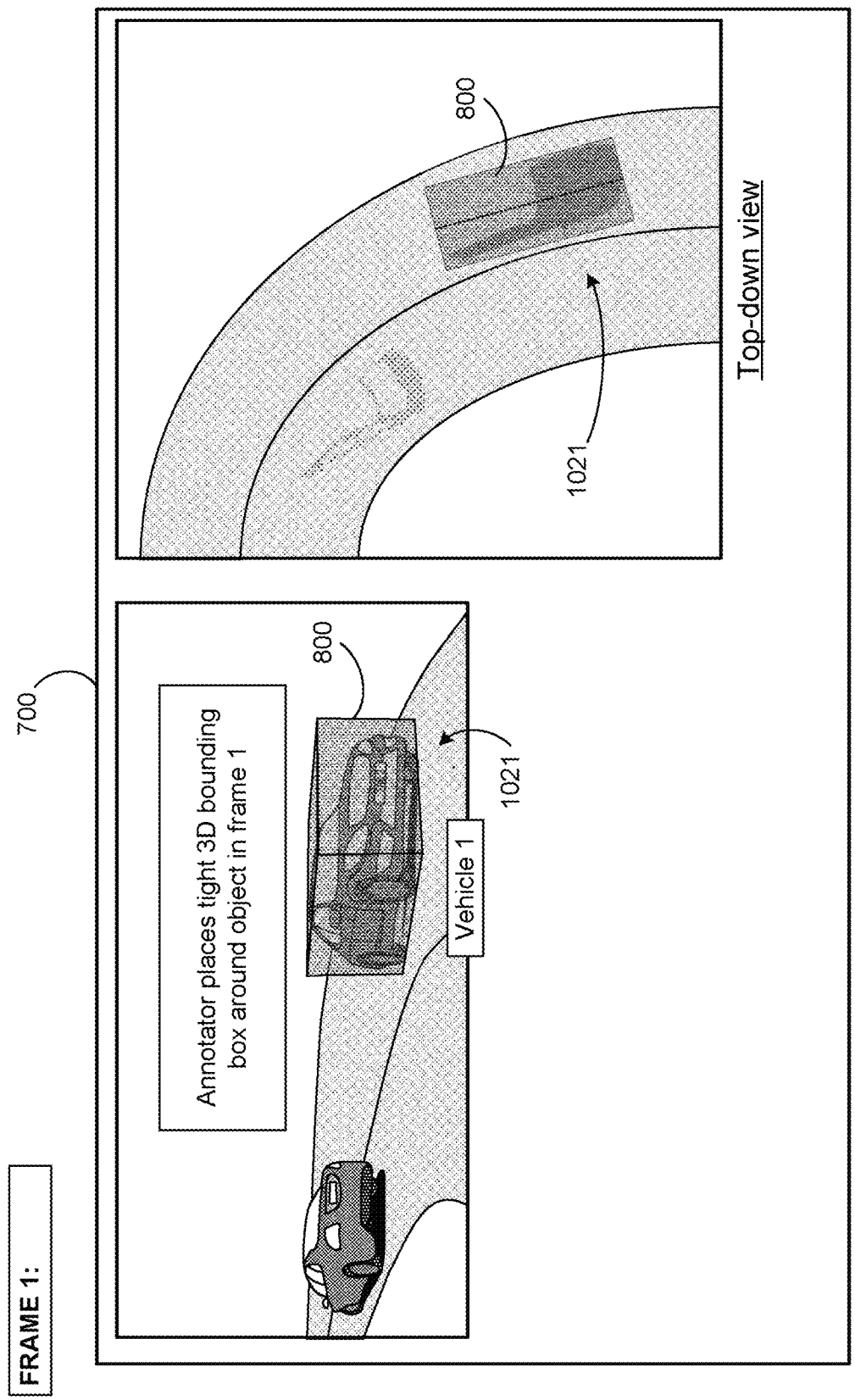

3.1 Automatic Bounding Box Alignment:

FIG. 11A shows the annotation interface 700 with frame 1 (1001, FIG. 10) currently selected for annotating. Using the tools provided within the annotation interface 700, the annotator has accurately placed a tight bounding box 800 around vehicle 1 (denoted by reference numeral 1021), in the manner described above. The tight bounding box 800 is defined in the frame of reference of the point cloud of frame 1.

Figure 11B:
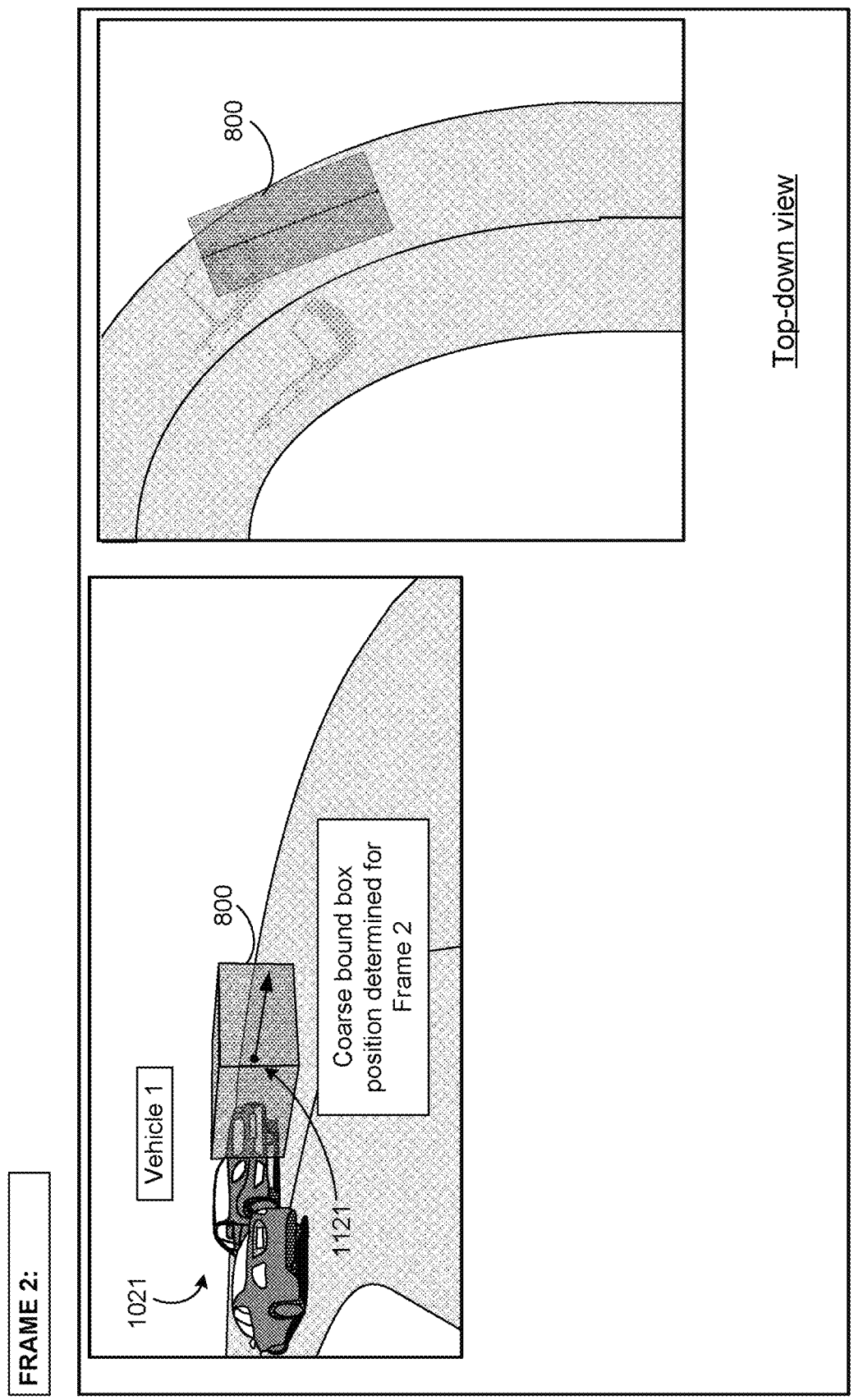

FIG. 11B shows the annotation interface 700 but now with frame 2 (1002, FIG. 10) currently selected for annotating. The bounding box 800 defined in frame 1 has been imported (propagated) into frame 2, but at this point only a coarse-estimated pose 1121 (location and orientation) has been determined within frame 2 The coarse-estimated pose 1121 is defined in the global of reference but within the point cloud of frame 2.

The coarse-estimated pose 1121 can be defined manually by the annotator. This is straightforward and places a minimal burden on the annotator.

Alternatively, the coarse-estimated pose 1121 may be determined automatically, for example using a trained perception component—a form of "model in the loop" (MITL) processing.

Alternatively or additionally, the coarse-estimated pose 1121 may be determined by interpolation based on an assumed or measured path of vehicle 1 (1021). Further details are given below.

For rigid objects (that is, objects modelled as rigid), the size and dimensions of the bounding box 800 remains constant across all the annotations (constant in the sense of being the same across all frames—the dimensions can be adjusted by adjustments applied in respect of one frame are mirrored in all frames).

Non-rigid objects, such as pedestrians and cyclists, can be accommodated by applying a suitable transformation to the bounding object dimensions across frames. This may, for example, take into account information about a type or class of the object in question.

The coarse-estimate of the bounding box pose 1121 is most conveniently obtained automatically by interpolation or MITL and is a coarse pose and orientation with the same 'true' dimensions (width, length and height).

Note, although reference is made in the present context to a tight bounding box, it not necessary for there to be an initial tight 3D bounding box: one or more "coarse" bounding boxes (i.e. which are not tightly fitted to the object 1021 to be annotated)—which may be automatically or manually generated—may be sufficient to determine the vehicle structure which is present across multiple frames (and thus apply the annotation functions disclosed herein). Hence, although the bounding box 800 may be referred to as a tight bounding box in the following description, the bounding box 800 is not required to be tight in order to implement the described features.

Note a distinction is made between a coarse bounding box which has not been accurately positioned or sized in any frame, and a coarse pose for a bounding box in a given frame—for the latter, an accurate pose may or may not have been determined for a different frame when the coarse-position is defined in the given frame.

If no tight bounding box is provided initially, an annotator may at some point need to correct the orientation of the axes relative to the 'optimised' box pose, but that can be done before or after the bounding box 800 has been propagated into other frame(s), and moreover only needs to be done in respect of one frame as those corrections will be automatically applied across all frames to which the bounding box 800 is propagated.

Figure 11C:
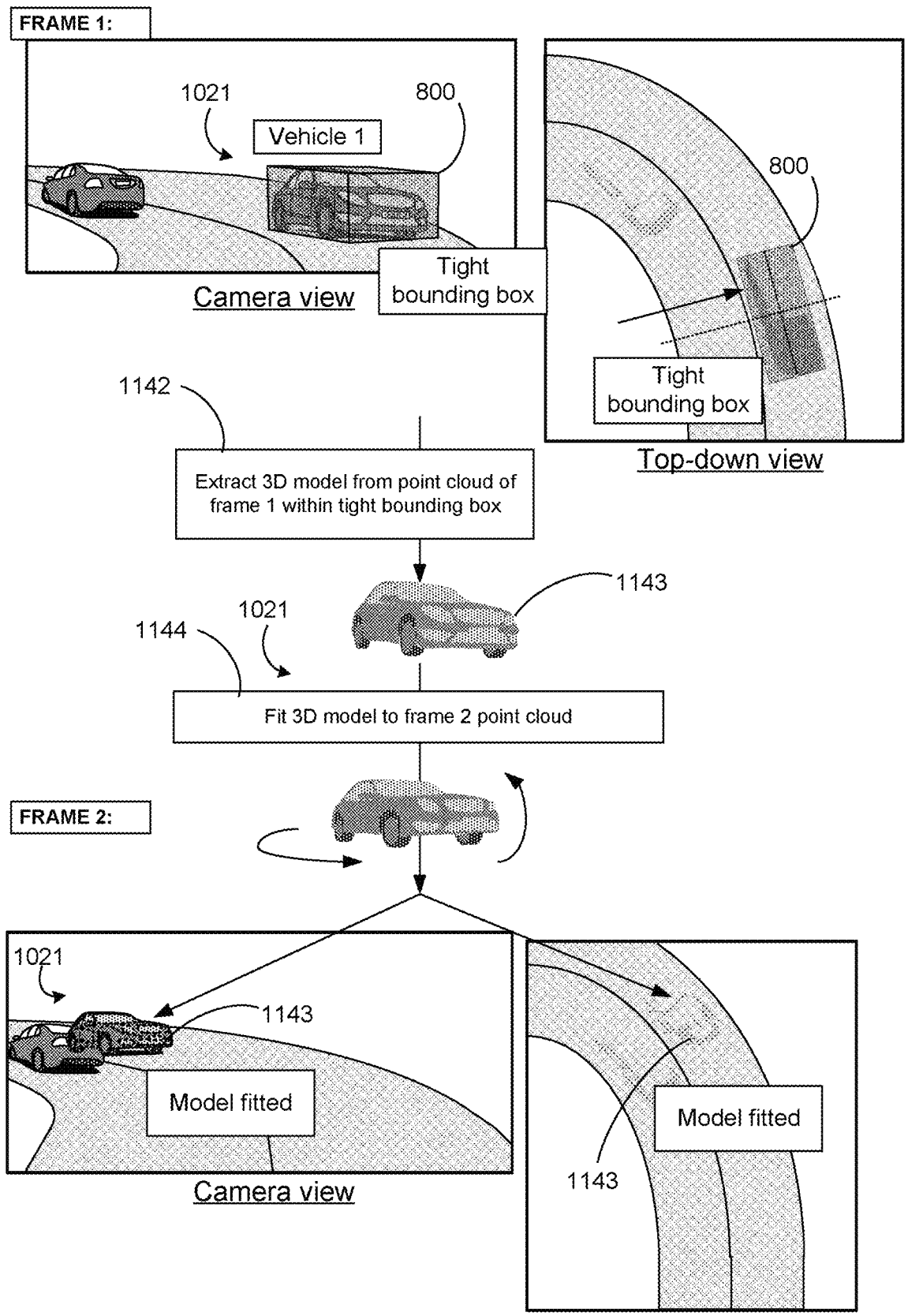

FIG. 11C shows a flow chart for an object model propagation method, accompanied by graphical illustrations of the method steps. At step 1142, the subset of the point cloud of frame 1 within the bounding box 800 of frame 1 is extracted to provide an object model 1143 of vehicle 1. At step 1144, the object model 1143 from frame 1 is fitted to the subset of the point cloud of frame 2. As indicated, the fitting may be performed based on ICP, or any other automatic alignment algorithm which attempts to match the structure of the object model to the structure of the point cloud. Any colour information associated with the points in the point cloud may also be uses as a basis for the fitting (which, in that event, attempts to fit points of the model to points in the point cloud of similar colour, in addition structure matching). The alignment process may also be referred to as "registering" the 3D model 1143 with the point cloud of frame 2. The algorithm searches for matching structure within the point clouds to which the model 1143 can be aligned (i.e. with which it can be registered).

The coarse bounding box pose 1121 may be used to limit the scope of the search, for example to within a search volume in 3D space defined by the coarse bounding box pose 1121. The search volume may additionally be defined by the size/dimensions of the bounding box 800. However, the search volume need not limited to the volume within the bounding box 800. For example, the search volume may be expanded by an additional "buffer" surrounding the 3D bounding box 800. Alternatively, the search volume could be defined manually e.g. via a 2D rectangular or freeform 'lasso' selection in the image or one of the projected 3D views. Alternatively, the search may be performed across the full extent of the point cloud of frame 2, though that may be less efficient.

Image features may also be used to aid the registration of the point clouds, such as edges, corners or other feature descriptors like SIFT (scale-invariant feature transformation).

In general, although the object model 1143 is aligned with the object (vehicle 1) in 3D space, this may or may not be based on 3D structure matching, i.e. adjusting the 3D pose of the object model 1142 in order to match 3D features of the object model 1143 with corresponding 3D features of vehicle 1 (e.g. using ICP or other automated 3D registration process, as described above). For example, that alignment in 3D space can alternatively or additionally be based on 2D feature matching, i.e. adjusting the 3D pose of the object model 1142 in order to match 2D features of the object model 1143 with corresponding 2D features of vehicle 1 (e.g. using image features of the kind described above)

As another example, the alignment in 3D space may alternatively or additionally be based on a re-projection error or other photometric cost function. This involves projecting the 3D object model 1143 into the image plane and adjusting the 3D pose of the object model 1143 in order to match the computed projection with vehicle 1 as it appears in the image. This may also be based on the matching of image features between the image and the projection of the object model 1143 into the plane of the image.

Where noise filtering is applied to the points of the 3D object model, a 3D surface model may be fitted to the filtered points (i.e. the points remaining after noise points have been filtered-out).

All cameras and bounding boxes have positions and orientations (poses) relative to a world (global) coordinate system. Hence, once the pose of the bounding box 800 has been determined within respect to frame 1, it possible to find the pose of that bounding box 800 relative to another camera (i.e. in fact, the same camera but at a different time instant—e.g. correspond to frame 2), which in turn allows that bounding box 800 to be placed (located an oriented) it in the coordinate system of the point cloud for that camera. That point cloud can, in turn, be transformed into the coordinate system of the bounding box in order to efficiently isolate the subset of the point cloud within that bounding box (see above).

Figure 11D:
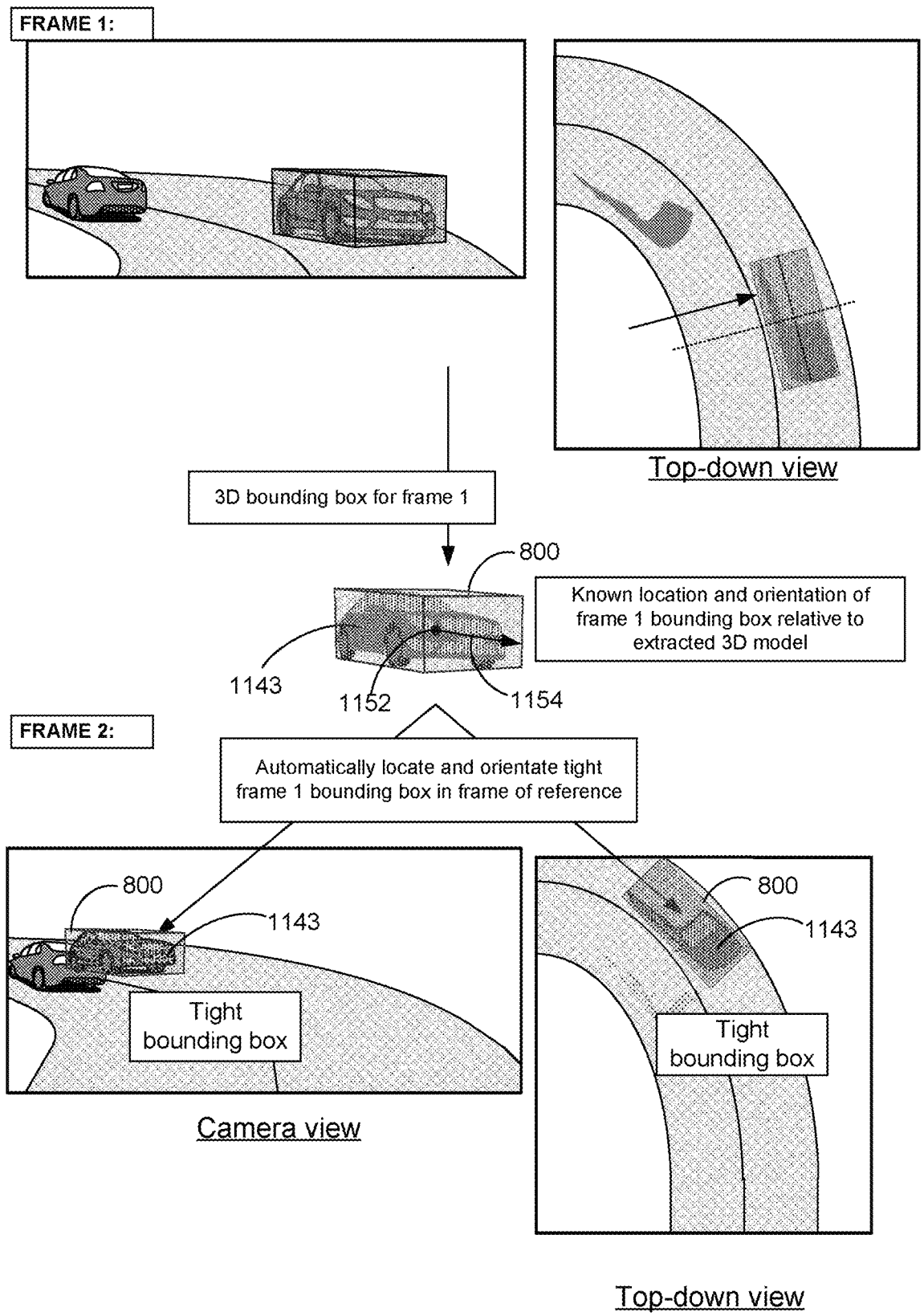

With reference to FIG. 11D, because the tight bounding box 800 and the 3D object model 1143 are both derived in the same frame of reference (the frame of reference of the bounding box 800 in this case), the location and orientation of the tight bounding box 800 relative to the object model 1143 are known when the model is created at step 1142. Therefore a location and orientation of the tight bounding box 800 in the frame of reference of the point cloud of frame 2 is determined automatically, at step 1144, in fitting the 3D object model 1143 to the point cloud of frame 2. This is encoded as a reference point (location) 1152 and orientation vector 1154 of the bounding box 800 with the reference point 1152 and orientation vector 1154 being fixed relative to the points of the object model 1143. Assuming that object in question (vehicle 1 in this example) can be treated as a rigid body, then the tight bounding box 800 originally defined in frame 1 will now be reasonably accurately located and oriented so as to tightly fit the subset of points in frame 2 which belong to vehicle 1 (the accuracy will depend on how well the object model has been fitted to the point cloud).

In this manner, high quality 3D annotation data is generated semi-autonomously for frame 2, which can in turn be used to train a machine learning 3D bounding box detector, orientation network, or distance estimation (for example) or any other form of 3D structure perception component.

Further steps can also be taken to automatically generate 2D annotation data for the underlying image of frame 2, as described below.

The coarse estimate of the bounding box pose 1121 also serves as a coarse estimate of the pose of the 3D object model 1143, for the reasons stated above. This, in turn, is refined by better aligning the 3D object model 1143 with vehicle 1 in frame 2, automatically, manually or semi-automatically.

Although in the above example, the bounding box 800 is manually placed in frame 1, this step could be automatic. The bounding box could be automatically placed by an automated object detector such as a trained neural network (and may or may not then be subject to manual fine-tuning), in an MITL approach. For example, it may be that the bounding box detector can perform well on frame 1 in respect of vehicle 1 but performs poorly when applied to frame 2 directly. In that event, high quality training data can be generated automatically or semi-automatically for frame 2, leveraging the good performance of the bounding box detector on frame 1. This in turn can provide high-quality training data for frame 2, which in turn can be used for training/re-training to improve object detection performance. Further or alternatively, pose may be estimated by interpolation based on a measured or assumed path of the object being annotated (see below).

Moreover, as will be appreciated, this is just one example of a workflow that the annotator may adopt using the annotation functions provided. The underlying efficiency stems from the fact that changes to the 3D bounding box relative to the object model made in one frame are applied automatically to one or more other frames to maintain consistent 3D bounding boxes across frames for rigid objects. So, for example, the annotator could instead coarse annotate the first frame initially, apply the above steps in order to locate and orientate the coarse bounding box of the first frame in the second frame, and then apply adjustments to the location and/or orientation bounding box in the first frame with those adjustments being automatically mirrored in the second frame. In that case, adjustments to the bounding box in one frame are applied across multiple frames automatically.

In this respect, it is noted that the reference point 1152 and orientation vector 1154 of the bounding box 800 relative to the object model 1143 are fixed in the sense that the orientation of the bounding box 800 relative to the object model 1143 remains consistent across frames—however, the annotator can adjust the location and orientation of the bounding box relative to the object model as needed (i.e. he can alter the reference point 1152 and orientation vector 1154), with any such adjustments being implemented automatically across all of the frames in which that object model is applied. In this sense, the 3D bounding box 800 is "locked" to the 3D object model 1143.

3.2 Manual Bounding Box Alignment

Figure 11E:
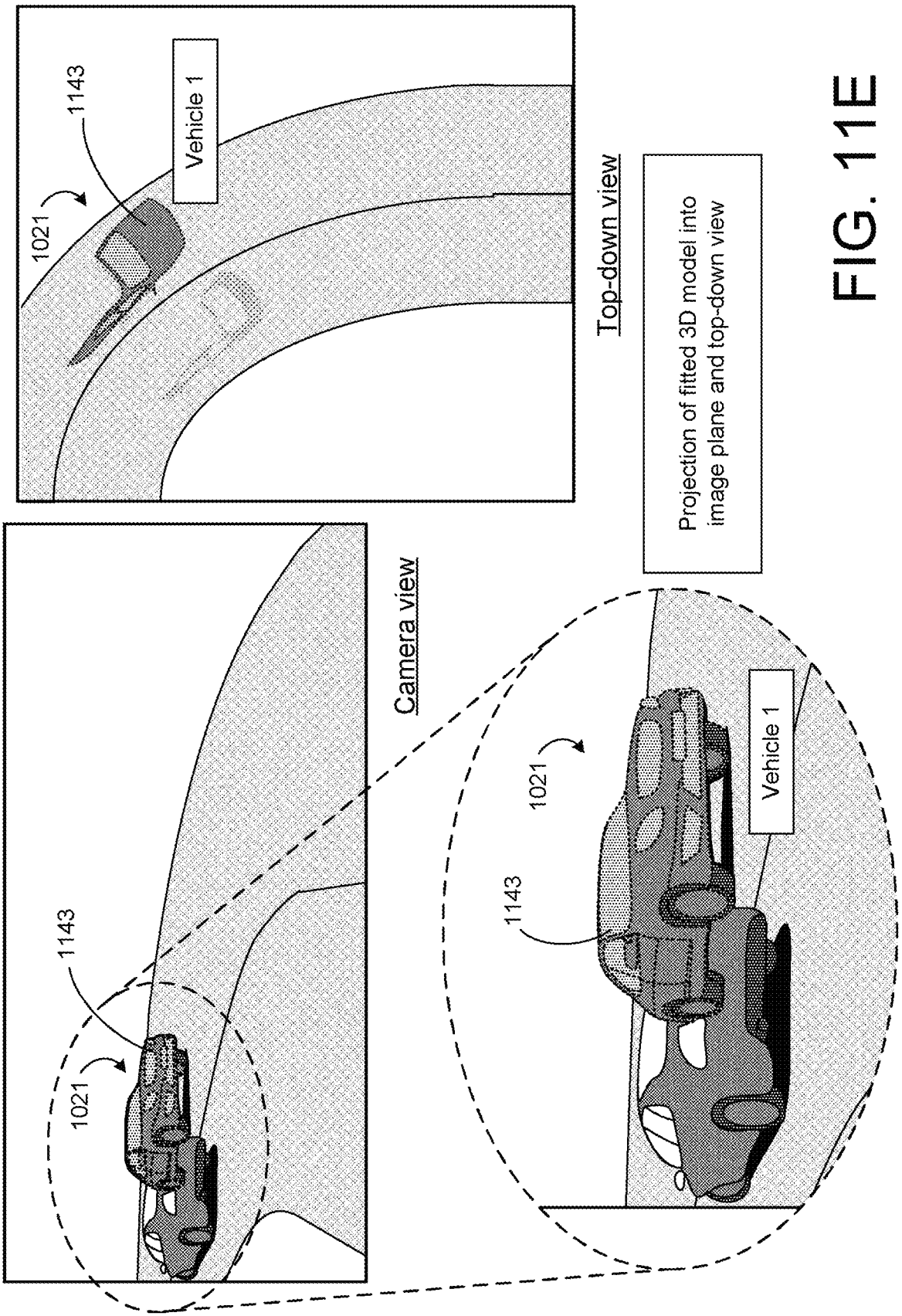

Following on from the above example, FIG. 11E show an expanded view of the annotation interface 700 whilst frame 2 is selected for annotating. As can be seen, the object model 1143 is superimposed by projection (1152) onto both the camera view and the top-down view to enable the annotator to see the location of the object model 1143 in the frame of reference of frame 2, relative to the object 1021 in question (vehicle 1).

Figure 11F:
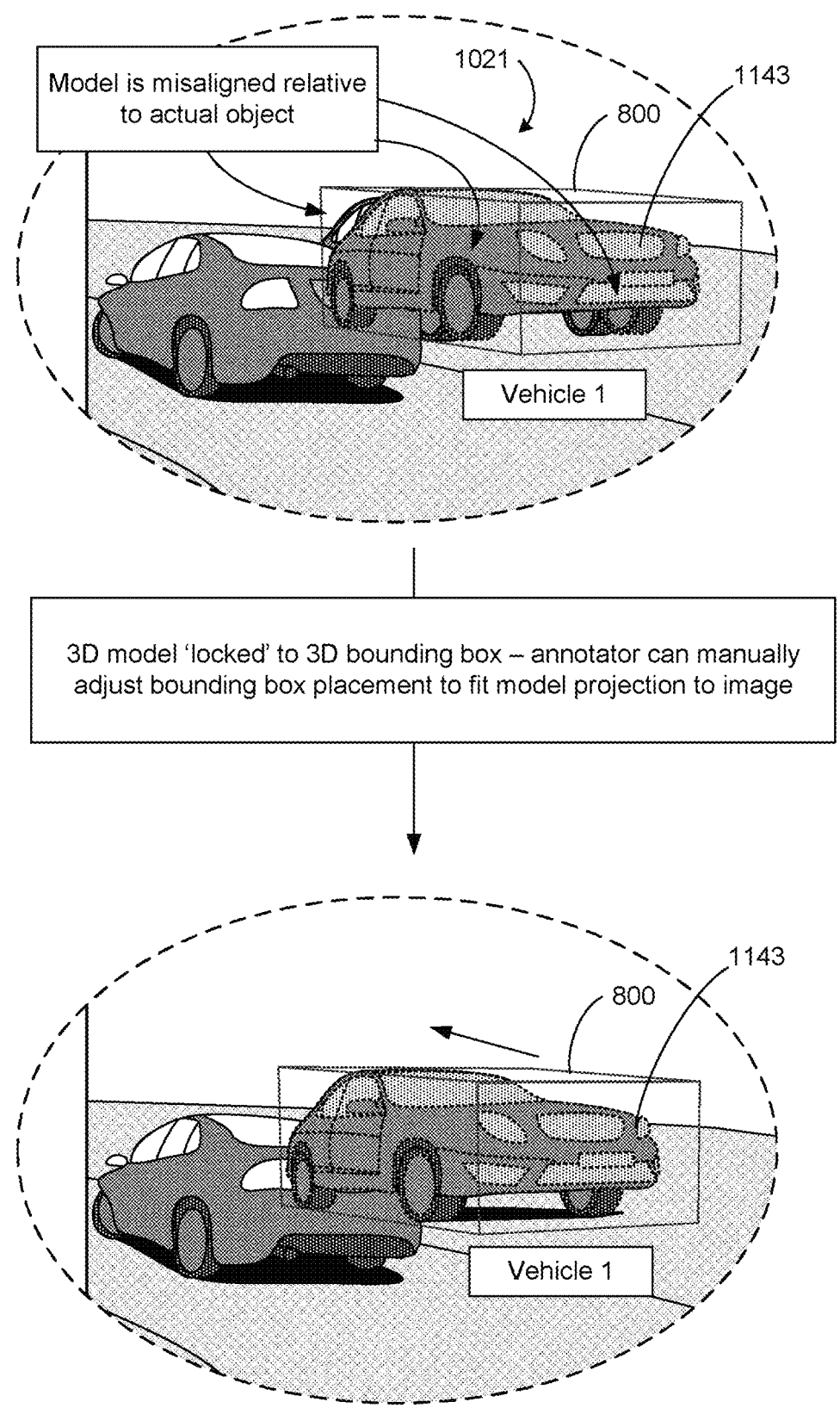

FIG. 11F demonstrates how the annotator may utilize this feature. As illustrated in the top-half of FIG. 11F, it may be that when the object model 1143 is first fitted to the point cloud of the second frame, it is not perfectly aligned with the actual points of the object 1021. This is readily visible in FIG. 11F due to the visual misalignment between the object model 1143 and the actual object 1021. Thus, as illustrated in the bottom-half of FIG. 11F, the annotator can tweak the pose (location and orientation) of the bounding box 800 to correct the misalignment: the object model 1143 remains locked to the bounding box 800 in the above sense as the latter is adjusted: any changes to the pose of the object model 1143 in the frame of reference of the current point cloud are applied to the pose of the 3D bounding box 800 in that frame of reference. Hence, the annotator knows that the bounding box 800 has been correctly located and orientated in the frame of reference of frame 2 when there are no longer any perceptible misalignments. Although not shown in FIG. 11F, the object model 1143 is also projected into the top-down view so that the annotator can correct any visual misalignment in the top-don view at the same time.

Figure 11G:
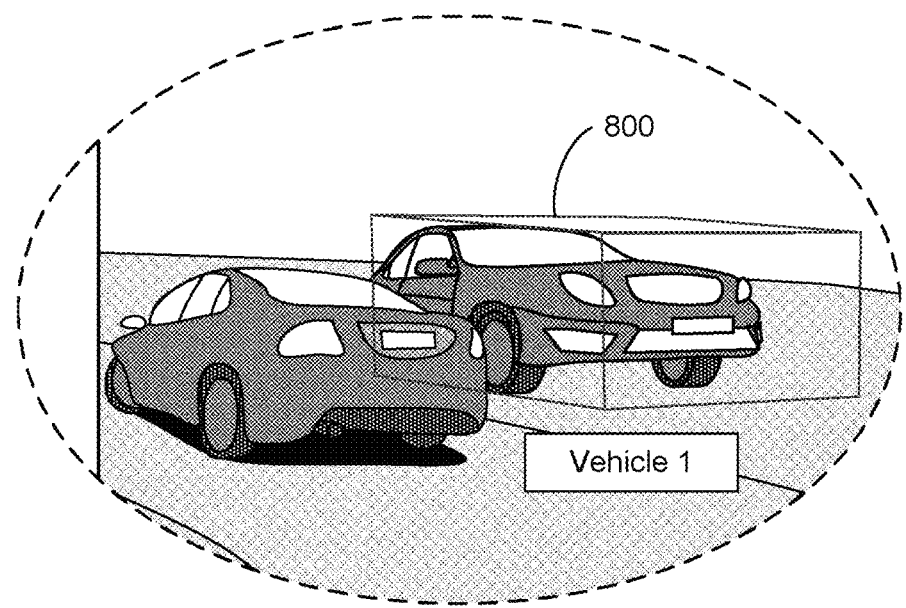

By contrast, FIG. 11G shows the same view as the top-half of FIG. 11F but without the superimposed object model 1143. At this point, the bounding box 800 is still misaligned, but that misalignment is much harder to perceive in the absence of the model projection. This is partly a consequence of the fact that vehicle 1 is partially occluded. By propagating the object model 1143 from a frame in which the object is not occluded, the occlusion in frame 2 is corrected for, thereby assisting the annotator in the fine-tuning of the bounding box 1143.

As well as correcting for occlusion, propagating the object model in this way can also help to account for sparsity, noise and inaccuracy in the point cloud for distant objects in particular. Returning to FIG. 10, recall that, since vehicle 1 is more distant in frame 2, the subset of the point cloud corresponding to vehicle 2 will generally be sparser and of lower quality in frame 2. This is another reason it may be difficult to accurately place a bounding box manually in frame 2, as this will be reflected in the quality of the top-down view. Propagating the object model 1143 from frame 1 into frame 2 assists the annotator in compensating for this, in the manner described above.

Model propagation can also be used to account for "gaps" in sensor coverage. For example, with stereo depth images, estimation of depth relies on locating matching pixels between the target and reference images. There will usually exist a region of the target image containing pixels which have no corresponding pixels in the reference image. This corresponds to the portion of a scene which is within the field of view of the camera which captured the target image but outside of the field of view of the camera which captured the reference image. No depth information will be available for a portion of an object within that region in a given frame. However, that depth information can instead be taken from another frame by propagating the object model from the other frame in the manner described above. This may for example be the frame in closest temporal proximity in which the object in question is fully visible in the depth channel.

4. Aggregate Object Model:

To create an aggregate object model, bounding boxes are placed around the object in question across multiple frames (e.g. as described above, or simply manually). A subset of the point cloud is isolated for each frame within the bounding box for that frame, and the subsets of point clouds are aggregated in a common frame of reference. As indicated, this can provide a more dense and less noisy object model, which in turn can be applied in one or more frames as above to generate high quality annotation data.

Following the above example of FIGS. 11A-G, having accurately placed the bounding box 800 in frame 2, the subset of the point could of frame 2 within that bounding box can be extracted, and merged (aggregated) with the corresponding subset of points extracted from within the bounding box 800 in frame 1. This provides a denser model of vehicle 1 which, in turn, can be propagated into other frame(s) in the manner described above.

An annotator can also use an aggregate model to guide manual annotations. An aggregate model which uses data of a target frame and at least one other frame (reference frame) can be rendered as the annotator adjusts the position/pose of the bounding box 800 in the target frame. If the bounding box is located or oriented incorrectly, this can cause visible artefacts in the aggregate model, such as "duplicate" or misaligned features, because the points taken from the target frame are not properly registered with the points taken from the reference frame. The user can thus tweak the pose of the bounding box 800 in the target frame as necessary until the visual artefacts are no longer present.

4.1 Iterative Propagation and Generation of Aggregate Models

Aggregate 3D models can be generated and applied in an iterative fashion.

Figure 14:
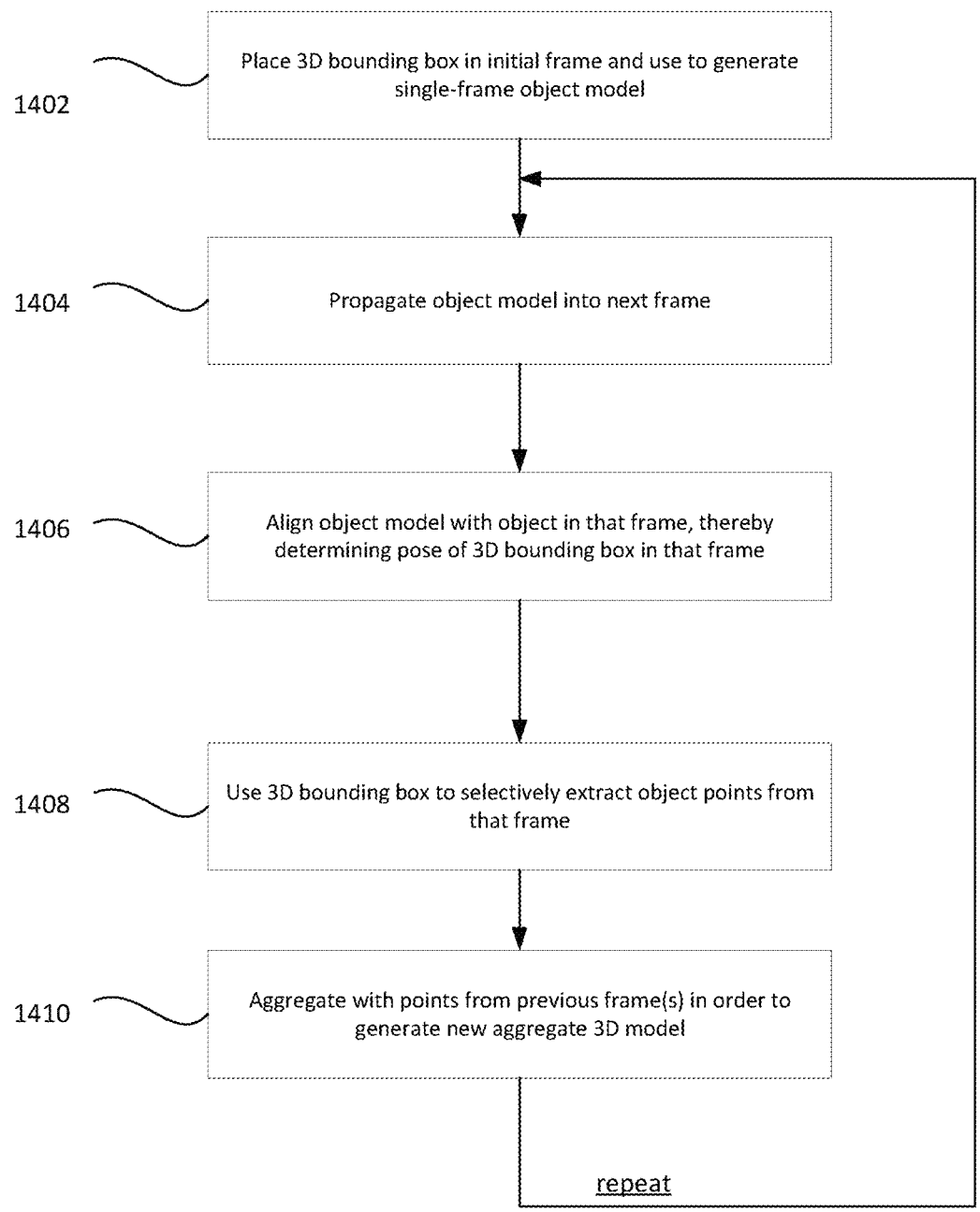
FIG. 14 shows a flowchart for a method of iteratively generating and propagating aggregate 3D object models.

An example will now be described with reference to FIG. 14, which shows a flowchart for a method of iteratively generating and applying increasingly dense aggregate 3D models across multiple (possibly many) frames.

Initially, at step 1402, a single frame object model (the current object model at this point in the process) is generated for a single initial frame, by placing a 3D bounding box around an object in that frame (automatically, semi-automatically or manually), and extracting object points from that frame within the 3D bounding box.

At step 1404, the current object model is propagated into the next frame and aligned (1406) in 3D space with the object in that frame (manually, automatically or semi-automatically). In so doing, the pose of the 3D bounding box in that frame is derived, hence, at step 1408, points belonging to the object can be extracted from the 3D bounding box in that frame. Those point can now, in turn, be aggregated (1410) with the object points of the current object model, to generate a new aggregate 3D model which incorporates the point information extracted from the most recent frame.

The process can now be repeated iteratively for the next frame, from step 1404 onwards—noting that, from now on, the current object model as propagated into the next frame is an aggregate object model incorporating point information from multiple frames. Hence, from now on, it is the current aggregate object model that is aligned with the object in the next frame. With each iteration of the process, points from yet another frame are added, allowing progressively dense and complete aggregate object models to be generated.

5. Automatic/Semi-Automatic 2D Annotation Data Generation:

As indicated, as well generating 3D annotation data quickly and with reduced human effort, the efforts of the annotator can also be used to generate high-quality 2D annotation data, with no or minimal additional human input.

Figure 12A:
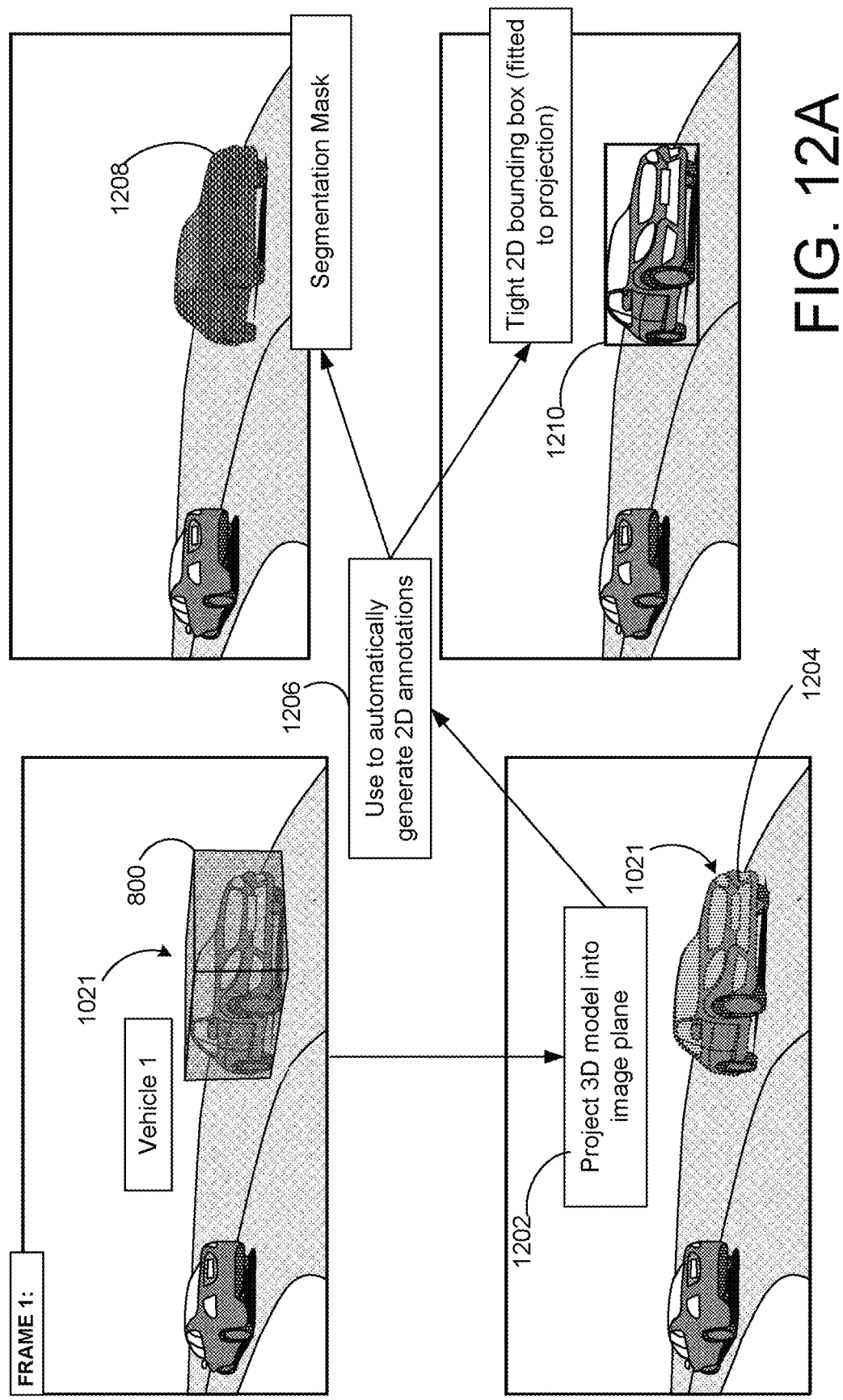

FIG. 12A, which shows a flowchart for a method of automatically generating 2D annotation data along with a graphical illustration of the method steps. The method is implemented by the 2D annotation generator 312.

At the top-left, frame 1 is depicted for ease of reference. Vehicle 1 is the object to be annotated in this example and is denoted by reference numeral 1021. The 3D model of that vehicle is determined by isolating the subset of the point cloud 400 within that bounding box, as described above and, at step 1002, that subset of the point cloud is projected into the image plane of the frame in question. The projection of the subset of the point cloud (i.e. the 3D model of the vehicle in question) is denoted by reference numeral 1204 in the bottom-left hand image. As can be seen, the projection of the point cloud 1004 coincides with the object 1000 as expected.

At step 1206, 2D annotation data for annotating the image 702 is automatically generated based on the projection 1204 of the 3D model into the image plane.

The 2D annotation data can be in the form of a 2D segmentation mask 1208 (top-right) which substantially matches the area of the object within the image plane (i.e. it at least approximately delineates the object in the image plane, tracing the boundary or boundaries of the object). Such annotation data is useful for training a segmentation component to perform instance segmentation, i.e. pixel-level classification of images, in which each pixel of an input image is classified individually. In this example, the annotated object 1021 belongs to a particular object class (such as "car" or "vehicle") and the image 702 in combination with the segmentation mask 1208 can be used in training a segmentation component to label image pixels as "car/not car" or "vehicle/not vehicle" for example, depending on whether or not those pixels lie within the area of the segmentation mask 1208.

The projection 1204 of the 3D object model is point-based and may be too sparse to serve as a useful segmentation mask directly (although this can be mitigated through the use of an aggregate object model). To generate the segmentation mask 1208, a predictive model, such as a conditional random field (CRF), may be applied to the projected points, in order to fill in and smooth the projection 1204, thereby converting it into a useful segmentation mask that accurately defines the area of the object within the image plane. In this context, the projection 1204 of the 3D model serves as a sparse prior, which the predictive model extrapolates from in order to predict a complete segmentation mask for the object. Optionally, the parameter(s) of the predictive model may be adjustable via the UI 320 in order to achieve the desired result. More generally, an annotator may be able to adjust parameters of the CRF and/or super pixel segmentation parameters etc. to effect manual corrections. This may be a post-processing step applied after the annotation data has been generated.

As another example, the 2D annotation data can be in the form of a tightly-fitted 2D bounding box 1210 (bottom-left). This is generated by fitting a 2D bounding box (rectangle in the image plane) to the projection 1204 of the 3D model. This, in turn, can be used, in combination with the image 702 itself, to train a 2D bounding box detector. Such a component, once trained, will be able to automatically detect and localize structure within images by automatically generating 2D bounding boxes for images it receives at inference.

An alternative would be to simply project the 3D bounding box into the image plane, and fit the 2D bounding box to the projection of the 3D bounding box. However, in general this will not result in a tight 2D bounding box: as can be seen in the top-right image of FIG. 12A, because the shape of the 3D bounding box 800 different from that of the vehicle, in general, the edge of the projected 3D bounding box will not coincide with the edge of the vehicle a it appears in the 2D image plane.

Once generated, the annotator has the option to fine-tune the 2D annotation data as needed, as denoted in FIG. 3 by the input from the UI 320 to the 2D annotation generator 312.

As noted, the 3D object model may be in the form of a 3D surface model fitted to the relevant extracted points. In that event, the 3D surface model is projected into the image plane in order to create the 2D annotation data. The projection is thus of the continuous 3D surface, which can provide higher quality 2D annotation data than a projection of a discrete (and possibly sparse) set of 3D structure points.

5.1 Occluded Objects:

2D annotation data can be generated for occluded objects using either single-frame or aggregate object models. The annotator can select between these two options via the UI 320 as appropriate.

Figure 12B:
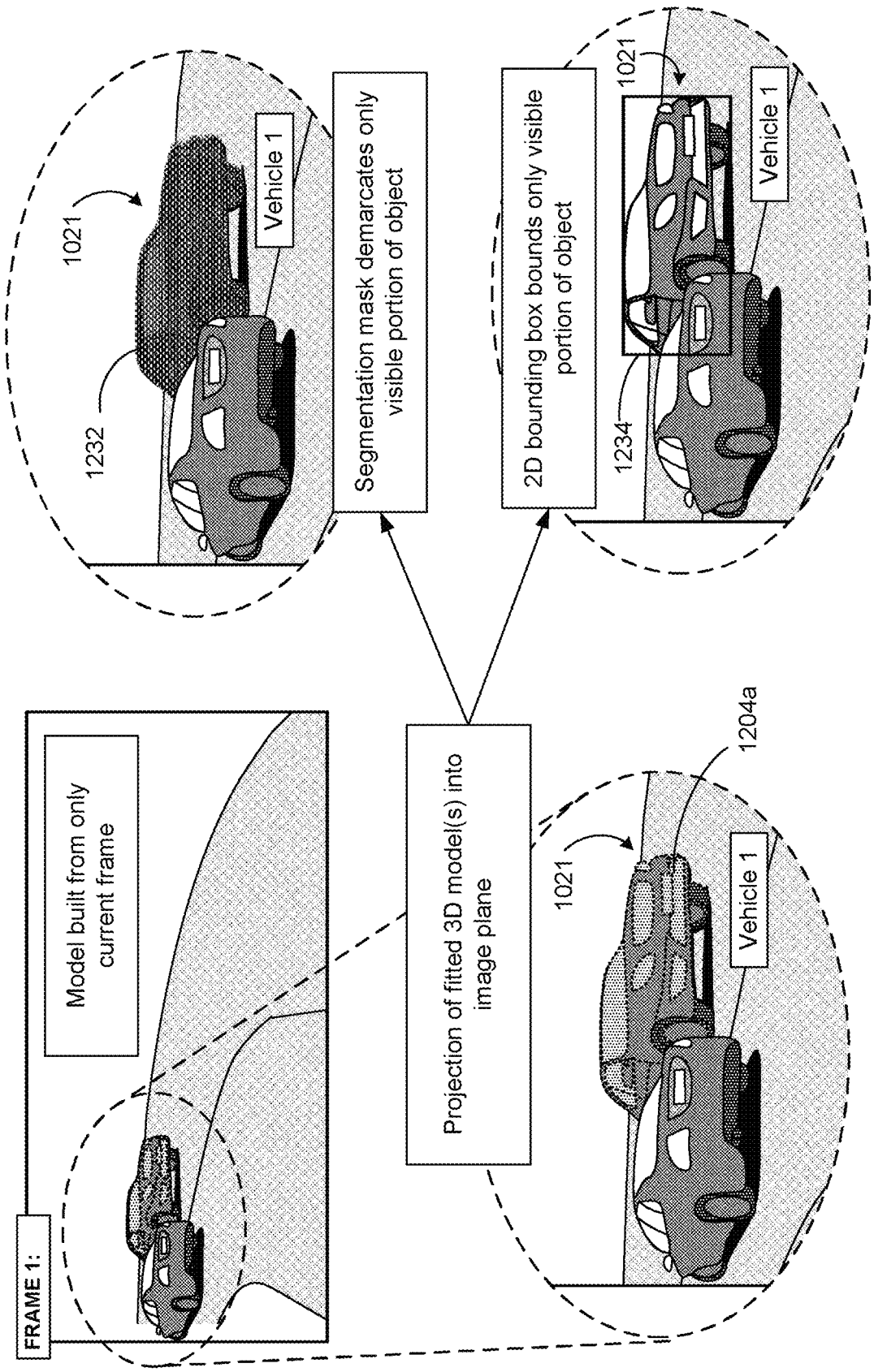

FIG. 12B uses frame 2 as an example, in which vehicle 1 is partially occluded by vehicle 2. In the example of FIG. 12B, a single-frame 3D model of vehicle 1 is determined based solely on the point cloud of frame 2, by isolating a subset of that point cloud within a 3D bounding box placed around vehicle 1 (not shown). Hence, the single-frame model of vehicle 1, denoted by reference numeral 1224 in the bottom-left of FIG. 12B, only includes non-occluded points of the first object 1220. Hence, when the single-frame 3D model 1224 is projected back into the image plane, and used to automatically generate 2D annotation data, that 2D annotation data will mark only the visible portion(s) of the occluded object 1220. The projection of the model is denoted by reference numeral 1204a towards the bottom left of the figure. This effect on the 2D annotation data is illustrated on the right-hand side, which shows a segmentation mask 1232 (top-right) generated based on the projection 1204a of the single-frame model. As can be seen, this covers only the area of the visible portion of the occluded object 1232. Similarly, when a 2D bounding box 1234 (bottom-right) is fitted to the projection of a single-frame model, that bounding box will be tightly fitted to the visible portion of the occluded object 1220.

Figure 12C:
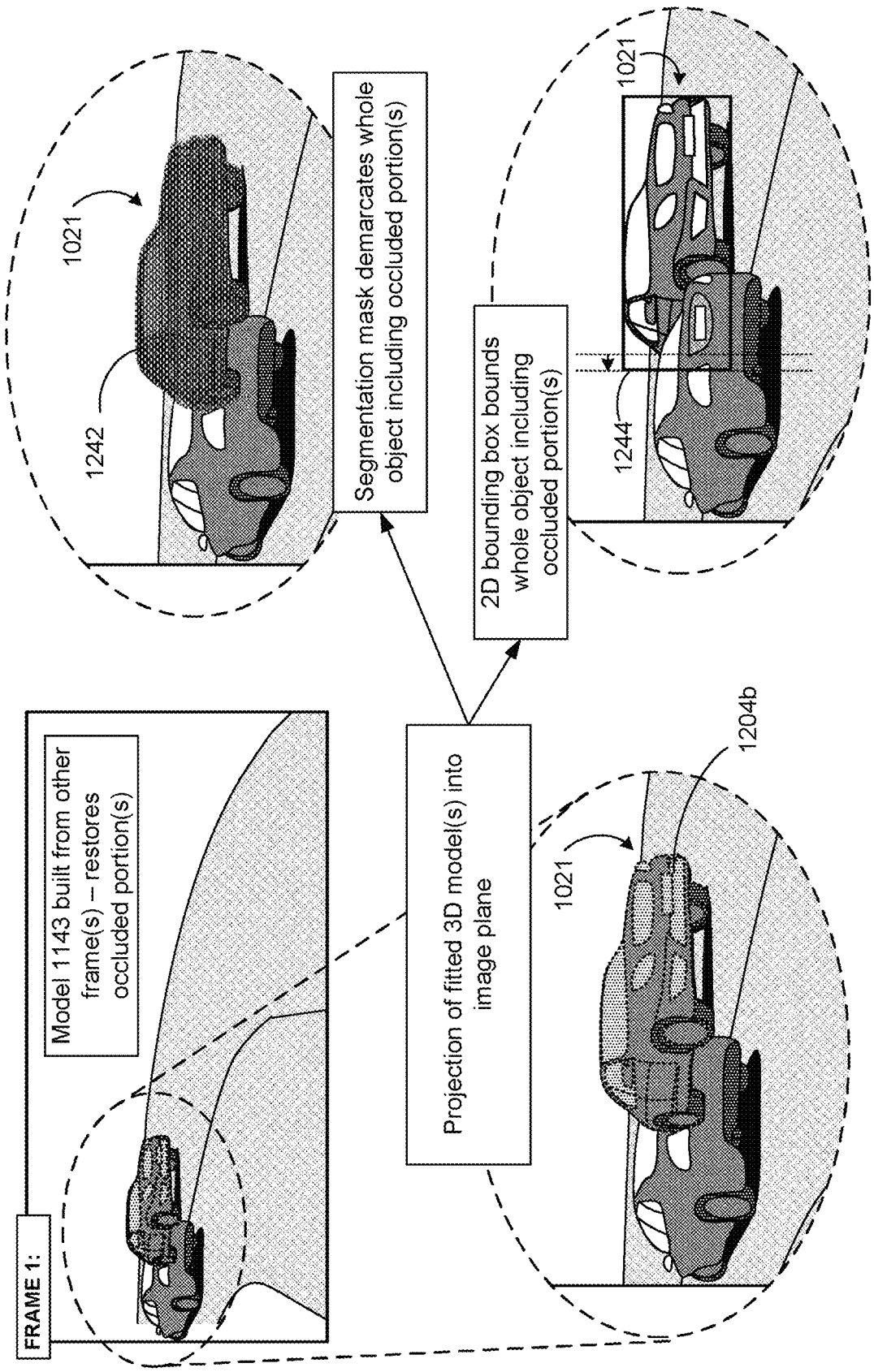

FIG. 12C shows a second example in which the object model 11 propagated from frame 1 is used instead. In this case, the occluded portion of the object 1220 is "filled-in" using point cloud data from one or more related frames in which that portion of the object is not occluded. As can be seen on the left-hand side of FIG. 12C, when such a model is projected back into the image frame, the occluded portion of the object is "restored". The projection of the propagated object model 1143 is denoted by reference numeral 1204b.

Thus, when that projection 1204b is used as a basis for a segmentation mask, denoted by reference numeral 1242 (top-right), this will cover the whole area of the object 1220—including the occluded portion(s). This may not be desired in practice, but it may nonetheless be desirable to use a propagated (e.g. aggregate) model in view of the other benefits it provides (greater density, less noise etc.). In that case, an aggregate model may be determined for the occluding object in the same way, and the 3D model of the occluding object can be used to "block" the projection of the 3D model into the image plane, and ensure the segmentation mask covers only the non-occluded part of the object that is visible in the image plane.

Similarly, when a 2D bounding box 1244 (bottom-right) is fitted to the projection of the propagated object model, that bounding box will be fitted to the whole object, including the occluded portion(s); depending on the location of the occluded portion(s), this may result in the 2D bounding box extending beyond the visible portion of the object—for example, in FIG. 12C, bottom-right, the left edge of the bounding box 1244 can be seen to extend beyond the left-most visible part of the object 1220 to encompass the occluded left-most portion of the object 1220.

A similar effect would be achieved by using an aggregate object model, for example generated by aggregating points from the point clouds of frame 1 and frame 2 corresponding to vehicle 1 in the manner set out above, and applying the aggregate model to frame 2.

6. Interpolation Based on Vehicle Path

Reference is made to United Kingdom Patent Application No. 1815767.7, which is incorporated herein by reference in its entirety. This discloses a method by which a path of an external vehicle may be inferred in dependence on the reconstructed ego vehicle path.

In the present context, the reconstructed vehicle path may be used to determine the initial coarse-estimate of the pose 1121 of the bounding box 800 (FIG. 11B) automatically.

Figures 13A, 13B:
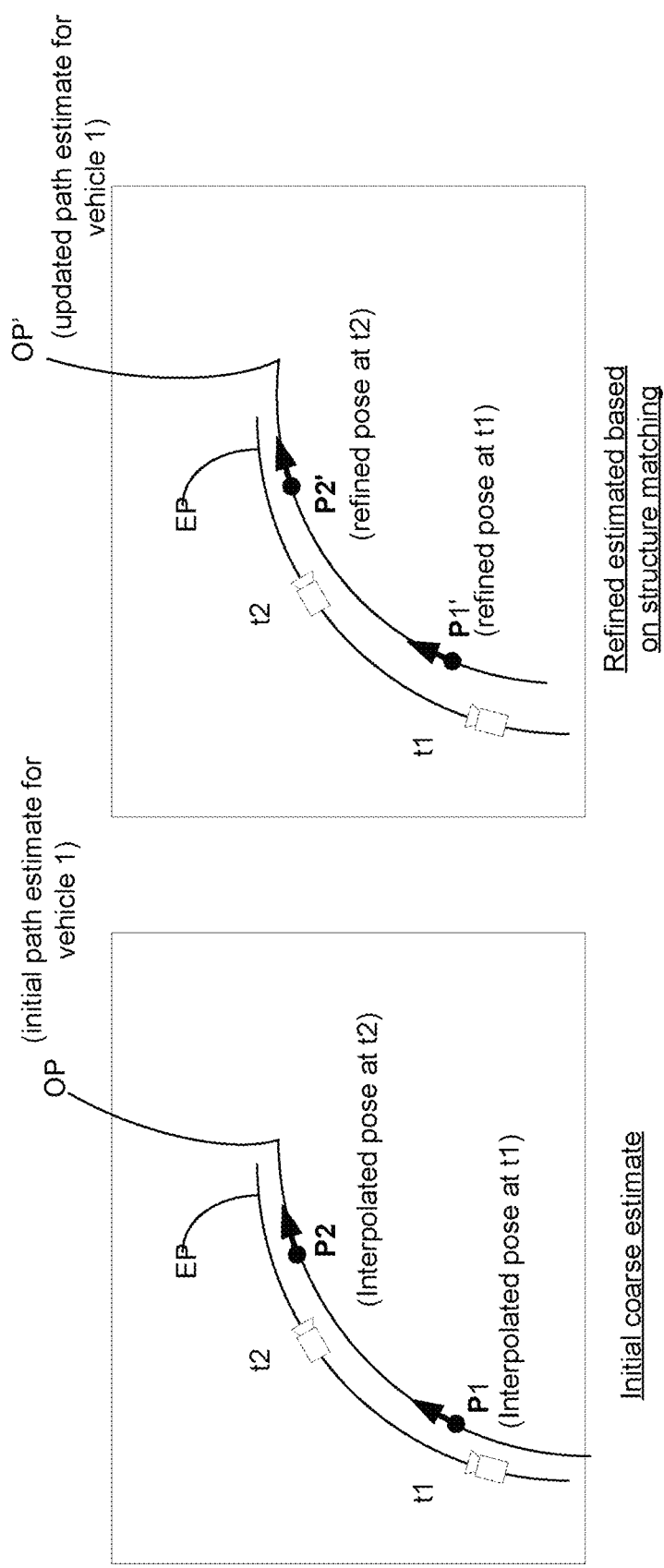
FIGS. 13A to 13C schematically illustrate how vehicle path information may be incorporated into an automatic or semi-automatic annotation process.

With reference to FIGS. 13A and 13B, an additional optional feature allows the accuracy of the vehicle path to, in turn, be increased as the position estimate is refined.

FIG. 13A shows the camera at known poses, at respective time instants t2, t2, along the reconstructed ego-vehicle path, denoted EP (ego path). An object path (OP) has been inferred for the object to be annotated (vehicle 1 in the above enables), based on the ego path EP. Based on the time instants t1 and t2, the respective poses of the object can be initially inferred by interpolation from the object path OP, as P1 and P2. This provides a starting point for the manual or automatic registration with the 3D model 1143 of vehicle 1 with the point clouds at time instants t1 and t2 respectively.

FIG. 13B shows that refined (more accurate) poses P1', P2' have been determined by aligning the 3D model 1143 with the point clouds at time instants t1 and t2 respectively, in the manner described above.

Additionally, now that those more accurate poses P1', P2' are know, an updated vehicle path OP' can be determined based thereon as indicated in FIG. 13B.

This can be used for various purposes—for example, to provide more accurate initial pose estimates in respect of other frames.

Information about the vehicle path can also be incorporated into the structure matching process, to penalize changes in the pose of the 3D bounding box 800/3D model 1143 which deviate from an expected vehicle behaviour model, i.e. which cause unexpected changes in the vehicle path.

Figure 13C:
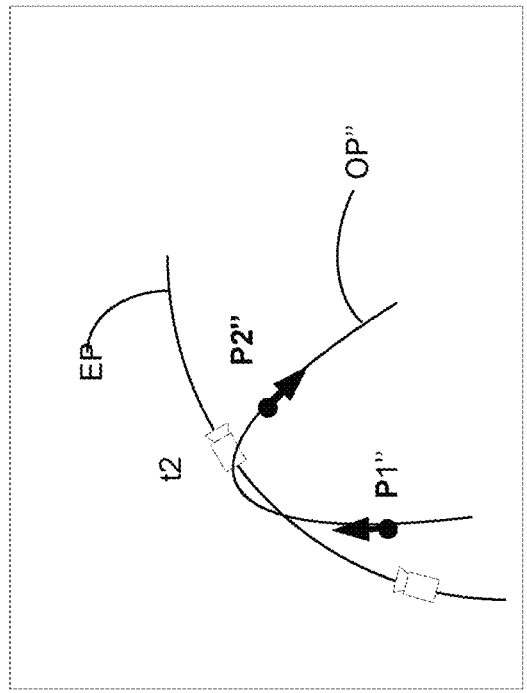

An example is illustrated in FIG. 13C—in this case poses P1" and P2" at t1 and t2 respectively may happen to provide good registration of the 3D model 1143 with the point could at t1 and t2 respectively. However, these poses P1" and P2" imply an unrealistic path for vehicle 1 denoted OP", which should be penalized according to the expected behaviour model.

This dependence on expected behaviour may be incorporated in a cost function, which rewards good registration but penalizes unexpected changes in the vehicle path. The automatic alignment process to register the model 1143 with the point cloud of the frame in question is applied so as to optimize the cost function. Hence, in the example of FIG. 13C, alternative poses may be instead be selected if the penalty assigned to path OP" by the cost function is too high.

6.1 Iterative Path Refinement

The principles set out above can be applied in an iterative fashion, by iteratively building out from an initial coarse annotation i.e. by creating initial annotation(s), aligning the poses(s), refining motion model, repeat with more poses based on the refined model motion and so on.

As indicated, the coarse annotation could be provided by:
1. model in the loop (e.g. a neural network or a moving object detector) in 2D or 3D;
2. coarse dynamics model of bounding box (e.g. constant velocity);
3. by providing a "one-click" on object function point or 2D "lasso" function around points;
d. minimising some cost function that takes into account 2D error, 3D error and likely behaviour.

With reference to FIG. 2, an instance of a perception component 102 refers to any tangible embodiment of the one or more underlying perception models of the perception component 102, which can be a software or hardware instance, or a combined software and hardware instance. Such an instance can be embodied using programmable hardware, such as a general-purpose processor (e.g. CPU, accelerator such as a GPU etc.) or a field programmable gate array (FPGA), or any other form of programmable computer or computers. A computer program for programming a computer can thus take the form of program instructions for execution on a general-purpose processor, circuit description code for programming an FPGA etc. An instance of a perception component can also be implemented using non-programmable hardware, such as an application specific integrated circuit (ASIC), and such hardware may be referred to herein as a non-programmable computer. In general, a perception component may be embodied in one or more computers which may or may not be programmable, and which are programmed or otherwise configured to execute the perception component 102.

With reference to FIG. 3, the components 302-314 of FIG. 3 are functional components of the annotation computer system 300 which may be implemented at the hardware level in various ways: although not shown in FIG. 3, the annotation computer system 300 comprises one or more processors (computers) which carry out the functionality of the aforementioned components. A processor can take the form of a general-purpose processor such as a CPU (Central Processing unit) or accelerator (e.g. GPU) etc. or more specialized form of hardware processor such as an FPGA (Filed Programmable Gate Array) or ASIC (Application-Specific Integrated Circuit). Although not shown separately, the UI 320 typically comprises at least one display and at least one user input device for receiving user inputs to allow the annotator to interface with the annotation system 300, such as a mouse/trackpad, touchscreen, keyboard etc. With reference to FIG. 5, the image rectifier 504, depth estimator 506 and depth transformation component 508 are functional components of the stereo image processing system 500 which can be implemented at the hardware level in different ways. For example, the functionality of the stereo image processing system 500 can be implemented in software, i.e. by computer code executed on a processor or processors such as a CPU, accelerator (e.g. GPU) etc., or in hardware (e.g. in an FPGA fabric and/or application specific integrated circuit (ASIC)), or using a combination of hardware and software. By way of example, United Kingdom Patent Application Nos. 1807392.4 and 1817390.6, each of which is incorporated herein by reference in its entirety, disclose examples of FPGA-based implementations of Semi Global Matching, which may be applied in the present context.

It will be appreciated that the above description has been provided by way of example only. Further aspects and embodiments of the present disclosure are set out below.

2D from 3D

A first aspect of the present disclosure (Aspect A) provides a computer-implemented method of creating 2D annotation data for annotating one or more perception inputs, the method comprising, in an annotation computer system: receiving at the annotation computer system at least one captured frame (first frame) comprising a set of 3D structure points, in which at least a portion of a structure component is captured; computing a reference position for the structure component within the frame; generating a 3D model for the structure component by selectively extracting 3D structure points of the frame based on the reference position; computing a projection of the 3D model into an image plane; and storing 2D annotation data of the computed projection in persistent computer storage for annotating the structure component within the image plane.

Embodiments of Aspect A may provide one or more of: manual annotation, automatic annotation and semi-automatic annotation.

In embodiments of Aspect A (Embodiments A1), the 2D annotation data may be stored in association with at least one perception input of said frame for annotating the structure component therein, and the projection may be computed based on the reference position computed within that frame. That is to say, the 2D annotation data may for the first frame which is also used to generate the 3D model, by applying the 3D model in that same frame.

Some such embodiments may further create 3D annotation data for the first frame, where the 3D annotation data comprises or is derived from the reference position. Preferably the 2D and 3D annotation data are created for the first frame using a common set of annotation operations.

In alternative embodiments of Aspect A (Embodiments A2), the 2D annotation data may be stored in association with at least one perception input of a second frame for annotating the structure component in the at least one perception input of the second frame, in which second frame at least a portion of a structure component is captured. That is to say, the 3D model may generated from a first frame (or a combination of the first and second frames in the case of an aggregate model), and applied in the second frame to create the 2D annotation data for the second frame. This is an example of "model propagation" as that term is used herein.

In the context of Embodiments A1, the structure component may be referred to as a common structure component (common to both frames). It is noted in this respect that, unless context demands otherwise, all description pertaining to a common structure component captured in multiple frames applies equally to the structure component of Embodiments A1 as captured in one or more frames.

In the general context of Aspect A, the first frame from which the 3D model is generated may be referred to as the "reference frame" and the term "target frame" may be used to refer to the frame for which the annotation data is created. Note that, in the context of Embodiments A1, the first frame is both the target frame and the reference frame. In the context of Embodiments A2, the second frame is the target frame.

In embodiments of Aspect A, the 3D model may also be used to create 3D annotation data for annotating the structure component in 3D space.

For example, 3D annotation data may be created for annotating the structure component in at least one perception input of a second frame, in which at least a portion of a structure component is captured. That is, the 3D model may be generated from the first frame and applied in the second frame in order to create 3D annotation data for the second frame.

The 2D or 3D annotation data may be created for annotating the at least one perception input of the second frame (the frame for which the 2D and/or 3D annotation data is generated) by computing an aligned model position for the 3D model within the second frame (see below).

2D annotation data may alternatively be created for the target frame by projecting the 3D model, as generated from the reference frame, into an image plane associated with the target frame, based on the aligned model position determined within the target frame. This means that a projection derived from the selectively-extracted points of the reference frame is used to create 2D annotation data for the target frame.

Alternatively, 2D annotation data may be created for the target frame by using the aligned model position (as determined using the 3D model generated from the reference frame) to generate a second 3D model, by selectively-extracting 3D structure points of the target frame based on the aligned model position, then projecting the second 3D model (as generated from the target frame) into the image plane associated with the target frame. In this case, the 2D annotation data comprises or is derived from a projection of the second 3D model generated from the target frame but positioned using the 3D model generated from the reference frame.

As another example, the second 3D model may be an aggregate 3D model generated by aggregating the selectively-extracted 3D structure points of the target and reference frames.

The selectively-extracted 3D structure points may be selectively extracted from the frame for generating the 3D model based on the reference position and one or more bounding object dimensions.

The one or more bounding object dimensions may be one of:
(i) manually-determined based on one or more sizing inputs received at a user interface,
(ii) automatically-determined by applying a perception component to the frame,
(iii) semi-automatically-determined by applying the perception component to the frame and further based on the one or more sizing inputs, and
(iv) assumed.

The selectively-extracted 3D structure points may be a subset of points within a 3D volume defined by the reference position and the one or more bounding object dimensions.

The 3D above annotation data may further comprise the one or more bounding object dimensions used to generate the 3D model, or a transformation thereof (thus defining a 3D bounding box for the applicable perception input).

The above second model may be generated from the target frame based on the aligned model position and the same one or more bounding object dimensions (for annotating a rigid common structure component) or a transformation thereof (for annotating a non-rigid common structure component).

Model Propagation

Second and third aspects of the present disclosure (Aspect B and Aspect C respectively) each provide computer-implemented method of creating one or more annotated perception inputs, the method comprising, in an annotation computer system: receiving a plurality of captured frames, each frame comprising a set of 3D structure points, in which at least a portion of a common structure component is captured; computing a reference position within a reference one of the frames; generating a 3D model for the common structure component by selectively extracting 3D structure points of the reference frame based on the reference position within that frame; determining an aligned model position for the 3D model within the target frame; and storing annotation data of the aligned model position in computer storage, in association with at least one perception input of the target frame for annotating the common structure component therein.

In accordance with Aspect B, the aligned model position is determined based on:
(i) one or more manual alignment inputs received in respect of the target frame at a user interface whilst rendering the 3D model for manually aligning the 3D model with the common structure component in the target frame.

In accordance with aspect C, the aligned model position is determined based on:
(ii) an automatic alignment of the 3D model with the common structure component in the target frame.

In embodiments, the automatic alignment may match features (2D or 3D) of the 3D model with features (2D or 3D) of the common structure component. However, the subject matter of aspect C is not limited in this respect and forms of automatic alignment are viable (see below for further examples).

Example Annotation Data

The term "annotation data of an aligned model position" means annotation data that comprises or is otherwise derived using the aligned model position.

For example, the annotation data of the aligned model position may comprise position data of the aligned model position for annotating a position of the common structure component in the at least one perception input of the target frame. Such position data is derived "directly" from the aligned model position (subject to any geometric transformation into a suitable frame of reference, as needed), i.e. once the 3D model has been used to determine the aligned model position, it plays no further role in the creation of such annotation data.

The position data may for example be 3D position data for annotating the position of the common structure component in 3D space (a form of 3D annotation data).

Alternatively or additionally, the annotation data of the aligned model position may comprise annotation data derived from the 3D model using the aligned model position (derived annotation data). That is to say, the 3D model may be both used to determine the aligned model position, and once that aligned model position has been determined, it may also be used to derive annotation data from the 3D model itself.

As another example, the 3D model generated from a reference frame (first 3D model) may be used to determine the aligned model position in a target frame. That aligned model position may then be used to generate a second 3D model from the target frame (see above). Hence, in that event, annotation data of the aligned model position may comprise annotation data derived from the second 3D model using the aligned model position.

An example of derived annotation data is 2D annotation data derived by projecting the applicable 3D model into an image plane based on the aligned model position. Such 2D annotation data may for example comprise a 2D bounding object fitted to a projection of the 3D model in the image plane, or a segmentation mask comprising or derived from the computed projection.

In embodiments of both Aspect B and Aspect C, the annotation data may be 2D annotation data, 3D annotation data, or a combination of 2D annotation data and 3D annotation data stored in association with one or more perception inputs of the target frame (i.e. each form of annotation data may be stored in association with the same perception input of different respective perception inputs of the target frame).

The annotation data may comprise refined annotation data computed by applying a predictive model in dependence on the subset of the 3D point cloud.

In the case of 3D annotation data, the predictive model may be applied to the 3D model itself.

In the case of 2D annotation data, the predictive model may be applied to the 3D model itself (before it is projected) or to the computed projection of the 3D model in the image plane.

Irrespective of whether the predictive model is applied to the 3D model or, in the case of 2D annotation data, the computed projection, the predictive model results in such refined annotation data.

The refined annotation data may for example have the effect of providing "filled-in" or "smoothed" annotation for the structure component.

The predictive model may be a conditional random field (CRF).

Model Alignment

Embodiments of Aspect B may provide one or both of manual annotation (i.e. (i) only) and semi-automatic annotation (i.e. based on the combination of (i) and (ii)) via propagation of the 3D model into the target frame.

Embodiments of Aspect C may provide one or both of automatic annotation (i.e. (ii) only) and semi-automatic annotation (i.e. based on the combination of (i) and (ii)) via propagation of the 3D model into the target frame.

That is, the aligned model position is determined by aligning the 3D model with the (portion of the) common structure component captured in the second frame, manually (based solely on the manual alignment inputs), automatically (based solely on the automatic alignment) or semi-automatically (based on both the manual alignment inputs and the automatic alignment), as applicable.

Embodiments A2 of Aspect A may be manual, automatic or semi-automatic, i.e. based on (i), (ii) or a combination of (i) and (ii).

In any of the preceding or following, the 3D model may be an aggregate 3D model as determined by aggregating selectively-extracted 3D structure points from two or more frames.

Aggregate Models

The 3D model may be an aggregate 3D model determined by aggregating the selectively extracted data points of the reference frame with data points extracted from the target reference frame, wherein the automatic alignment matches the aggregate 3D model with the common structure component in the target frame by matching the 3D structure points of the 3D model extracted from the reference frame with the common structure component in the target frame.

The method may comprise selectively extracting 3D structure points from the target frame based on the aligned model position and aggregating them with the selectively-extracted points of the first frame to generate an aggregate 3D model.

Alternatively or additionally, the 3D model may be an aggregate 3D model determined by aggregating the selectively extracted data points of the reference frame with data points extracted from at least a third of the frames other than the target and reference frames.

It will of course be appreciated that an aggregate model can be generated from more than two frames (and possibly many more frames, to build a dense aggregate 3D model).

The method may comprise the step of applying noise filtering to the aggregated 3D structure points, to filter-out noise points therefrom, for generating the aggregate 3D model.

Alternatively or additionally, the aggregate 3D model comprises a 3D surface model fitted to the aggregated 3D structure points (in the case that noise filtering is applied, this may be fitted to the filtered 3D structure points i.e. from which noise points have been filtered-out).

Alternatively or additionally, the method may comprise the step of applying a predictive model in dependence on the aggregated 3D surface points. For example, applying a predictive model to the aggregated 3D surface points in order to generate the 3D model, and/or applying a predictive model to a 2D projection of the aggregate 3D model in order to create a segmentation mask or other 2D annotation data.

Whilst noise filtering, predictive modelling and/or surface fitting may be applied for both single-frame and aggregate 3D models, there are particular benefits when one or more of these are applied with aggregate 3D models. For noise filtering, noise points within an aggregated set of structure points will be relatively sparser that points which actually belong to the common structure component, and thus can be filtered out more precisely. For predictive modelling, the aggregated points provide a stronger prior.

Further examples of aggregate model features are provided below.

Manual/Semi-Automatic Alignment

An aggregate 3D model can be usefully rendered to assist in manual alignment of the aggregate 3D model with the common structure component in the target frame.

For example, in a manual or semi-automatic alignment context, the aggregate 3D model may be updated and re-rendered as the one or more manual alignment inputs are received at the user, such that the aligning of the second reference position with the common structure component in the second frame has the effect of correcting a visual artefact in the rendered aggregate 3D model caused by initial misalignment of the second reference position.

Such visual artefact are caused by misalignment of the model position within the target frame relative to the reference position in the reference frame. For example, an annotator may be able to see duplicate or misaligned structural elements, features etc. within the aggregate 3D model. By adjusting the model position until such time as those artefacts are no longer visible, the annotator can find the correct model position within the target frame.

In this context, it is sufficient to simply render the 3D aggregate model for manually aligning the aggregate 3D model with the common structure component in the target frame—it is not in fact necessary to actually render any part of the target frame itself with an aggregate 3D model. In practice, it may be convenient to render the aggregate 3D model within the target frame, so that the annotator has another means of seeing the effect of his adjustments. In some cases, an option may be provided to render an enlarged version of the aggregate 3D model, which the annotator may choose to use to make final adjustments.

The aligned model position may be determined based the one or more manual alignment inputs without using any automatic alignment.

Further disclosure pertaining to aggregate 3D models is provided below.

Automatic/Semi-Automatic Model Alignment

The automatic alignment may comprise Iterative Closest Point.

Further or alternatively, the automatic alignment may use at least one of: colour matching, 2D feature matching and 3D feature matching.

Further or alternatively, the automatic alignment may comprise computing a projection of the 3D model into a 2D image plane associated with the target frame, and adjusting the model position in 3D space so as to match the projection with 2D features of the common structure component within the 2D image plane.

The model position may, for example, be adjusted to minimise a re-projection error or other photometric cost function.

For example, the target frame may comprise data of a depth component of a 3D image, and the projection is matched to 2D features of the common structure component captured in a colour component of the 3D image.

The aligned model position may be determined automatically without any manual alignment inputs.

Some such embodiments, may still operate based on coarse estimation initially followed by fine adjustment.

That is, the aligned model position may be determined by initially estimating the model position within the target frame, and then applying the automatic alignment to adjust the estimated model position.

Whilst in a semi-automatic alignment, the model position may be initially estimated as a manually-defined position denoted by one or more manual position inputs received at a user interface, in a fully automatic alignment the model position is initially estimated automatically.

The model position may be initially estimated by applying a structure perception component to the target frame.

Automatic/Semi-Automatic Model Alignment Based on Structure Component Path

As another example, the frames may be time sequenced, and the model position may be initially estimated automatically based on a (common) structure component path within a time interval of the time-sequenced frames.

Moreover, the common structure component path may be updated based on the automatic alignment applied to the target frame.

The updated common structure component path may be used to compute a position of the common structure in one of the plurality of frames other than the target frame.

The method may comprise the step of storing 2D or 3D annotation data of the position computed for said one frame for annotating the common structure component in at least one perception input of that frame.

The automatic alignment may be performed so as to optimize a defined cost function which rewards matching of the 3D model with the common structure component whilst penalizing unexpected behaviour of the common structure component, as defined by an expected behaviour model for the common structure component.

For example, the defined cost function may penalize unexpected changes to the common structure component path, as defined by the expected behaviour model.

This advantageously incorporates knowledge of measured or assumed behaviour to provide more reliable alignment across frames.

The common structure component path may also be used to compute the reference position within the reference frame for generating the 3D model (before the path is updated).

Semi-Automatic Model Alignment

The aligned model position may be determined semi-automatically by initially estimating the model position automatically, and then aligning the estimated model position according to the one or more manual alignment inputs.

That is, it may be coarse-aligned automatically and then adjusted manually.

Alternatively or additionally, the aligned model position may be initially estimated by applying a structure perception component to the target frame.

Alternatively or additionally, in the case that the frames are time sequenced, the model position may initially be estimated based on a common structure component path within a time interval of the time-sequenced frames.

Alternatively or additionally, the model position may initially be estimated based on the automatic alignment of the 3D model with the common structure component in the target frame.

As another example, the aligned model position may be determined semi-automatically by initially estimating the model position according to the one or more manual alignment inputs, and then aligning the estimated model position according based on the automated alignment process.

That is, it may be coarse-aligned manually and then adjusted automatically.

Computing Reference Position

In embodiments of manual or automatic alignment, i.e. (i) or (i) and (ii), the reference position may be computed for the reference frame based on one or more positioning inputs received in respect of the reference frame at the user interface whilst rendering a visual indication of the reference position within the reference frame for manually adjusting the reference position within the reference frame.

The reference position may be computed for the reference frame automatically or semi-automatically.

The reference position may be computed based on one or more positioning inputs received at a user interface whilst rendering a visual indication of the reference position within the frame for manually adjusting the reference position within the frame.

The reference position may be computed for the reference frame automatically or semi-automatically.

The reference position may be computed automatically or semi-automatically based on a (common) structure component path within a time interval of the time-sequenced frames.

The reference position may be computed automatically or semi-automatically by applying a perception component to the reference frame.

Alternatively or additionally, the reference position may be computed automatically or semi-automatically based on a common structure component path within a time interval of the time-sequenced frames.

Iterative Generation and Propagation of Aggregate 3D Models

The reference position may be computed within the reference frame as an aligned model position of an existing 3D model of the structure component based on at least one of: (i) one or more manual alignment inputs received in respect of said frame at a user interface whilst rendering the existing 3D model for manually aligning the existing 3D model with the structure component in the reference frame, and (ii) an automatic alignment of the existing 3D model with the structure component in the reference frame.

The existing 3D model may have been generated from one or more other frames in which at least a portion of the structure component is captured.

The 3D model may be an aggregate 3D model determined by aggregating the selectively-extracted 3D structure points with 3D structure points of the existing 3D model.

The automatic alignment may comprise computing a projection of the existing 3D model into a 2D image plane associated with the reference frame, and adjusting the model position in 3D space so as to match the projection with 2D features of the common structure component within the 2D image plane.

Bounding Object Dimensions

One or more bounding object dimensions may be determined for the common structure component.

The one or more bounding object dimensions may one of:
(i) manually-determined based on one or more sizing inputs received at the user interface in respect of the reference frame,
(ii) automatically-determined by applying a perception component to the reference frame,
(iii) semi-automatically-determined by applying the perception component to the reference frame and further based on the one or more sizing inputs received in respect of the reference frame, and
(iv) assumed.

The selectively-extracted 3D structure points of the reference frame may be selectively extracted therefrom for generating the 3D model based on the reference position computed within the reference frame and the one or more bounding object dimensions.

The selectively-extracted 3D structure points may be a subset of points within a 3D volume defined by the reference position and the one or more bounding object dimensions.

The annotation data for the at least one perception input of the target frame may further comprise: the one or more bounding object dimensions for annotating a rigid common structure component, or a transformation of the one or more bounding object dimensions for annotating a non-rigid common structure component.

The one or more bounding objects dimensions may be determined manually or semi-automatically based on the one or more sizing inputs received in respect of the reference frame, wherein the visual indication of the reference position is in the form of a 3D bounding object rendered at the reference position within the reference frame and having said one or more bounding object dimensions for manually adjusting those one or more bounding object dimensions.

The one or more bounding object dimensions may be computed based additionally on one or more adjustment inputs received at the user interface in respect of the target frame whilst rendering the 3D bounding object at the aligned model position within the target frame. The 3D bounding object may be simultaneously or subsequently rendered at the reference position within the reference frame with the one or more bounding object dimensions adjusted according to the one or more adjustment inputs received in respect of the target frame (to allow an annotator to see the effect of any adjustments made in the target frame in the context of the reference frame).

2D/3D Annotation Data

Reference is made in the following to both 2D annotation data and 3D annotation data. Unless otherwise indicated, this refers to 2D or 3D annotation data created for annotating the structure component in at least one perception input of the target frame.

It is noted, however, that embodiments of any of the above aspects may additionally create and store further annotation data for annotating the common structure component in at least one perception input of the reference frame. Such embodiments may, advantageously, leverage a common set of annotation operations (manual, automatic, or semi-automatic) to create annotation data for both the target frame and the reference frame.

Moreover, in embodiments of any of the above, both 2D and 3D annotation data may be created. In some such embodiments, one such type of annotation data may be created for annotating one or more perception inputs of the target frame, and the other type of annotation data may be created for annotating one or more perception inputs of the target frame. This may similarly leverage a common set of annotation operations to create both types of annotation data.

By way of example, common annotation operations may be used to create:
2D annotation data for both the target and reference frames;
3D annotation data for both the target and reference frames;
2D annotation data for the reference frame, and 3D annotation data for the target frame;
2D annotation data and 3D annotation data for the target frame The above examples are provided for illustration purposes only, and are by no means exhaustive.

The annotation data may comprise both 2D annotation data of the aligned model position and 3D annotation data of the aligned model position stored in association with one or more perception inputs of the target frame, whereby the aligned model position is used for both 2D and 3D annotation of one or more perception inputs of the target frame.

Alternatively or additionally, further annotation data of the reference position may be stored for annotating the common structure component in at least one perception input of the reference frame, whereby the reference position computed within the reference frame is used for annotating perception inputs of both the target and reference frames.

The further annotation data may comprise the same one or more bounding object dimensions for annotating a rigid common structure component, or a transformation thereof for annotating a non-rigid structure component.

In embodiments, the 2D annotation data may comprise a 2D bounding object for the structure component, which is fitted, in the image plane, to the computed projection of the 3D model.

Alternatively or additionally, the 2D annotation data may comprise a segmentation mask for the structure component.

Aggregate 3D Models (Cont.)

A fourth aspect of the present disclosure (Aspect D) provides a computer-implemented method of modelling a common structure component, the method comprising, in a modelling computer system: receiving a plurality of captured frames, each frame comprising a set of 3D structure points, in which at least a portion of a common structure component is captured; computing a first reference position within a first of the frames; selectively extracting first 3D structure points of the first frame based on the first reference position computed for the first frame; computing a second reference position within a second of the frames; selectively extracting second 3D structure points of the second frame based on the second reference position computed for the second frame; and aggregating first 3D structure points and the second 3D structure points, thereby generating an aggregate 3D model of the common structure component based on the first and second reference positions.

In embodiments of Aspect D, the aggregate 3D model may be used to generate annotation data for annotating the common structure component in a training example of one of the plurality of frames, said one frame being the first frame, the second frame, or a third frame of the plurality of frames.

Note however that Aspect D is not limited in this respect, and the aggregate 3D model can alternatively (or additionally) be used for other purposes—see below.

In embodiments, the annotation data may be generated in accordance with any of Aspects A-C or any embodiment thereof.

The annotation data may comprise comprises at least one of: 2D annotation data derived by projecting the 3D model into an image plane, and 3D annotation data.

Said one frame may be the third frame, and the method may comprise the step of computing an aligned model position for the 3D model within the third frame, the annotation data being annotation data of that computed position, wherein the aligned model position is determined based on at least one of:
 (i) an automatic alignment of the 3D model with the common structure component in the third frame, and
 (ii) one or more manual alignment inputs received in respect of the third frame at a user interface whilst rendering the 3D model for manually aligning the 3D model with the common structure component in the third frame.

The second reference position within the second frame may be initially estimated for generating the aggregate 3D model, and the method comprises the steps of subsequently aligning the second reference position with the common structure component in the second frame based on at least one of:
 (i) an automatic alignment of the first 3D structure points extracted from the first frame with the common structure component in the second frame to automatically align the aggregate 3D model with the common structure component in the second frame, and
 (ii) one or more manual alignment inputs received in respect of the second frame at a user interface whilst rendering the aggregate 3D model for manually aligning the aggregate 3D model with the common structure component in the second frame;
wherein the aggregate 3D model may be updated based on the second frame and the aligned second reference position within the second frame.

A first 3D model may be generated by selectively extracting the first 3D structure points, wherein the second reference position is aligned with the common structure component in the second frame for generating the aggregate 3D model based on at least one of: (i) an automatic alignment of the first 3D model with the common structure component in the second frame, and (ii) one or more manual alignment inputs received in respect of the second frame at a user interface whilst rendering the first 3D model for manually aligning the first 3D model with the common structure component in the second frame.

At least a portion of the common structure component may be captured in a third of the frames, and the method may comprise: aligning a third reference position with the common structure component in the third frame based on at least one of: (i) an automatic alignment of the aggregate 3D model with the common structure component in the third frame, and (ii) one or more manual alignment inputs received at the user interface in respect of the third frame whilst rendering the aggregate 3D model for manually aligning the aggregate 3D model with the common structure component in the third frame; selectively extracting third 3D structure points of the third frame based on the third reference position; and aggregating the first, second and third 3D structure points, thereby generating a second aggregate 3D model of the common structure component based on the first, second and third reference positions.

The set of 3D structure points of the third frame may be transformed into a frame of reference of the third reference position to selectively extract the third 3D structure points.

The second reference position within the second frame may be initially estimated for generating the aggregate 3D model, and the aggregate 3D model may be updated based on the second frame and the aligned second reference position within the second frame.

The aggregate 3D model may be rendered via a user interface, and updated and re-rendered as one or more manual alignment inputs are received at the user interface in respect of the second frame for manually aligning the second reference position with the common structure component, such that the aligning of the second reference position with the common structure component in the second frame has the effect of correcting a visual artefact in the rendered aggregate 3D model caused by initial misalignment of the second reference position.

Note that, in this context the aligned second reference position is equivalent to the "aligned model position" referred to elsewhere in this disclosure, with second frame assuming the role of the target frame. All of the above description pertaining to the model position applies equally to the second reference position in this context (including, for example, the case in which the second reference position is initially estimated, and then adjusted, using any of the manual, automatic or semi-automatic processes above).

The aggregate 3D model may be updated and re-rendered as the one or more manual alignment inputs are received at the user, such that the aligning of the second reference position with the common structure component in the second frame has the effect of correcting a visual artefact in the rendered aggregate 3D model caused by initial misalignment of the second reference position.

As noted above, this provides the annotator with a means of manually aligning (or adjusting the alignment of) the second reference position, with the benefits set out above.

Said one frame may be the second frame, the annotation data being annotation data of the aligned second reference position.

The annotation data may comprise position data of the aligned second reference position for annotating a position of the common structure component in the at least one training example of the target frame, for example 3D position data for annotating the position of the common structure component in 3D space.

Further or alternatively, the annotation data may comprise data derived from the aggregate 3D model using the aligned second reference position, for example 2D annotation data derived by projecting the 3D model into an image plane based on the aligned second reference position, for example The first 3D structure points may be selectively extracted from the first frame for generating the 3D model based on the first reference position and one or more bounding object dimensions. The second 3D structure points may be selectively extracted from the second frame for generating the 3D model based on the second reference position and one of:
(a) the same one or more bounding object dimensions for modelling a rigid object, and
(b) a transformation of the one or more bounding object dimensions for modelling a non-rigid object.

The one or more bounding object dimensions may be one of:
(i) manually-determined based on one or more sizing inputs received in respect of the at least one of the first and second frames;
(ii) automatically-determined by applying a perception component to at least one of the first and second frames;
(iii) semi-automatically-determined by applying the perception component to the at least one frame and further based on the one or more sizing inputs received in respect of the at least one frame, and
(iv) assumed.

The first 3D structure may be a subset of points within a first 3D volume defined by the first reference position and the one or more bounding object dimensions. The second 3D structure points may be a subset of points within a second 3D volume defined by the second reference position and the same one or more bounding object dimensions or the transformation thereof.

The method may comprise the step of applying noise filtering to the aggregated 3D structure points, to filter-out noise points therefrom, for generating the aggregate 3D model.

The aggregate 3D model may comprise a 3D surface model fitted to the aggregated 3D structure points.

The method may comprise the step of applying a predictive model to the aggregated 3D surface points in order to generate the 3D model.

The method may comprise the step of using annotated perception input to train at least one perception component, wherein the annotation data for that perception input provides a ground truth for that perception input in the training process.

That is, in the notation of FIG. 1, the perception input is x and the annotation data provides the ground truth $y_x$.

Training Data Augmentation

As noted above, the use of aggregate 3D models is not restricted to the creation of annotated perception inputs. For example, an aggregate 3D model determined in accordance with Aspect D may alternatively or additionally be used for one or more of:
(a) training data augmentation, and
(b) simulation.

Training Data Augmentation

The aggregate 3D model may be used augment data of one of the plurality of frames with model data of the aggregate 3D model, and thereby create at least one augmented perception input comprising the data of said one frame and the model data of the 3D model, said one frame being the first frame, the second frame, or a third frame of the plurality of frames.

The model data may comprise at least one of: 2D augmentation data created by projecting the 3D model into an image plane, and 3D model data.

The method may comprise the step of using the augmented perception input to train at least one perception component, whereby the combination of the model data and the data of said one frame is provided as part of the same perception input to the perception component during training.

That is, in the notation of FIG. 1, the data of the frame and the model data each form part of the same perception input x.

The augmented perception input may be used in one of:
(a) an unsupervised training process without providing any ground truth for the augmented perception input (i.e. with no $y_x$ in the notation of FIG. 1), and
(b) a supervised training process in which the annotation data of claim 2 or any claim dependent thereon provides a ground truth for the augmented perception input.

Simulation

Further or attentively, the aggregate 3D model may be inputted to a simulator for rendering in a simulated environment, in which at least one autonomous agent is executed for navigating the simulated environment autonomously, and behaviour of the autonomous agent responsive to the simulated environment is recorded in an electronic behaviour log.

The autonomous agent may navigate the simulated environment using a simulated instance of a trained perception component applied to simulated perception inputs, wherein data of the electronic behaviour log may be used to retrain and/or redesign the perception component for applying to real-world perception inputs.

The method may comprise the step of embodying the retrained or redesigned perception component in a real-world autonomous robot control system for use in autonomous decision making based on real-world perception inputs.

Efficient Model Generation

In order to generate the 3D model efficiently (and, thus, quickly), the set of 3D structure points of the reference frame may be transformed into a frame of reference of the reference position, in order to selectively-extract the 3D structure points for the 3D model.

(Note the distinction here between the (3D) reference frame, and term "frame of reference" which is used in a geometric sense.)

For example, the 3D volume defined by the reference position and the one or more bounding object dimensions may be a cuboid aligned with coordinate axes of the frame of reference. This allows the subset of 3D structure points within that volume to be computed highly efficiently e.g. on a GPU.

For example, the 3D structure points may be selectively-extracted from the reference frame by scalar comparison performed in the above frame of reference.

For an aggregate 3D mode, the set of 3D structure points of the first frame may be transformed into a frame of reference of the first reference position to selectively extract the first 3D structure points; and the set of 3D structure points of the second frame may be transformed into a frame of reference of the second reference position to selectively extract the second 3D structure points.

The first 3D volume may be aligned with coordinate axes of the frame of reference of the first reference position, and the second 3D volume may be aligned with coordinate axes of the frame of reference of the second reference position.

Perception Inputs—Examples

The at least one perception input may comprise 2D image data of or associated with the target frame, the image plane being the image plane of the image data.

The target frame may comprise data of a depth component of a 3D image and the image data of the perception input may be image data of a colour component of the 3D image.

The method may comprise the step of applying noise filtering to at least one of the following, to filter-out noise points therefrom: the extracted 3D structure points for generating the 3D model wherein the 3D model comprises or is derived from the filtered 3D structure points in that event, and the computed projection (in the case of 2D annotation data) wherein the 2D annotation data is 2D annotation data of the filtered projection in that event.

The noise filtering may be applied according to filtering criteria which are manually adjustable via a user interface of the annotation computer system.

The or each frame may be one of a plurality of time-sequenced frames.

Annotated Perception Inputs—Use Cases

Any above-mentioned perception component that is used to facilitate automatic or semi-automatic annotation may be a trained (machine learning) perception component. In that event, the trained perception component, may be re-trained using any of the above-mentioned annotated training inputs. The use of trained perception in this context may be referred to as "model in the loop".

More generally, the method may comprise the step of using the or each perception input in a training process to train at least one perception component, wherein the annotation data for that perception input provides a ground truth for that perception input in the training process.

For example, the perception component may be one of: a 2D bounding box detector, a 3D bounding box detector, an instance segmentation component, a location estimation component, an orientation estimation component and a distance estimation component.

For example, the 3D annotation data may be used to train a 3D perception component and the 2D annotation data is used to train a 2D perception component.

Example 3D Frames

The set of 3D structure points of the or each frame may be in the form of a point cloud.

The set of 3D structure points may have been captured using one or more sensors having one or more sensor modalities.

Each frame may correspond to a different single time instant.

At least one of the frames may comprise 3D structure points captured at multiple time instances, those points having been transformed so as to correspond to the single time instant to which that frame corresponds.

Each frame may be one of a plurality of time-sequenced frame. For example, the target and reference frames may be frames of a time sequence of frames corresponding to different respective time instants in the sequence.

The set of 3D structure points of the frame may be a merged set generated by merging at least two component sets of 3D structure points captured by different sensors.

Example 3D Models

Any of the above 3D models may comprise a 3D surface model fitted to the selectively-extracted 3D structure points. This could be a single-frame model fitted to 3D structure points selectively extracted from a single fame, or an aggregate 3D model fitted to points selectively extracted from multiple frames and aggregated.

This may be used for example to create 3D annotation data, comprising or based on a projection of the 3D surface model.

Another aspect of the present subject matter provides a computer-implemented method of creating one or more annotated perception inputs, the method comprising, in an annotation computer system: receiving at least one captured frame comprising a set of 3D structure points, in which at least a portion of a structure component is captured; receiving a 3D model for the structure component; determining an aligned model position for the 3D model within the frame based on an automatic alignment of the 3D model with the structure component in the frame; and storing annotation data of the aligned model position in computer storage, in association with at least one perception input of the frame for annotating the structure component therein.

In embodiments, the 3D model may be generated by selectively extracting 3D structure points of at least one reference frame based on a reference position computed within the reference frame.

However, the 3D model may also be a CAD (computer-aided design) model or other externally-generated model of the structure component.

That is to say, the automatic or semi-automatic model alignment features set out above may also be applied with externally-generated models. It will thus be appreciated that all description above pertaining to a 3D model generated from at least one reference frame applies equally to an externally-generated 3D model in this context.

Further Examples

To further illustrate how the various annotation features disclosed herein may be used individually or in combination, some further example use-cases and workflows supported by those features are set out below. As will be appreciated in view of the teaching presented herein, these are by no means exhaustive.

1. 3D to 2D annotation: Given a full or partial 3D model:
   a. generate a tight 2D bounding box;
   b. generate an instance segmentation mask (or a prior for a CRF/annotator/other method to refine the segmentation mask);

c. use projected points from a different frame to assist annotation (using the above x-ray vision feature) thus improving consistency and accuracy of annotation.
2. 3D model extracted from a single frame: Can be generated efficiently by transforming all the points of the frame to align with an axis of the 3D bounding box, meaning that a simple scalar comparison can be used to determine if any given point is enclosed.
3. 3D model extracted across multiple frames (aggregate 3D model): Using bounding boxes from multiple frames to extract and aggregate all the enclosed point cloud points (to generate an aggregated point cloud). The extraction can be performed efficiently for each frame by applying the above transformation in to each frame for the 3D bounding box as positioned in that frame.
   a. Noise may then be filtered out of the aggregated point cloud.
   b. The to generate an aggregated point cloud may be smoothed with a surface e.g. using SDF.
   c. Benefits of accumulating points include:
      i. Improved priors for instance segmentation, where a predictive model (e.g. CRF) is applied; or the aggregated point cloud may even be good enough for instance segmentation on its own (i.e. without applying a predictive model or fitting a surface model etc.);
      ii. Improved noise filtering/surface as there will be more points than a single frame;
      iii. An aggregate model is much more useful for augmenting training data than a single frame model as it will be of higher quality and have a greater range of viewpoints available;
      iv. A 2D bounding box can be drawn including the occluded portions of a partially occluded object.
4. Automatic 3D annotation: By means of one or more of the following:
   a. generating a 3D model from one frame, matching it with the point cloud in another frame (e.g. by Iterative Closest Point), and then combining into a single model and repeating with the next frame (using the combined model as the reference to match with);
   b. projecting the 3D model into the image and minimising the photometric error (i.e. automating the annotator 'by eye' alignment of the x-ray vision);
   c. feature matching in 2D and/or 3D and minimising the reprojection error of the matched features;
   d. iteratively building out from an initial coarse annotation i.e. determine initial annotation(s), align the poses(s), refine motion model, and repeat with more poses. A coarse annotation could be provided by:
      i. a model in the loop (e.g. a neural network or a moving object detector) in 2D or 3D;
      ii. an initial dynamics model (expected behaviour model) of bounding boxes across frames (e.g. on the assumption the object was travelling at a constant velocity);
      iii. A "One-click" on an object point (i.e. by selecting a single object point) or "2D lasso" around object points (i.e. by selecting a set of object point within a 2D plane, such as the image plane or a top-down view).
   e. a minimization of an alignment cost function that takes into account e.g. 2D error, 3D error and likely (expected) behaviour.

Whilst specific embodiments of the invention have been described above for the sake of illustration, it will be appreciated that these are not necessarily exhaustive. The scope of the invention is not defined by the described embodiments, but only by the accompanying claims.

The invention claimed is:

1. A computer-implemented method of creating one or more annotated perception inputs, the method comprising, in an annotation computer system:
   receiving a plurality of captured frames, each frame comprising a respective set of 3D structure points, in which at least a portion of a common structure component is captured, wherein the common structure component is a structure component common to the plurality of captured frames;
   computing a reference position within at least one reference frame of the plurality of frames;
   positioning a 3D bounding object in the at least one reference frame to bound the common structure component, wherein the reference position is a position of the 3D bounding object within the at least one reference frame;
   generating a 3D model for the common structure component by selectively extracting a plurality of 3D structure points from the set of 3D structure points of the at least one reference frame based on the reference position within the at least one reference frame, wherein the plurality of 3D structure points selectively extracted from the at least one reference frame are a subset of the set of 3D structure points of the at least one reference frame extracted from within a volume of the 3D bounding object;
   determining an aligned model position for the 3D model within a target frame of the plurality of frames based on one or more manual alignment inputs received in respect of the target frame at a user interface whilst rendering the 3D model for manually aligning the 3D model with the common structure component in the target frame; and
   storing annotation data of the aligned model position in computer storage, in association with at least one perception input of the target frame for annotating the common structure component therein,
   wherein the common structure component comprises a moving object, and wherein the 3D bounding object is a cuboid or a 3D object template.

2. The method of claim 1, wherein the annotation data of the aligned model position comprises position data of the aligned model position for annotating a position of the common structure component in the at least one perception input of the target frame.

3. The method of claim 1, wherein the annotation data of the aligned model position comprises annotation data derived from the 3D model using the aligned model position.

4. The method of claim 3, wherein the derived annotation data is 2D annotation data derived by:
   projecting the 3D model into an image plane associated with the target frame based on the aligned model position,
   projecting, into the image plane associated with the target frame, a single-frame 3D model generated by selectively extracting a plurality of 3D structure points from the set of 3D structure points of the target frame by positioning a 3D bounding object in the target frame at the aligned model position, wherein the plurality of 3D structure points selectively extracted from the target frame are a subset of the set of 3D structure points of the target frame extracted from within the volume of the 3D bounding object positioned in the target frame, or projecting, into the image plane associated with the target frame, an aggregate 3D model generated by:
selectively extracting the plurality of 3D structure points from the set of 3D structure points of target frame by positioning the 3D bounding object in the target frame at the aligned model position, wherein the plurality of 3D structure points selectively extracted from the target frame are a subset of the 3D structure points of the target frame extracted from within the volume of the 3D bounding object positioned in the target frame, and aggregating the plurality of 3D structure points selectively extracted from the target frame with the plurality of 3D structure points selectively extracted from the at least one reference frame.

5. The method of claim 4, wherein the 2D annotation data comprises at least one of: a 2D bounding object fitted to a projection of the 3D model, a projection of the single-frame 3D model, or a projection of the aggregate 3D model, in the image plane, or a segmentation mask for the common structure component.

6. The method of claim 1, wherein the reference position is computed for the at least one reference frame based on one or more positioning inputs received in respect of the at least one reference frame at the user interface whilst rendering a visual indication of the reference position within the at least one reference frame for manually adjusting the reference position within the at least one reference frame.

7. The method of claim 6, wherein one or more bounding object dimensions are determined for the common structure component manually or semi-automatically based on one or more sizing inputs received in respect of the at least one reference frame, wherein the visual indication of the reference position is in the form of a 3D bounding object rendered at the reference position within the at least one reference frame and having said one or more bounding object dimensions for manually adjusting those one or more bounding object dimensions.

8. The method of claim 7, wherein the one or more bounding object dimensions are computed based additionally on one or more adjustment inputs received at the user interface in respect of the target frame whilst rendering the 3D bounding object at the aligned model position within the target frame;
wherein the 3D bounding object is simultaneously or subsequently rendered at the reference position within the reference frame with the one or more bounding object dimensions adjusted according to the one or more adjustment inputs received in respect of the target frame.

9. The method of claim 1, wherein the reference position is computed for the at least one reference frame automatically or semi-automatically by applying a perception component to the at least one reference frame.

10. The method of claim 9, wherein the plurality of captured frames are time sequenced, and the reference position is computed automatically or semi-automatically based on a common structure component path within a time interval of the time-sequenced plurality of captured frames.

11. The method of claim 1, wherein one or more bounding object dimensions are determined for the common structure component, wherein the one or more bounding object dimensions are one of:

(i) manually-determined based on one or more sizing inputs received at the user interface in respect of the reference frame,
(ii) automatically-determined by applying a perception component to the reference frame,
(iii) semi-automatically-determined by applying the perception component to the reference frame and further based on the one or more sizing inputs received in respect of the reference frame, or
(iv) assumed.

12. The method of claim 11, wherein the plurality of 3D structure points selectively extracted from the at least one reference frame are selectively extracted therefrom for generating the 3D model based on the reference position computed within the at least one reference frame and the one or more bounding object dimensions.

13. The method of claim 1, wherein further annotation data of the reference position is stored for annotating the common structure component in at least one perception input of the at least one reference frame, whereby the reference position computed within the at least one reference frame is used for annotating perception inputs of both the target frame and the at least one reference frame.

14. The method of claim 1, wherein the 3D model is an aggregate 3D model determined by aggregating the selectively extracted data points of the at least one reference frame with data points extracted from at least one of: the target frame, or a third of the frames other than the target frame and the at least one reference frame.

15. The method of claim 1, comprising the step of using the at least one perception input in a training process to train at least one perception component, wherein the annotation data for the at least one perception input provides a ground truth for the at least one perception input in the training process.

16. The method of claim 1, wherein the set of 3D structure points of the at least one reference frame are transformed into a frame of reference of the reference position in order to selectively-extract the plurality of 3D structure points from the set of 3D structure points of the at least one reference frame for the 3D model.

17. The method of claim 1, wherein the aligned model position is determined semi-automatically by initially estimating the model position automatically, and then aligning the estimated model position according to the one or more manual alignment inputs.

18. The method of claim 1, wherein the moving object comprises a vehicle, cyclist, or pedestrian.

19. A computer system comprising:
an input configured to receive a plurality of captured frames, each frame comprising a respective set of 3D structure points, in which at least a portion of a common structure component is captured, wherein the common structure component is a structure component common to the plurality of captured frames; and
one or more computers programmed or otherwise configured to carry out the steps of:
computing a reference position within at least one reference frame of the plurality of frames;
positioning a 3D bounding object in the at least one reference frame to bound the common structure component, wherein the reference position is a position of the 3D bounding object within the at least one reference frame;
generating a 3D model for the common structure component by selectively extracting a plurality of 3D structure points from the set of 3D structure points of the at least one reference frame based on the reference position within the at least one reference frame, wherein the plurality of 3D structure points selectively extracted from the at least one reference frame are a subset of the set of 3D structure points of the at least one reference frame extracted from within a volume of the 3D bounding object;

determining an aligned model position for the 3D model within a target frame of the plurality of frames based on one or more manual alignment inputs received in respect of the target frame at a user interface whilst rendering the 3D model for manually aligning the 3D model with the common structure component in the target frame; and storing annotation data of the aligned model position in computer storage, in association with at least one perception input of the target frame for annotating the common structure component therein, wherein the common structure component comprises a moving object, and wherein the 3D bounding object is a cuboid or a 3D object template.

20. The computer system of claim 19, embodied in a robotic system, or as a simulator.

21. One or more computer programs embodied on non-transitory computer-readable media for programming a computer system to carry out the steps of:

receiving a plurality of captured frames, each frame comprising a respective set of 3D structure points, in which at least a portion of a common structure component is captured, wherein the common structure component is a structure component common to the plurality of captured frames;

computing a reference position within at least one reference frame of the plurality of frames;

positioning a 3D bounding object in the at least one reference frame to bound the common structure component, wherein the reference position is a position of the 3D bounding object within the at least one reference frame;

generating a 3D model for the common structure component by selectively extracting a plurality of 3D structure points from the set of 3D structure points of the at least one reference frame based on the reference position within the at least one reference frame, wherein the plurality of 3D structure points selectively extracted from the at least one reference frame are a subset of the set of 3D structure points of the at least one reference frame extracted from within a volume of the 3D bounding object;

determining an aligned model position for the 3D model within a target frame of the plurality of frames based on one or more manual alignment inputs received in respect of the target frame at a user interface whilst rendering the 3D model for manually aligning the 3D model with the common structure component in the target frame; and storing annotation data of the aligned model position in computer storage, in association with at least one perception input of the target frame for annotating the common structure component therein, wherein the common structure component comprises a moving object, and wherein the 3D bounding object is a cuboid or a 3D object template.

* * * * *